(12) United States Patent
Matsuoka et al.

(10) Patent No.: US 6,400,774 B1
(45) Date of Patent: Jun. 4, 2002

(54) NONLINEARITY-CAUSED DISTORTION COMPENSATING SYSTEM

(75) Inventors: Akihiko Matsuoka, Yokohama; Masayuki Orihashi, Ichikawa; Morikazu Sagawa, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/208,043

(22) Filed: Dec. 9, 1998

(30) Foreign Application Priority Data

Dec. 10, 1997 (JP) .............................. 9-339676

(51) Int. Cl.[7] .................. H04L 27/04; H04L 27/12; H04L 27/20

(52) U.S. Cl. .................. 375/295; 329/354; 329/349; 329/351; 329/320; 375/296; 375/285; 375/254

(58) Field of Search ................. 375/295, 296, 375/346, 285, 278, 254; 329/354, 349, 351, 320

(56) References Cited

U.S. PATENT DOCUMENTS

| | | | |
|---|---|---|---|
| 4,291,277 A | 9/1981 | Davis et al. ................. | 330/149 |
| 4,700,151 A | 10/1987 | Nagata ......................... | 332/18 |
| 5,513,215 A | * 4/1996 | Marchetto et al. ........... | 375/233 |
| 5,694,388 A | * 12/1997 | Sawahashi et al. .......... | 370/206 |

FOREIGN PATENT DOCUMENTS

| | | | |
|---|---|---|---|
| EP | 0 588 444 A1 | 3/1994 | ........... H04L/27/36 |
| JP | 4-290321 | 10/1992 | |
| JP | 08251246 A | * 9/1996 | ........... H04L/27/36 |

OTHER PUBLICATIONS

International Search Report, Appl. No. EP 98 12 3292, dated Nov. 8, 2001, pp. 1–4.

T. Matsuoka et al., "Compensation of Nonlinear Distortion During Transmission Based on the Adaptive Predistortion Method", IEICE Trans. Electron, vol. E80–C, No. 6, 1997, pp. 782–787.

* cited by examiner

Primary Examiner—Mohammad H. Ghayour
(74) Attorney, Agent, or Firm—Connolly Bove Lodge & Hutz LLP

(57) ABSTRACT

A radio transmitter has a quadrature modulating portion and an RF power amplifier. The RF power amplifier follows the quadrature modulating portion. A nonlinearity-caused distortion compensating system provided in the radio transmitter includes a power calculating portion for calculating a value related to a power of a transmission signal from first baseband signals quadrature with respect to each other. First distortion compensating coefficients are determined in response to the calculated power-related value. The first distortion compensating coefficients are designed to compensate for a signal distortion caused by a nonlinearity of the quadrature modulating portion. Second distortion compensating coefficients are determined in response to the calculated power-related value. The second distortion compensating coefficients are designed to compensate for a signal distortion caused by a nonlinearity of the RF power amplifier. A compensation-coefficient calculating portion operates for calculating final distortion compensating coefficients from the first distortion compensating coefficients and the second distortion compensating coefficients. A distortion compensating portion operates for converting the first baseband signals into second baseband signals quadrature with respect to each other in response to the final distortion compensating coefficients to compensate for signal distortions caused by the nonlinearity of the quadrature modulating portion and the nonlinearity of the RF power amplifier. The second baseband signals are fed to the quadrature modulating portion.

39 Claims, 30 Drawing Sheets

NONLINEARITY-CAUSED DISTORTION COMPENSATING SYSTEM

BACKGROUND OF THE INVENTION

1. Field of the Invention

This invention relates to a nonlinearity-caused distortion compensating system which can be used in, for example, a radio transmitter having a modulator and an RF amplifier. In general, "nonlinearity-caused distortion" is shortened to "nonlinear distortion".

2. Description of the Related Art

Japanese published unexamined patent application 4-290321 discloses a nonlinearity-caused distortion compensating system (a nonlinear distortion compensating system) used in a radio transmitter having a modulator and an RF amplifier. In Japanese application 4-290321, a digital filter processes a digital baseband signal into a processing-resultant digital signal, and a digital-to-analog converter following the digital filter changes the processing-resultant digital signal into a corresponding analog baseband signal.

In addition, a modulator following the digital-to-analog converter subjects the analog baseband signal to a modulation process, thereby converting the analog baseband signal into a modulation-resultant signal. Furthermore, a first frequency converter following the modulator changes the modulation-resultant signal into a corresponding RF signal. Then, an RF power amplifier following the first frequency converter amplifies the RF signal.

Generally, the input-output characteristic of an RF power amplifier has a nonlinearity which distorts the output signal of the RF power amplifier.

In Japanese application 4-290321, a nonlinearity-caused distortion in the output signal of the RF power amplifier is previously determined. The digital filter includes a ROM storing signals which represent corrective coefficients predetermined to compensate for a nonlinearity-caused distortion in the output signal of the RF power amplifier.

In Japanese application 4-290321, the RF power amplifier is followed by a second frequency converter which changes the output signal of the RF power amplifier into a corresponding IF signal. A demodulator following the second frequency converter subjects the IF signal to a demodulation process, thereby converting the IF signal into a corresponding demodulation-resultant signal. The demodulator extracts a polarity signal and an error signal from the demodulation-resultant signal. A correlator following the demodulator detects a correlation between the polarity signal and the error signal, and outputs a signal representing the detected correlation. An integrator following the correlator integrates the output signal of the correlator into a control signal. The integrator outputs the control signal to the digital filter.

In Japanese application 4-290321, at an initial stage of operation of the transmitter, the digital filter processes the digital baseband signal in response to the corrective coefficients and the control signal so that a nonlinearity-caused distortion in the output signal of the RF power amplifier can be compensated for. During a normal stage of operation of the transmitter which succeeds the initial stage thereof, the digital filter processes the digital baseband signal in response to the control signal only.

Japanese application 4-290321 considers a nonlinearity-caused distortion in the output signal of the RF power amplifier. Generally, the input-output characteristic of a modulator also has a nonlinearity which distorts the output signal of the modulator.

Japanese application 4-290321 fails to consider a nonlinearity-caused distortion in the output signal of the modulator.

SUMMARY OF THE INVENTION

It is an object of this invention to provide a system which can compensate for a signal distortion caused by a nonlinearity of a modulator.

A first aspect of this invention provides a nonlinearity-caused distortion compensating system (a nonlinear distortion compensating system) in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first distortion compensating coefficients in response to the value calculated by the power calculating portion, the first distortion compensating coefficients being designed to compensate for a signal distortion caused by a nonlinearity of the quadrature modulating portion; second means for determining second distortion compensating coefficients in response to the value calculated by the power calculating portion, the second distortion compensating coefficients being designed to compensate for a signal distortion caused by a nonlinearity of the RF power amplifier; a compensation-coefficient calculating portion for calculating final distortion compensating coefficients from the first distortion compensating coefficients determined by the first means and the second distortion compensating coefficients determined by the second means; a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; and third means for feeding the second baseband signals generated by the distortion compensating portion to the quadrature modulating portion.

A second aspect of this invention is based on the first aspect thereof, and provides a nonlinearity-caused distortion compensating system wherein the first means includes a first memory for storing signals representing a first reference table providing a relation between the first distortion compensating coefficients and the value calculated by the power calculating portion, and the second means includes a second memory for storing signals representing a second reference table providing a relation between the second distortion compensating coefficients and the value calculated by the power calculating portion.

A third aspect of this invention is based on the first aspect thereof, and provides a nonlinearity-caused distortion compensating system wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

A fourth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first distortion compensating coefficients in response to the value calculated by the power calculating portion, the first distortion compensating coefficients being designed to compensate for a signal distortion caused by a nonlinearity of the quadrature modulating portion; second means for determining second distortion compensating coefficients in response to the value calculated by the power calculating portion according to a relation therebetween, the second distortion compensating coefficients being designed to compensate for a signal distortion caused by a nonlinearity of the RF power amplifier; a compensation-coefficient calculating portion for calculating final distortion compensating coefficients from the first distortion compensating coefficients determined by the first means and the second distortion compensating coefficients determined by the second means; a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; third means for feeding the second baseband signals generated by the distortion compensating portion to the quadrature modulating portion; a signal divider connected to the RF power amplifier for separating a portion from an output signal of the RF power amplifier; a quadrature demodulator for demodulating the signal portion separated by the signal divider into third baseband signals quadrature with respect to each other; and an updating portion for calculating an error between the first baseband signals and the third baseband signals, and for updating, in response to the calculated error, the relation between the second distortion compensating coefficients and the value calculated by the power calculating portion which is used by the second means.

A fifth aspect of this invention is based on the fourth aspect thereof, and provides a nonlinearity-caused distortion compensating system wherein the first means includes a first memory for storing signals representing a first reference table providing a relation between the first distortion compensating coefficients and the value calculated by the power calculating portion, and the second means includes a second memory for storing signals representing a second reference table providing the relation between the second distortion compensating coefficients and the value calculated by the power calculating portion.

A sixth aspect of this invention is based on the fourth aspect thereof, and provides a nonlinearity-caused distortion compensating system wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

A seventh aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion, the first compensation coefficients being designed to compensate for a signal distortion caused by a nonlinearity of the quadrature modulating portion; second means for determining second compensation coefficients in response to the value calculated by the power calculating portion, the second compensation coefficients being designed to compensate for a signal distortion caused by a nonlinearity of the RF power amplifier; a calculator for calculating third compensation coefficients from the value calculated by the power calculating portion according to equations, the third compensation coefficients being designed to compensate for a variation in characteristics of at least one of the quadrature modulating portion and the RF power amplifier; a compensation-coefficient calculating portion for calculating final compensation coefficients from the first compensation coefficients determined by the first means, the second compensation coefficients determined by the second means, and the third compensation coefficients calculated by the calculator; a compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier and to compensate for a variation in the characteristics of at least one of the quadrature modulating portion and the RF power amplifier; third means for feeding the second baseband signals generated by the compensating portion to the quadrature modulating portion; a signal divider connected to the RF power amplifier for separating a portion from an output signal of the RF power amplifier; a quadrature demodulator for demodulating the signal portion separated by the signal divider into third baseband signals quadrature with respect to each other; and an updating portion for calculating an error between the first baseband signals and the third baseband signals, and for updating the equations used by the calculator in response to the calculated error.

An eighth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining compensation coefficients in response to the value calculated by the power calculating portion according to a relation therebetween, the compensation coefficients being designed to compensate for a signal distortion caused by at least one of a nonlinearity of the quadrature modulating portion and a nonlinearity of the RF power amplifier; a compensating portion for converting the first baseband signals into second baseband signals quadrature with respect to each other in response to the compensation coefficients determined by the first means to compensate for a signal distortion caused by at least one of the nonlinearity of the quadrature modulating portion and the nonlinearity of the RF power amplifier; second means for feeding the second baseband signals generated by the compensating portion to the quadrature modulating portion; a signal divider connected to the RF power amplifier for separating a portion from an output signal of the RF power amplifier; a quadrature demodulator for demodulating the signal portion separated by the signal divider into third baseband signals quadrature with respect to each other; third means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, and for updating, in response to the calculated error, the relation between the compensation coefficients and the value calculated by the power calculating portion which is provided by the first means.

A ninth aspect of this invention is based on the eighth aspect thereof, and provides a nonlinearity-caused distortion compensating system wherein the first means includes a first memory for storing signals representing a first reference table providing the relation between the compensation coefficients and the value calculated by the power calculating portion, and the third means includes a second memory for storing signals representing a second reference table providing a relation between the corrective coefficients and the value calculated by the power calculating portion.

A tenth aspect of this invention is based on the eighth aspect thereof, and provides a nonlinearity-caused distortion compensating system wherein the first means includes a first calculator for calculating the compensation coefficients from the value calculated by the power calculating portion according to first equations, and the third means includes a second calculator for calculating the corrective coefficients from the value calculated by the power calculating portion according to second equations.

An eleventh aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion, the first compensation coefficients being designed to compensate for a signal distortion caused by at least one of a nonlinearity of the quadrature modulating portion and a nonlinearity of the RF power amplifier; a calculator for calculating second compensation coefficients from the value calculated by the power calculating portion according to equations, the second compensation coefficients being designed to compensate for a variation in characteristics of at least one of the quadrature modulating portion and the RF power amplifier; a compensation-coefficient calculating portion for calculating final compensation coefficients from the first compensation coefficients determined by the first means and the second compensation coefficients determined by the calculator; a compensating portion for converting the first baseband signals into second baseband signals quadrature with respect to each other in response to the final compensation coefficients calculated by the compensation-coefficient calculating portion to compensate for a signal distortion caused by at least one of the nonlinearity of the quadrature modulating portion and the nonlinearity of the RF power amplifier and to compensate for a variation in the characteristics of at least one of the quadrature modulating portion and the RF power amplifier; second means for feeding the second baseband signals generated by the compensating portion to the quadrature modulating portion; a signal divider connected to the RF power amplifier for separating a portion from an output signal of the RF power amplifier; a quadrature demodulator for demodulating the signal portion separated by the signal divider into third baseband signals quadrature with respect to each other; third means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, and for updating the equations used by the calculator in response to the calculated error.

A twelfth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first distortion compensating coefficients in response to the value calculated by the power calculating portion, the first distortion compensating coefficients being designed to compensate for a signal distortion caused by a nonlinearity of the quadrature modulating portion; second means for determining second distortion compensating coefficients in response to the value calculated by the power calculating portion according to a relation therebetween, the second distortion compensating coefficients being designed to compensate for a signal distortion caused by a nonlinearity of the RF power amplifier; a compensation-coefficient calculating portion for calculating final distortion compensating coefficients from the first distortion compensating coefficients determined by the first means and the second distortion compensating coefficients determined by the second means; a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; third means for feeding the second baseband signals generated by the distortion compensating portion to the quadrature modulating portion; a signal divider connected to the RF power amplifier for separating a portion from an output signal of the RF power amplifier; a quadrature demodulator for demodulating the signal portion separated by the signal divider into third baseband signals quadrature with respect to each other; fourth means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the fourth means to compensate for a signal distortion caused by the nonlinearity of the quadrature demodulator; and an updating portion for calculating an error between the first baseband signals and the fourth baseband signals, and for updating, in response to the calculated error, the relation between the second distortion compensating coefficients and the value calculated by the power calculating portion which is used by the second means.

A thirteenth aspect of this invention is based on the twelfth aspect thereof, and provides a nonlinearity-caused distortion compensating system wherein the first means includes a first memory for storing signals representing a first reference table providing a relation between the first distortion compensating coefficients and the value calculated by the power calculating portion, and the second means includes a second memory for storing signals representing a second reference table providing the relation between the second distortion compensating coefficients and the value calculated by the power calculating portion, and the fourth means includes a third memory for storing signals representing a third reference table providing a relation between the corrective coefficients and the value calculated by the power calculating portion.

A fourteenth aspect of this invention is based on the twelfth aspect thereof, and provides a nonlinearity-caused distortion compensating system wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations, and the fourth means includes a third calculator for calculating the corrective coefficients from the value calculated by the power calculating portion according to third equations.

A fifteenth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion, the first compensation coefficients being designed to compensate for a signal distortion caused by a nonlinearity of the quadrature modulating portion; second means for determining second compensation coefficients in response to the value calculated by the power calculating portion, the second compensation coefficients being designed to compensate for a signal distortion caused by a nonlinearity of the RF power amplifier; a calculator for calculating third compensation coefficients from the value calculated by the power calculating portion according to equations, the third compensation coefficients being designed to compensate for a variation in characteristics of at least one of the quadrature modulating portion and the RF power amplifier; a compensation-coefficient calculating portion for calculating final compensation coefficients from the first compensation coefficients determined by the first means, the second compensation coefficients determined by the second means, and the third compensation coefficients calculated by the calculator; a compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier and to compensate for a variation in the characteristics of at least one of the quadrature modulating portion and the RF power amplifier; third means for feeding the second baseband signals generated by the compensating portion to the quadrature modulating portion; a signal divider connected to the RF power amplifier for separating a portion from an output signal of the RF power amplifier; a quadrature demodulator for demodulating the signal portion separated by the signal divider into third baseband signals quadrature with respect to each other; fourth means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the fourth means to compensate for a signal distortion caused by the nonlinearity of the quadrature demodulator; and an updating portion for calculating an error between the first baseband signals and the fourth baseband signals, and for updating the equations used by the calculator in response to the calculated error.

A sixteenth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first distortion compensating coefficients in response to the value calculated by the power calculating portion according to a relation therebetween, the first distortion compensating coefficients being designed to compensate for a signal distortion caused by a nonlinearity of the quadrature modulating portion; second means for determining second distortion compensating coefficients in response to the value calculated by the power calculating portion according to a relation therebetween, the second distortion compensating coefficients being designed to compensate for a signal distortion caused by a nonlinearity of the RF power amplifier; a compensation-coefficient calculating portion for calculating final distortion compensating coefficients from the first distortion compensating coefficients determined by the first means and the second distortion compensating coefficients determined by the second means; a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; third means for feeding the second baseband signals generated by the distortion compensating portion to the quadrature modulating portion; a first signal divider connected to the quadrature modulating portion for separating a portion from an output signal of the quadrature modulating portion; a second signal divider connected to the RF power amplifier for separating a portion from an output signal of the RF power amplifier; a switch for selecting one of the signal portion separated by the first signal divider and the signal portion separated by the second signal divider; a quadrature demodulator for demodulating the signal portion selected by the switch into third baseband signals quadrature with respect to each other; and an updating portion for calculating an error between the first baseband signals and the third baseband signals, for updating, in response to the calculated error, the relation between the first distortion compensating coefficients and the value calculated by the power calculating portion which is used by the first means when the switch selects the signal portion separated by the first signal divider, and for updating, in response to the calculated error, the relation between the second distortion compensating coefficients and the value calculated by the power calculating portion which is used by the second means when the switch selects the signal portion separated by the second signal divider.

A seventeenth aspect of this invention is based on the sixteenth aspect thereof, and provides a nonlinearity-caused distortion compensating system wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion.

An eighteenth aspect of this invention is based on the sixteenth aspect thereof, and provides a nonlinearity-caused distortion compensating system wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

A nineteenth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion according to a relation therebetween, the first compensation coefficients being designed to compensate for a signal distortion caused by a nonlinearity of the quadrature modulating portion; second means for determining second compensation coefficients in response to the value calculated by the power calculating portion according to a relation therebetween, the second compensation coefficients being designed to compensate for a signal distortion caused by a nonlinearity of the RF power amplifier; a first calculator for calculating third compensation coefficients from the value calculated by the power calculating portion according to first equations, the third compensation coefficients being designed to compensate for a variation in characteristics of the quadrature modulating portion; a second calculator for calculating fourth compensation coefficients from the value calculated by the power calculating portion according to second equations, the fourth compensation coefficients being designed to compensate for a variation in characteristics of the RF power amplifier; a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator; a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier; third means for feeding the second baseband signals generated by the distortion compensating portion to the quadrature modulating portion; a first signal divider connected to the quadrature modulating portion for separating a portion from an output signal of the quadrature modulating portion; a second signal divider connected to the RF power amplifier for separating a portion from an output signal of the RF power amplifier; a switch for selecting one of the signal portion separated by the first signal divider and the signal portion separated by the second signal divider; a quadrature demodulator for demodulating the signal portion selected by the switch into third baseband signals quadrature with respect to each other; and an updating portion for calculating an error between the first baseband signals and the third baseband signals, for updating the first equations used by the first calculator in response to the calculated error when the switch selects the signal portion separated by the first signal divider, and for updating the second equations used by the second calculator in response to the calculated error when the switch selects the signal portion separated by the second signal divider.

A twentieth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first distortion compensating coefficients in response to the value calculated by the power calculating portion according to a relation therebetween, the first distortion compensating coefficients being designed to compensate for a signal distortion caused by a nonlinearity of the quadrature modulating portion; second means for determining second distortion compensating coefficients in response to the value calculated by the power calculating portion according to a relation therebetween, the second distortion compensating coefficients being designed to compensate for a signal distortion caused by a nonlinearity of the RF power amplifier; a compensation-coefficient calculating portion for calculating final distortion compensating coefficients from the first distortion compensating coefficients determined by the first means and the second distortion compensating coefficients determined by the second means; a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; third means for feeding the second baseband signals generated by the distortion compensating portion to the quadrature modulating portion; a first signal divider connected to the quadrature modulating portion for separating a portion from an output signal of the quadrature modulating portion; a second signal divider connected to the RF power amplifier for separating a portion from an output signal of the RF power amplifier; a switch for selecting one of the signal portion separated by the first signal divider and the signal portion separated by the second signal divider; a quadrature demodulator for demodulating the signal portion selected by the switch into third baseband signals quadrature with respect to each other; fourth means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the first distortion compensating coefficients and the value calculated by the power calculating portion which is used by the first means when the switch selects the signal portion separated by the first signal divider, and for updating, in response to the calculated error, the relation between the second distortion compensating coefficients and the value calculated by the power calculating portion which is used by the second means when the switch selects the signal portion separated by the second signal divider.

A twenty-first aspect of this invention is based on the twentieth aspect thereof, and provides a nonlinearity-caused distortion compensating system wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion, and the fourth means includes a third memory for storing signals representing a third reference table providing a relation between the corrective coefficients and the value calculated by the power calculating portion.

A twenty-second aspect of this invention is based on the twentieth aspect thereof, and provides a nonlinearity-caused distortion compensating system wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations, and the fourth means includes a third calculator for calculating the corrective coefficients from the value calculated by the power calculating portion according to third equations.

A twenty-third aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion according to a relation therebetween, the first compensation coefficients being designed to compensate for a signal distortion caused by a nonlinearity of the quadrature modulating portion; second means for determining second compensation coefficients in response to the value calculated by the power calculating portion according to a relation therebetween, the second compensation coefficients being designed to compensate for a signal distortion caused by a nonlinearity of the RF power amplifier; a first calculator for calculating third compensation coefficients from the value calculated by the power calculating portion according to first equations, the third compensation coefficients being designed to compensate for a variation in characteristics of the quadrature modulating portion; a second calculator for calculating fourth compensation coefficients from the value calculated by the power calculating portion according to second equations, the fourth compensation coefficients being designed to compensate for a variation in characteristics of the RF power amplifier; a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator; a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier; third means for feeding the second baseband signals generated by the distortion compensating portion to the quadrature modulating portion; a first signal divider connected to the quadrature modulating portion for separating a portion from an output signal of the quadrature modulating portion; a second signal divider connected to the RF power amplifier for separating a portion from an output signal of the RF power amplifier; a switch for selecting one of the signal portion separated by the first signal divider and the signal portion separated by the second signal divider; a quadrature demodulator for demodulating the signal portion selected by the switch into third baseband signals quadrature with respect to each other; fourth means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating the first equations used by the first calculator in response to the calculated error when the switch selects the signal portion separated by the first signal divider, and for updating the second equations used by the second calculator in response to the calculated error when the switch selects the signal portion separated by the second signal divider.

A twenty-seventh aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining compensation coefficients in response to the value calculated by the power calculating portion according to a relation therebetween, the compensation coefficients being designed to compensate for a signal distortion caused by at least one of a nonlinearity of the quadrature modulating portion and a nonlinearity of the RF power amplifier; a distortion compensating portion for converting the first baseband signals into second baseband signals quadrature with respect to each other in response to the compensation coefficients determined by the first means to compensate for a signal distortion caused by at least one of the nonlinearity of the quadrature modulating portion and the nonlinearity of the RF power amplifier; second means for feeding the second baseband signals generated by the distortion compensating portion to the quadrature modulating portion; a first signal divider connected to the quadrature modulating portion for separating a portion from an output signal of the quadrature modulating portion; a second signal divider connected to the RF power amplifier for separating a portion from an output signal of the RF power amplifier; a switch for selecting one of the signal portion separated by the first signal divider and the signal portion separated by the second signal divider; a quadrature demodulator for demodulating the signal portion selected by the switch into third baseband signals quadrature with respect to each other; third means for determining corrective coefficients in response to the value calculated by the power calculating portion according to a relation therebetween, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the compensation coefficients and the value calculated by the power calculating portion which is used by the first means when the switch selects the signal portion separated by the second signal divider, and for updating, in response to the calculated error, the relation between the corrective coefficients and the value calculated by the power calculating portion which is used by the third means when the switch selects the signal portion separated by the first signal divider.

A twenty-fifth aspect of this invention is based on the twenty-fourth aspect thereof, and provides a nonlinearity-caused distortion compensating system wherein the first means includes a first memory for storing signals representing a first reference table providing the relation between the compensation coefficients and the value calculated by the power calculating portion, and the third means includes a second memory for storing signals representing a second reference table providing the corrective coefficients and the value calculated by the power calculating portion.

A twenty-sixth aspect of this invention is based on the twenty-fourth aspect thereof, and provides a nonlinearity-caused distortion compensating system wherein the first means includes a first calculator for calculating the compensation coefficients from the value calculated by the power calculating portion according to first equations, and the third means includes a second calculator for calculating the corrective coefficients from the value calculated by the power calculating portion according to second equations.

A twenty-seventh aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion, the first compensation coefficients being designed to compensate for a signal distortion caused by at least one of a nonlinearity of the quadrature modulating portion and a nonlinearity of the RF power amplifier; a first calculator for calculating second compensation coefficients from the value calculated by the power calculating portion according to first equations, the second compensation coefficients being designed to compensate for a variation in characteristics of at least one of the quadrature modulating portion and the RF power amplifier; a compensation-coefficient calculating portion for calculating final compensation coefficients from the first compensation coefficients determined by the first means and the second compensation coefficients determined by the first calculator; a distortion compensating portion for converting the first baseband signals into second baseband signals quadrature with respect to each other in response to the final compensation coefficients calculated by the compensation-coefficient calculating portion to compensate for a signal distortion caused by at least one of the nonlinearity of the quadrature modulating portion and the nonlinearity of the RF power amplifier, and to compensate for a variation in the characteristics of at least one of the quadrature modulating portion and the RF power amplifier; second means for feeding the second baseband signals generated by the distortion compensating portion to the quadrature modulating portion; a first signal divider connected to the quadrature modulating portion for separating a portion from an output signal of the quadrature modulating portion; a second signal divider connected to the RF power amplifier for separating a portion from an output signal of the RF power amplifier; a switch for selecting one of the signal portion separated by the first signal divider and the signal portion separated by the second signal divider; a quadrature demodulator for demodulating the signal portion selected by the switch into third baseband signals quadrature with respect to each other; third means for determining first corrective coefficients in response to the value calculated by the power calculating portion, the first corrective coefficients being designed to compensate for a signal distortion caused by a nonlinearity of the quadrature demodulator; a second calculator for calculating second corrective coefficients from the value calculated by the power calculating portion according to second equations, the second corrective coefficients being designed to compensate for a variation in characteristics of the quadrature demodulator; a corrective-coefficient calculating portion for calculating final corrective coefficients from the first corrective coefficients determined by the third means and the second corrective coefficients determined by the second calculator; a correcting portion for converting the third baseband signals generated by the quadrature demodulator into fourth baseband signals quadrature with respect to each other in response to the final corrective coefficients determined by the corrective-coefficient calculating portion to compensate for a signal distortion caused by the nonlinearity of the quadrature demodulator, and to compensate for a variation in the characteristics of the quadrature demodulator; and an updating portion for calculating an error between the first baseband signals and the fourth baseband signals, for updating the first equations used by the first calculator in response to the calculated error when the switch selects the signal portion separated by the second signal divider, and for updating the second equations used by the second calculator in response to the calculated error when the switch selects the signal portion separated by the first signal divider.

A twenty-eighth aspect of this invention provides a nonlinearity-caused distortion compensating system in a radio transmitter having a quadrature modulating portion and an RF power amplifier. The RF power amplifier following the quadrature modulating portion. The system comprises a power calculating portion for calculating a value related to a power of a transmission signal from first baseband signals quadrature with respect to each other; first means for determining first distortion compensating coefficients in response to the value calculated by the power calculating portion according to a relation therebetween, the first distortion compensating coefficients being designed to compensate for a signal distortion caused by a nonlinearity of the quadrature modulating portion; second means for determining second distortion compensating coefficients in response to the value calculated by the power calculating portion according to a relation therebetween, the second distortion compensating coefficients being designed to compensate for a signal distortion caused by a nonlinearity of the RF power amplifier; a compensation-coefficient calculating portion for calculating final distortion compensating coefficients from the first distortion compensating coefficients determined by the first means and the second distortion compensating coefficients determined by the second means; a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; third means for feeding the second baseband signals generated by the distortion compensating portion to the quadrature modulating portion; a switch connected to the quadrature modulating portion and the RF power amplifier for selecting one of an output signal of the quadrature modulating portion and an output signal of the RF power amplifier; a signal divider connected to the switch for separating a portion from the signal selected by the switch; a quadrature demodulator for demodulating the signal portion selected by the switch into third baseband signals quadrature with respect to each other; and an updating portion for calculating an error between the first baseband signals and the third baseband signals, for updating, in response to the calculated error, the relation between the first distortion compensating coefficients and the value calculated by the power calculating portion which is used by the first means when the switch selects the output signal of the quadrature modulating portion, and for updating, in response to the calculated error, the relation between the second distortion compensating coefficients and the value calculated by the power calculating portion which is used by the second means when the switch selects the output signal of the RF power amplifier.

A twenty-ninth aspect of this invention is based on the twenty-eighth aspect thereof, and provides a nonlinearity-caused distortion compensating system wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion.

A thirtieth aspect of this invention is based on the twenty-eighth aspect thereof, and provides a nonlinearity-caused distortion compensating system wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

A thirty-first aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion according to a relation therebetween, the first compensation coefficients being designed to compensate for a signal distortion caused by a nonlinearity of the quadrature modulating portion; second means for determining second compensation coefficients in response to the value calculated by the power calculating portion according to a relation therebetween, the second compensation coefficients being designed to compensate for a signal distortion caused by a nonlinearity of the RF power amplifier; a first calculator for calculating third compensation coefficients from the value calculated by the power calculating portion according to first equations, the third compensation coefficients being designed to compensate for a variation in characteristics of the quadrature modulating portion; a second calculator for calculating fourth compensation coefficients from the value calculated by the power calculating portion according to second equations, the fourth compensation coefficients being designed to compensate for a variation in characteristics of the RF power amplifier; a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator; a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier; third means for feeding the second baseband signals generated by the distortion compensating portion to the quadrature modulating portion; a switch connected to the quadrature modulating portion and the RF power amplifier for selecting one of an output signal of the quadrature modulating portion and an output signal of the RF power amplifier; a signal divider connected to the switch for separating a portion from the signal selected by the switch; a quadrature demodulator for demodulating the signal portion selected by the switch into third baseband signals quadrature with respect to each other; and an updating portion for calculating an error between the first baseband signals and the third baseband signals, for updating the first equations used by the first calculator in response to the calculated error when the switch selects the output signal of the quadrature modulating portion, and for updating the second equations used by the second calculator in response to the calculated error when the switch selects the output signal of the RF power amplifier.

A thirty-second aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first distortion compensating coefficients in response to the value calculated by the power calculating portion according to a relation therebetween, the first distortion compensating coefficients being designed to compensate for a signal distortion caused by a nonlinearity of the quadrature modulating portion; second means for determining second distortion compensating coefficients in response to the value calculated by the power calculating portion according to a relation therebetween, the second distortion compensating coefficients being designed to compensate for a signal distortion caused by a nonlinearity of the RF power amplifier; a compensation-coefficient calculating portion for calculating final distortion compensating coefficients from the first distortion compensating coefficients determined by the first means and the second distortion compensating coefficients determined by the second means; a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; third means for feeding the second baseband signals generated by the distortion compensating portion to the quadrature modulating portion; a switch connected to the quadrature modulating portion and the RF power amplifier for selecting one of an output signal of the quadrature modulating portion and an output signal of the RF power amplifier; a signal divider connected to the switch for separating a portion from the signal selected by the switch; a quadrature demodulator for demodulating the signal portion selected by the switch into third baseband signals quadrature with respect to each other; fourth means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the first distortion compensating coefficients and the value calculated by the power calculating portion which is used by the first means when the switch selects the output signal of the quadrature modulating portion, and for updating, in response to the calculated error, the relation between the second distortion compensating coefficients and the value calculated by the power calculating portion which is used by the second means when the switch selects the output signal of the RF power amplifier.

A thirty-third aspect of this invention is based on the thirty-second aspect thereof, and provides a nonlinearity-caused distortion compensating system wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion, and the fourth means includes a third memory for storing signals representing a third reference table providing a relation between the corrective coefficients and the value calculated by the power calculating portion.

A thirty-fourth aspect of this invention is based on the thirty-second aspect thereof, and provides a nonlinearity-caused distortion compensating system wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations, and the fourth means includes a third calculator for calculating the corrective coefficients from the value calculated by the power calculating portion according to third equations.

A thirty-fifth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion according to a relation therebetween, the first compensation coefficients being designed to compensate for a signal distortion caused by a nonlinearity of the quadrature modulating portion; second means for determining second compensation coefficients in response to the value calculated by the power calculating portion according to a relation therebetween, the second compensation coefficients being designed to compensate for a signal distortion caused by a nonlinearity of the RF power amplifier; a first calculator for calculating third compensation coefficients from the value calculated by the power calculating portion according to first equations, the third compensation coefficients being designed to compensate for a variation in characteristics of the quadrature modulating portion; a second calculator for calculating fourth compensation coefficients from the value calculated by the power calculating portion according to second equations, the fourth compensation coefficients being designed to compensate for a variation in characteristics of the RF power amplifier; a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator; a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier; third means for feeding the second baseband signals generated by the distortion compensating portion to the quadrature modulating portion; a switch connected to the quadrature modulating portion and the RF power amplifier for selecting one of an output signal of the quadrature modulating portion and an output signal of the RF power amplifier; a signal divider connected to the switch for separating a portion from the signal selected by the switch; a quadrature demodulator for demodulating the signal portion selected by the switch into third baseband signals quadrature with respect to each other; fourth means for determining corrective coefficients in response to the value calculated by the power calculating portion, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating the first equations used by the first calculator in response to the calculated error when the switch selects the output signal of the quadrature modulating portion, and for updating the second equations used by the second calculator in response to the calculated error when the switch selects the output signal of the RF power amplifier.

A thirty-sixth aspect of this invention provides a nonlinearity-caused distortion compensating system in a radio transmitter having a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining compensation coefficients in response to the value calculated by the power calculating portion according to a relation therebetween, the compensation coefficients being designed to compensate for a signal distortion caused by at least one of a nonlinearity of the quadrature modulating portion and a nonlinearity of the RF power amplifier; a distortion compensating portion for converting the first baseband signals into second baseband signals quadrature with respect to each other in response to the compensation coefficients determined by the first means to compensate for a signal distortion caused by at least one of the nonlinearity of the quadrature modulating portion and the nonlinearity of the RF power amplifier; second means for feeding the second baseband signals generated by the distortion compensating portion to the quadrature modulating portion; a switch connected to the quadrature modulating portion and the RF power amplifier for selecting one of an output signal of the quadrature modulating portion and an output signal of the RF power amplifier; a signal divider connected to the switch for separating a portion from the signal selected by the switch; a quadrature demodulator for demodulating the signal portion selected by the switch into third baseband signals quadrature with respect to each other; third means for determining corrective coefficients in response to the value calculated by the power calculating portion according to a relation therebetween, the corrective coefficients being designed to compensate for a signal distortion caused by a nonlinearity of the quadrature demodulator; a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the compensation coefficients and the value calculated by the power calculating portion which is used by the first means when the switch selects the output signal of the RF power amplifier, and for updating, in response to the calculated error, the relation between the corrective coefficients and the value calculated by the power calculating portion which is used by the third means when the switch selects the output signal of the quadrature modulating portion.

A thirty-seventh aspect of this invention is based on the thirty-sixth aspect thereof, and provide a nonlinearity-caused distortion compensating system wherein the first means includes a first memory for storing signals representing a first reference table providing the relation between the compensation coefficients and the value calculated by the power calculating portion, and the third means includes a second memory for storing signals representing a second reference table providing the corrective coefficients and the value calculated by the power calculating portion.

A thirty-eighth aspect of this invention is based on the thirty-sixth aspect thereof, and provides a nonlinearity-caused distortion compensating system wherein the first means includes a first calculator for calculating the compensation coefficients from the value calculated by the power calculating portion according to first equations, and the third means includes a second calculator for calculating the corrective coefficients from the value calculated by the power calculating portion according to second equations.

A thirty-ninth aspect of this invention provides a nonlinearity-caused distortion compensating system in a radio transmitter having be a quadrature modulating portion and an RF power amplifier. The RF power amplifier follows the quadrature modulating portion. The system comprises a power calculating portion for calculating a value related to a power of a transmission signal from first baseband signals quadrature with respect to each other; first means for determining first compensation coefficients in response to the value calculated by the power calculating portion, the first compensation coefficients being designed to compensate for a signal distortion caused by at least one of a nonlinearity of the quadrature modulating portion and a nonlinearity of the RF power amplifier; a first calculator for calculating second compensation coefficients from the value calculated by the power calculating portion according to first equations, the second compensation coefficients being designed to compensate for a variation in characteristics of at least one of the quadrature modulating portion and the RF power amplifier; a compensation-coefficient calculating portion for calculating final compensation coefficients from the first compensation coefficients determined by the first means and the second compensation coefficients determined by the first calculator; a distortion compensating portion for converting the first baseband signals into second baseband signals quadrature with respect to each other in response to the final compensation coefficients calculated by the compensation-coefficient calculating portion to compensate for a signal distortion caused by at least one of the nonlinearity of the quadrature modulating portion and the nonlinearity of the RF power amplifier, and to compensate for a variation in the characteristics of at least one of the quadrature modulating portion and the RF power amplifier; second means for feeding the second baseband signals generated by the distortion compensating portion to the quadrature modulating portion; a switch connected to the quadrature modulating portion and the RF power amplifier for selecting one of an output signal of the quadrature modulating portion and an output signal of the RF power amplifier; a signal divider connected to the switch for separating a portion from the signal selected by the switch; a quadrature demodulator for demodulating the signal portion selected by the switch into third baseband signals quadrature with respect to each other; third means for determining first corrective coefficients in response to the value calculated by the power calculating portion, the first corrective coefficients being designed to compensate for a signal distortion caused by a nonlinearity of the quadrature demodulator; a second calculator for calculating second corrective coefficients from the value calculated by the power calculating portion according to second equations, the second corrective coefficients being designed to compensate for a variation in characteristics of the quadrature demodulator; a corrective-coefficient calculating portion for calculating final corrective coefficients from the first corrective coefficients determined by the third means and the second corrective coefficients determined by the second calculator; a correcting portion for converting the third baseband signals generated by the quadrature demodulator into fourth baseband signals quadrature with respect to each other in response to the final corrective coefficients determined by the corrective-coefficient calculating portion to compensate for a signal distortion caused by the nonlinearity of the quadrature demodulator, and to compensate for a variation in the characteristics of the quadrature demodulator; and an updating portion for calculating an error between the first baseband signals and the fourth baseband signals, for updating the first equations used by the first calculator in response to the calculated error when the switch selects the output signal of the RF power amplifier, and for updating the second equations used by the second calculator in response to the calculated error when the switch selects the output signal of the quadrature modulating portion.

DESCRIPTION OF THE PREFERRED EMBODIMENTS

First Embodiment

Figure 1:
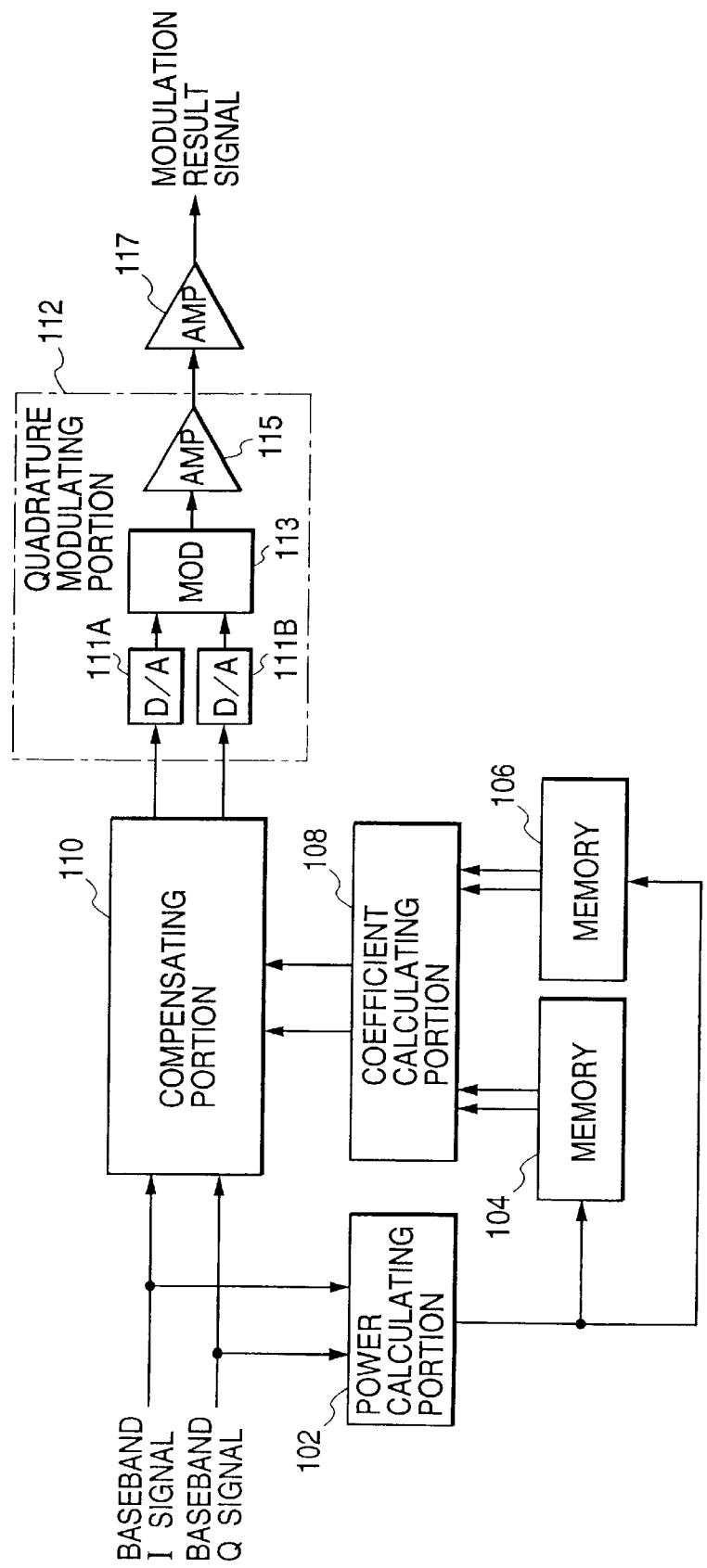
FIG. 1 is a block diagram of a portion of a radio transmitter equipped with a nonlinearity-caused distortion compensating system (a nonlinear distortion compensating system) according to a first embodiment of this invention.

FIG. 1 shows a portion of a radio transmitter equipped with a nonlinearity-caused distortion compensating system (a nonlinear distortion compensating system) according to a first embodiment of this invention. The transmitter of FIG. 1 includes a power calculating portion 102, read-only memories (ROM's) 104 and 106, a compensation-coefficient calculating portion 108, a distortion compensating portion 110, a quadrature modulating portion 112, and an radio-frequency (RF) power amplifier 117.

The power calculating portion 102 is connected to the memories 104 and 106. The memories 104 and 106 are connected to the compensation-coefficient calculating portion 108. The compensation-coefficient calculating portion 108 is connected to the distortion compensating portion 110. The distortion compensating portion 110 is connected to the quadrature modulating portion 112. The quadrature modulating portion 112 is connected to the RF power amplifier 117.

The quadrature modulating portion 112 includes digital-to-analog (D/A) converters 111A and 111B, a quadrature modulator 113, and an amplifier circuit 115. The D/A converters 11 1A and 111B are connected to the distortion compensating portion 110. The D/A converters 11 1A and 11I B are followed by the quadrature modulator 113. The quadrature modulator 113 is connected to the RF power amplifier 117 via the amplifier circuit 115.

A digital baseband in-phase signal (a digital baseband I signal) and a digital baseband quadrature signal (a digital baseband Q signal) which have a quadrature relation with each other are inputted into the power calculating portion 102 and the distortion compensating portion 110. These I and Q signals are also referred to as the input digital baseband I and Q signals.

The power calculating portion 102 is designed to consider a supposed analog signal inputted into the quadrature modulator 113 (or a supposed analog signal outputted from the quadrature modulator 113). The power calculating portion 102 estimates or calculates an amplitude of the supposed analog signal from the digital baseband I signal and the digital baseband Q signal. The power calculating portion 102 generates a digital signal representing the calculated amplitude. The power calculating portion 102 feeds the amplitude-representing digital signal to the memories 104 and 106 as an address signal.

It should be noted that the power calculating portion 102 may estimate or calculate a power of the supposed analog signal from the digital baseband I signal and the digital baseband Q signal. In this case, the power calculating portion 102 generates a digital signal representing the calculated power. The power calculating portion 102 feeds the power-representing digital signal to the memories 104 and 106 as an address signal.

The memory 104 has a first section and a second section. The first section of the memory 104 stores digital signals representing predetermined I compensation coefficients respectively. In the first section of the memory 104, the coefficient-representing digital signals are stored in storage locations having different addresses, respectively. The first section of the memory 104 is designed so that a desired relation between the calculated amplitude (or the calculated power) and the I compensation coefficient will be provided therein as a reference table. The second section of the memory 104 stores digital signals representing predetermined Q compensation coefficients respectively. In the second section of the memory 104, the coefficient-representing digital signals are stored in storage locations having different addresses, respectively. The second section of the memory 104 is designed so that a desired relation between the calculated amplitude (or the calculated power) and the Q compensation coefficient will be provided therein as a reference table. The I compensation coefficients, the relation between the calculated amplitude and the I compensation coefficient, the Q compensation coefficients, and the relation between the calculated amplitude and the Q compensation coefficient are chosen to compensate for a signal distortion caused by a nonlinearity of the quadrature modulating portion 112.

One of the coefficient-representing digital signals is read out from the first section of the memory 104 in response to the address signal fed from the power calculating portion 102. The readout digital signal represents the I compensation coefficient which corresponds to the calculated amplitude given by the power calculating portion 102. Similarly, one of the coefficient-representing digital signals is read out from the second section of the memory 104 in response to the address signal fed from the power calculating portion 102. The readout digital signal represents the Q compensation coefficient which corresponds to the calculated amplitude given by the power calculating portion 102. In this way, a pair of the coefficient-representing digital signals is read out from the memory 104. A pair of the I and Q compensation coefficients represented by the readout digital signals is determined in accordance with the calculated amplitude given by the power calculating portion 102.

The memory 106 has a first section and a second section. The first section of the memory 106 stores digital signals representing predetermined I compensation coefficients respectively. In the first section of the memory 106, the coefficient-representing digital signals are stored in storage locations having different addresses, respectively. The first section of the memory 106 is designed so that a desired relation between the calculated amplitude (or the calculated power) and the I compensation coefficient will be provided therein as a reference table. The second section of the memory 106 stores digital signals representing predetermined Q compensation coefficients respectively. In the second section of the memory 106, the coefficient-representing digital signals are stored in storage locations having different addresses, respectively. The second section of the memory 106 is designed so that a desired relation between the calculated amplitude (or the calculated power) and the Q compensation coefficient will be provided therein as a reference table. The I compensation coefficients, the relation between the calculated amplitude and the I compensation coefficient, the Q compensation coefficients, and the relation between the calculated amplitude and the Q compensation coefficient are chosen to compensate for a signal distortion caused by a nonlinearity of the RF power amplifier 117.

One of the coefficient-representing digital signals is read out from the first section of the memory 106 in response to the address signal fed from the power calculating portion 102. The readout digital signal represents the I compensation coefficient which corresponds to the calculated amplitude given by the power calculating portion 102. Similarly, one of the coefficient-representing digital signals is read out from the second section of the memory 106 in response to the address signal fed from the power calculating portion 102. The readout digital signal represents the Q compensation coefficient which corresponds to the calculated amplitude given by the power calculating portion 102.

In this way, a pair of the coefficient-representing digital signals is read out from the memory 106. A pair of the I and Q compensation coefficients represented by the readout digital signals is determined in accordance with the calculated amplitude given by the power calculating portion 102.

The compensation-coefficient calculating portion 108 receives the readout digital signals (the output signals) from the memories 104 and 106. The compensation-coefficient calculating portion 108 computes a pair of final I and Q compensation coefficients from a pair of the I and Q compensation coefficients represented by the output signals of the memory 104 and a pair of the I and Q compensation coefficients represented by the output signals of the memories 106. Specifically, the compensation-coefficient calculating portion 108 executes product or multiplication between a pair of the I and Q compensation coefficients represented by the output signals of the memory 104, and a pair of the I and Q compensation coefficients represented by the output signals of the memory 106, and computes a pair of a final I compensation coefficients Ci and a final Q compensation coefficient Cq according to the following equations.

$$Ci = Ai \cdot Bi - Aq \cdot Bq$$

$$Cq = Aq \cdot Bi + Ai \cdot Bq$$

where Ai denotes the I compensation coefficient represented by the output signal of the memory 104; Aq denotes the 9 compensation coefficient represented by the output signal of the memory 104; Bi denotes the I compensation coefficient represented by the output signal of the memory 106; and Bq denotes the Q compensation coefficient represented by the output signal of the memory 106. The compensation-coefficient calculating portion 108 generates digital signals representing a pair of the computed final I and Q compensation coefficients. The compensation-coefficient calculating portion 108 outputs the coefficient-representing digital signals to the distortion compensating portion 110.

Figure 2:
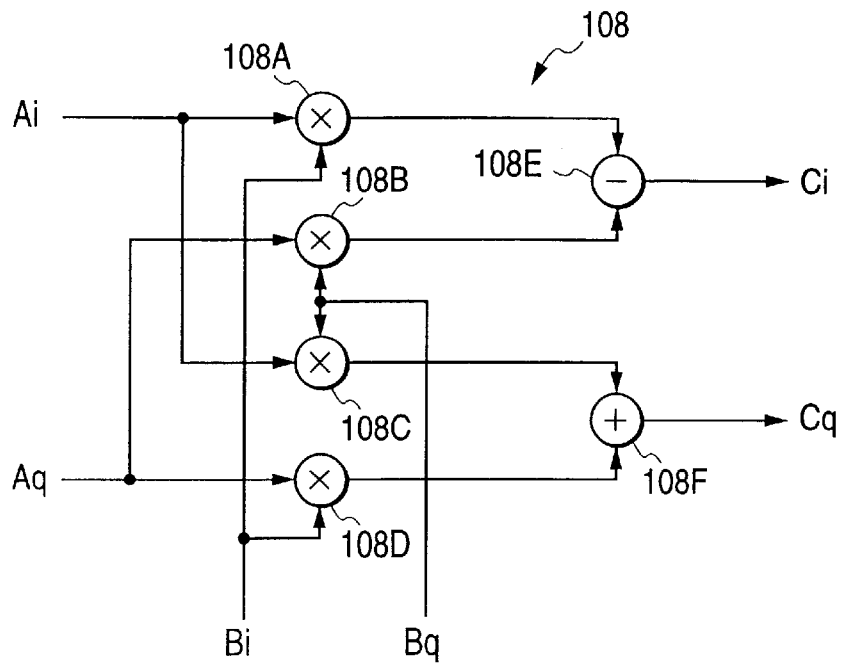
FIG. 2 is a block diagram of a compensation-coefficient calculating portion in FIG. 1.

As shown in FIG. 2, the compensation-coefficient calculating portion 108 includes multipliers 108A, 108B, 108C, and 108D, a subtracter 108E, and an adder 108F. The multiplier 108A receives the output signal of the memory 104 which represents the I compensation coefficient Ai. The multiplier 108A receives the output signal of the memory 106 which represents the I compensation coefficient Bi. The device 108A multiplies the I compensation coefficient Ai and the I compensation coefficient Bi, and provides a multiplication result Ai·Bi. The multiplier 108A outputs a signal to the subtracter 108E which represents the multiplication result Ai·Bi. The multiplier 108B receives the output signal of the memory 104 which represents the Q compensation coefficient Aq. The multiplier 108B receives the output signal of the memory 106 which represents the Q compensation coefficient Bq. The device 108B multiplies the Q compensation coefficient Aq and the Q compensation coefficient Bq, and provides a multiplication result Aq·Bq. The multiplier 108B outputs a signal to the subtracter 108E which represents the multiplication result Aq·Bq. The device 108E subtracts the multiplication result Aq·Bq from the multiplication result Ai·Bi, and provides a subtraction result Ai·Bi−Aq·Bq equal to the final I compensation coefficient Ci. The subtracter 108E outputs a digital signal to the distortion compensating portion 110 which represents the final I compensation coefficient Ci (Ci=Ai·Bi−Aq·Bq). The multiplier 108C receives the output signal of the memory 104 which represents the I compensation coefficient Ai. The multiplier 108C receives the output signal of the memory 106 which represents the Q compensation coefficient Bq. The device 108C multiplies the I compensation coefficient Ai and the Q compensation coefficient Bq, and provides a multiplication result Ai·Bq. The multiplier 108C outputs a signal to the adder 108F which represents the multiplication result Ai·Bq. The multiplier 108D receives the output signal of the memory 104 which represents the Q compensation coefficient Aq. The multiplier 108D receives the output signal of the memory 106 which represents the I compensation coefficient Bi. The device 108D multiplies the Q compensation coefficient Aq and the I compensation coefficient Bi, and provides a multiplication result Aq·Bi. The multiplier 108D outputs a signal to the adder 108F which represents the multiplication result Aq·Bi. The device 108F adds the multiplication result Ai·Bq and the multiplication result Aq·Bi, and provides an addition result Ai·Bq+Aq·Bi equal to the final Q compensation coefficient Cq. The adder 108F outputs a digital signal to the distortion compensating portion 110 which represents the final Q compensation coefficient Cq (Cq=Ai·Bq+Aq·Bi).

The distortion compensating portion 110 corrects the input digital baseband I signal and the input digital baseband Q signal into a compensation-resultant digital baseband I signal and a compensation-resultant digital baseband Q signal in response to the final I and Q compensation coefficients Ci and Cq represented by the output signals of the compensation-coefficient calculating portion 108. Specifically, the distortion compensating portion 110 executes product or multiplication between a pair of the I and Q amplitude values represented by the input baseband I and Q signals, and a pair of the final I and Q compensation coefficients Ci and Cq represented by the output signals of the compensation-coefficient calculating portion 108, and computes a pair of an I compensation-resultant amplitude value Di and a Q compensation-resultant amplitude value Dq according to the following equations.

$$Di=Ci·I-Cq·Q$$

$$Dq=Cq·I+Ci·Q$$

where "I" denotes the amplitude value of the input baseband I signal, and "Q" denotes the amplitude value of the input baseband Q signal. The distortion compensating portion 110 generates a compensation-resultant digital baseband I signal and a compensation-resultant digital baseband Q signal which represent the I compensation-resultant amplitude value Di and the Q compensation-resultant amplitude value Dq respectively. The distortion compensating portion 110 outputs the compensation-resultant digital baseband I signal and the compensation-resultant digital baseband Q signal to the quadrature modulating portion 112.

Figure 3:
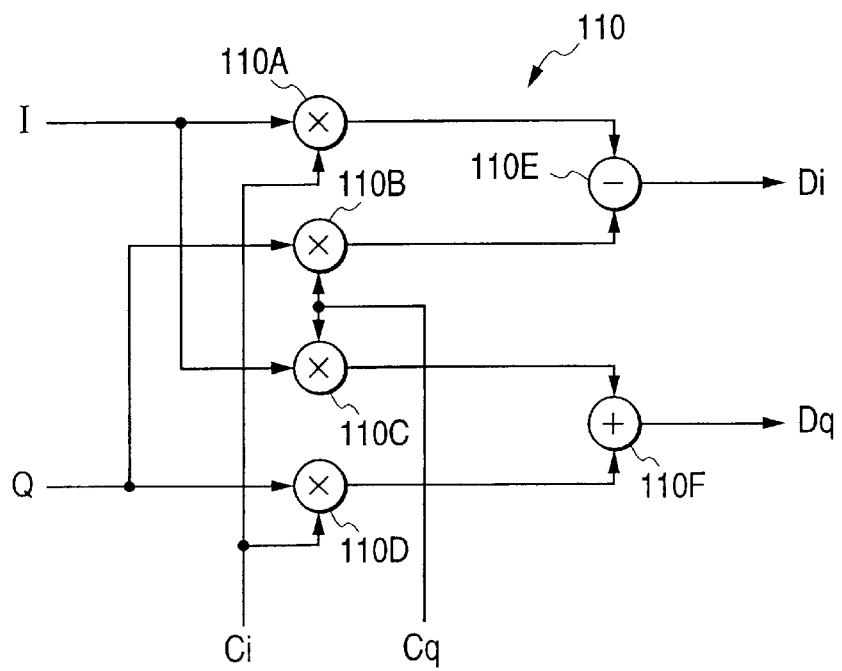
FIG. 3 is a block diagram of a distortion compensating portion in FIG. 1.

As shown in FIG. 3, the distortion compensating portion 110 includes multipliers 110A, 110B, 110C, and 110D, a subtracter 110E, and an adder 110F. The multiplier 110A receives the input baseband I signal which represents the I amplitude value. The multiplier 110A receives the output signal of the compensation-coefficient calculating portion 108 which represents the final I compensation coefficient Ci. The device 110A multiplies the I amplitude value and the final I compensation coefficient Ci, and provides a multiplication result Ci·I. The multiplier 110A outputs a signal to the subtracter 110E which represents the multiplication result Ci·I. The multiplier 110B receives the input baseband Q signal which represents the Q amplitude value. The multiplier 110B receives the output signal of the compensation-coefficient calculating portion 108 which represents the final Q compensation coefficient Cq. The device 110B multiplies the Q amplitude value and the final Q compensation coefficient Cq, and provides a multiplication result Cq·Q. The multiplier 110B outputs a signal to the subtracter 110E which represents the multiplication result Cq·B. The device 110E subtracts the multiplication result Cq·Q from the multiplication result Ci·I, and provides a subtraction result Ci·I−Cq·Q equal to the I compensation-resultant amplitude value Di. The subtracter 110E outputs a compensation-resultant digital baseband I signal to the quadrature modulating portion 112 which represents the I compensation-resultant amplitude value Di (Di=Ci·I−Cq·Q). The multiplier 110C receives the input baseband I signal which represents the I amplitude value. The multiplier 110C receives the output signal of the compensation-coefficient calculating portion 108 which represents the final Q compensation coefficient Cq. The device 110C multiplies the I amplitude value and the final Q compensation coefficient Cq, and provides a multiplication result Cq·I. The multiplier 110C outputs a signal to the adder 110F which represents the multiplication result Cq·I. The multiplier 110D receives the input baseband Q signal which represents the Q amplitude value. The multiplier 110D receives the output signal of the compensation-coefficient calculating portion 108 which represents the final I compensation coefficient Ci. The device 110D multiplies the Q amplitude value and the final I compensation coefficient Ci, and provides a multiplication result Ci·Q. The multiplier 110D outputs a signal to the adder 110F which represents the multiplication result Ci·Q. The device 110F adds the multiplication result Cq·I and the multiplication result Ci·Q, and provides an addition result Cq·I+Ci·Q equal to the Q compensation-resultant amplitude value Dq. The adder 110F outputs a compensation-resultant digital baseband Q signal to the quadrature modulating portion 112 which represents the Q compensation-resultant amplitude value Dq (Dq=Cq·I+Ci·Q).

Preferably, the input digital baseband I and Q signals are fed via delay circuits (not shown) to the distortion compensating portion 110. The delay circuits provide temporal matching between a pair of the digital baseband I and Q signals applied to the distortion compensating portion 110 and a pair of the coefficient-representing signals applied to the distortion compensating portion 110.

The D/A converter 111A in the quadrature modulating potion 112 receives the compensation-resultant digital baseband I signal from the distortion compensating portion 110. The D/A converter 111A changes the compensation-resultant digital baseband I signal into a corresponding analog baseband I signal. The D/A converter 111A outputs the analog baseband I signal to the quadrature modulator 113. The D/A converter 111B in the quadrature modulating potion 112 receives the compensation-resultant digital baseband Q signal from the distortion compensating portion 110. The D/A converter 111B changes the compensation-resultant digital baseband Q signal into a corresponding analog baseband Q signal. The D/A converter 111B outputs the analog baseband Q signal to the quadrature modulator 113.

The quadrature modulator 113 in the quadrature modulating portion 112 responds to a pair of RF carriers which are quadrature with respect to each other. The device 113 modulates the carriers in accordance with the analog baseband I and Q signals through a quadrature modulation process, thereby generating an RF modulation-resultant signal. In this way, the quadrature modulator 113 converts the analog baseband I and Q signal into the RF modulation-resultant signal. The quadrature modulator 113 outputs the RF modulation-resultant signal to the amplifier circuit 115. The amplifier circuit 115 amplifies the output signal of the quadrature modulator 113. The amplifier 115 feeds the amplification-resultant signal to the RF power amplifier 117 as an output signal of the quadrature modulating portion 112.

The RF power amplifier 117 enlarges the output signal of the quadrature modulating portion 112. The RF power amplifier 117 feeds the resultant signal to, for example, an antenna (not shown). The antenna radiates the signal fed from the RF power amplifier 117.

The distortion compensating portion 110 responds to the compensation coefficients fed from the memory 104, and operates to prevent the output signal of the quadrature modulating portion 112 from being distorted by the nonlinearity of the quadrature modulating portion 112. In addition, the distortion compensating portion 110 responds to the compensation coefficients fed from the memory 106, and operates to prevent the output signal of the RF power amplifier 117 from being distorted by the nonlinearity of the RF power amplifier 117. Accordingly, the distortion compensating portion 110 serves to compensate for signal distortions caused by the nonlinearities of the quadrature modulating portion 112 and the RF power amplifier 117.

Second Embodiment

Figure 4:
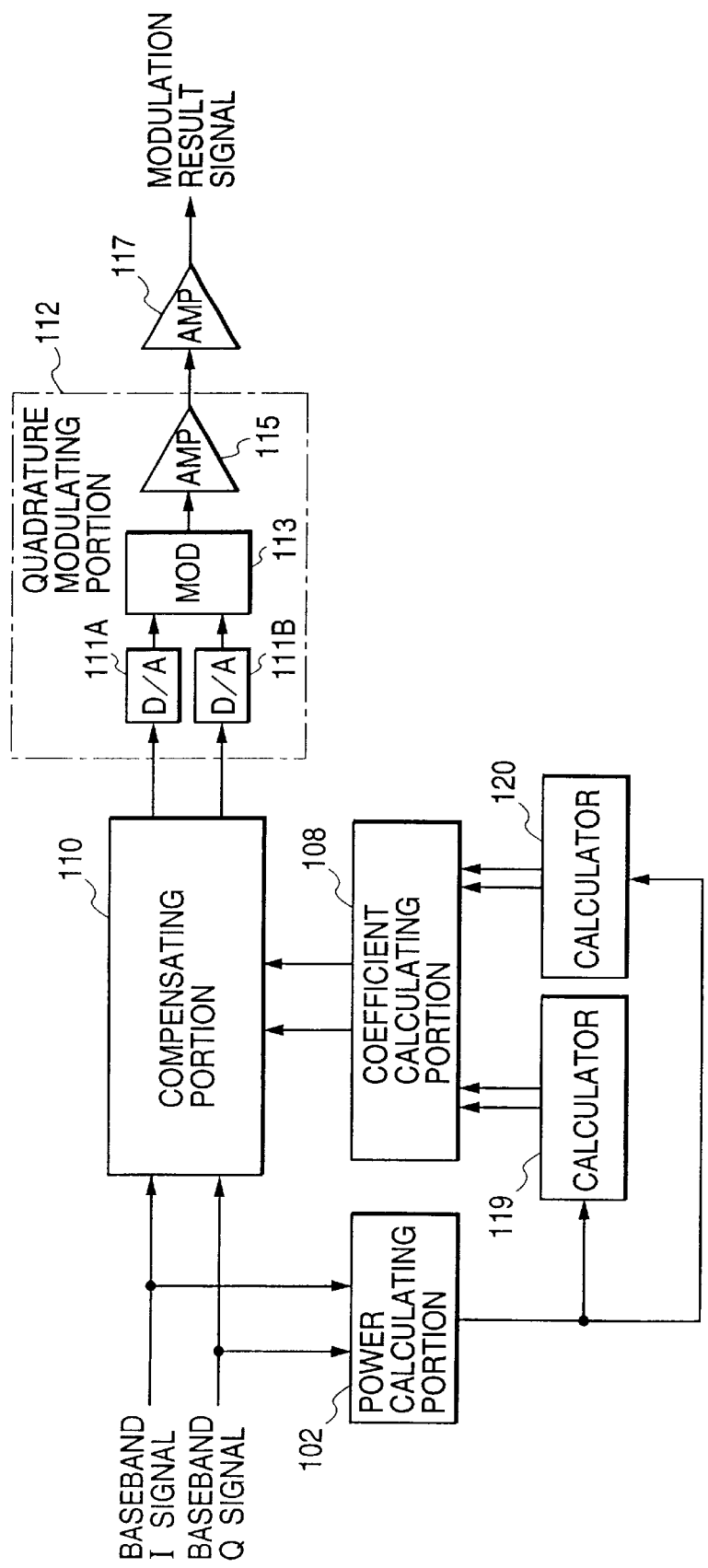
FIG. 4 is a block diagram of a portion of a radio transmitter equipped with a nonlinearity-caused distortion compensating system according to a second embodiment of this invention.

FIG. 4 shows a second embodiment of this invention which is similar to the embodiment of FIG. 1 except that calculators 119 and 120 replace the memories 104 and 106 (see FIG. 1).

The calculator 119 receives the output signal of the power calculating portion 102 which represents the calculated amplitude (or the calculated power). The device 119 calculates an I compensation coefficient Ai and a Q compensation coefficient Aq from the calculated amplitude (or the calculated power) according to predetermined equations. These equations are designed so that the calculated I and Q compensation coefficients Ai and Aq will be effective in compensating for a signal distortion caused by the nonlinearity of the quadrature modulating portion 112. The calculator 119 generates digital signals representing the calculated I and Q compensation coefficients Ai and Aq. The calculator 119 outputs the coefficient-representing digital signals to the compensation-coefficient calculating portion 108.

The calculator 120 receives the output signal of the power calculating portion 102 which represents the calculated amplitude (or the calculated power). The device 120 calculates an I compensation coefficient Bi and a Q compensation coefficient Bq from the calculated amplitude (or the calculated power) according to predetermined equations. These equations are designed so that the calculated I and Q compensation coefficients Bi and Bq will be effective in compensating for a signal distortion caused by the nonlinearity of the RF power amplifier 117. The calculator 120 generates digital signals representing the calculated I and Q compensation coefficients Bi and Bq. The calculator 120 outputs the coefficient-representing digital signals to the compensation-coefficient calculating portion 108.

Third Embodiment

Figure 5:
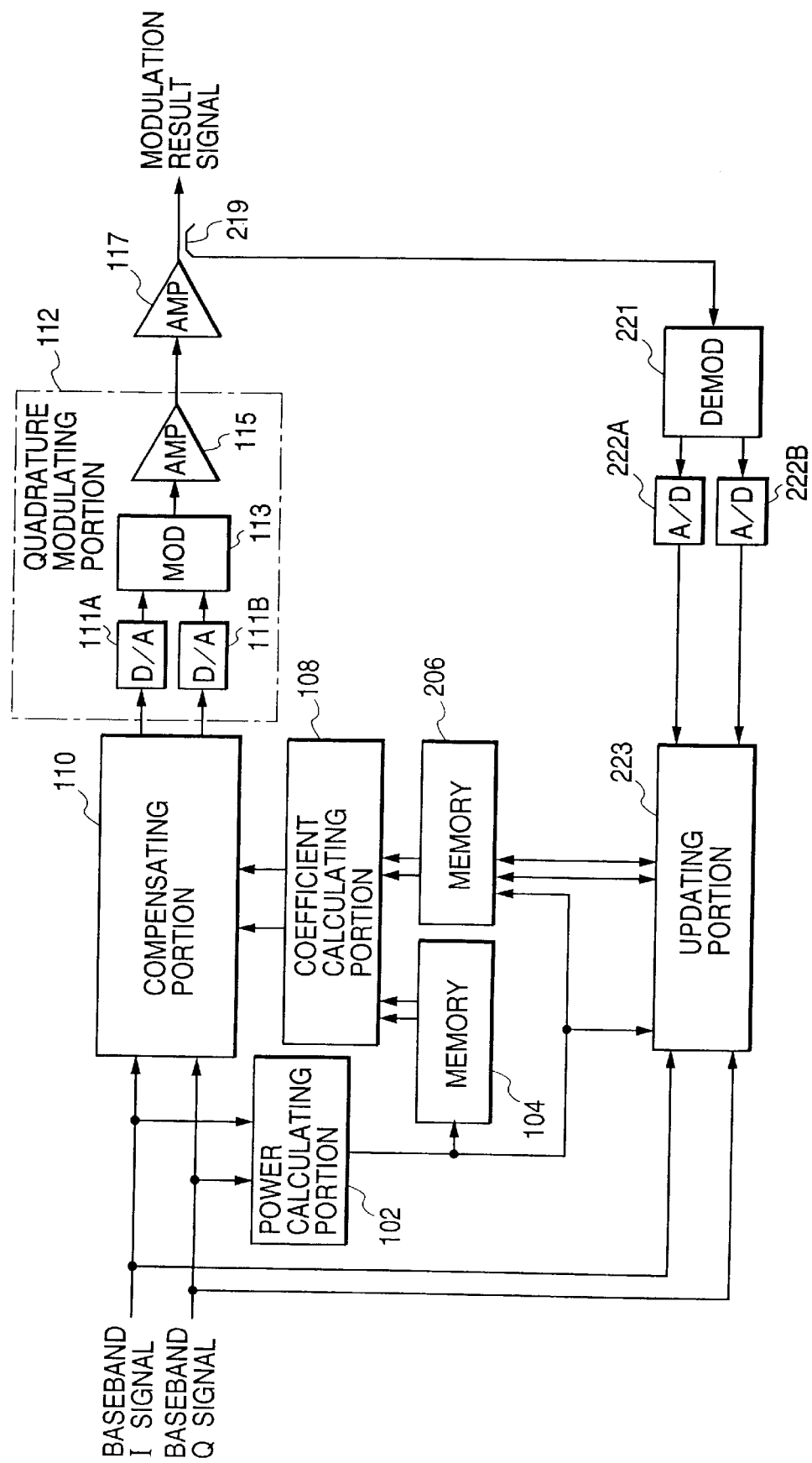
FIG. 5 is a block diagram of a portion of a radio transmitter equipped with a nonlinearity-caused distortion compensating system according to a third embodiment of this invention.

FIG. 5 shows a third embodiment of this invention which is similar to the embodiment of FIG. 1 except for design changes indicated hereinafter. The embodiment of FIG. 5 includes a read/write memory 206 which replaces the memory 106 (see FIG. 1). The embodiment of FIG. 5 includes a signal divider 219, a quadrature demodulator 221, analog-to-digital (A/D) converters 222A and 222B, and a coefficient updating portion 223.

The signal divider 219 is associated with a signal transmission line extending from the output terminal of the RF power amplifier 117. The signal divider 219 is connected to the quadrature demodulator 221. The quadrature demodulator 221 is connected to the A/D converters 222A and 222B. The A/D converters 222A and 222B are connected to the coefficient updating portion 223. The coefficient updating portion 223 is connected to the power calculating portion 102 and the memory 206.

The memory 206 has a first section and a second section. The first section of the memory 206 stores digital signals representing I compensation coefficients respectively. As will be made clear later, the I compensation coefficients can be updated from predetermined initial values. In the first section of the memory 206, the coefficient-representing digital signals are stored in storage locations having different addresses, respectively. The first section of the memory 206 is designed so that a desired relation between the calculated amplitude (or the calculated power) and the I compensation coefficient will be provided therein as a reference table. The second section of the memory 206 stores digital signals representing Q compensation coefficients respectively. As will be made clear later, the Q compensation coefficients can be updated from predetermined initial values. In the second section of the memory 206, the coefficient-representing digital signals are stored in storage locations having different addresses, respectively. The second section of the memory 206 is designed so that a desired relation between the calculated amplitude (or the calculated power) and the Q compensation coefficient will be provided therein as a reference table. The I compensation coefficients, the relation between the calculated amplitude and the I compensation coefficient, the Q compensation coefficients, and the relation between the calculated amplitude and the Q compensation coefficient are chosen to compensate for a signal distortion caused by the nonlinearity of the RF power amplifier 117.

One of the coefficient-representing digital signals is read out from the first section of the memory 206 in response to the address signal fed from the power calculating portion 102. The readout digital signal represents the I compensation coefficient which corresponds to the calculated amplitude given by the power calculating portion 102. Similarly, one of the coefficient-representing digital signals is read out from the second section of the memory 206 in response to the address signal fed from the power calculating portion 102. The readout digital signal represents the Q compensation coefficient which corresponds to the calculated amplitude given by the power calculating portion 102. In this way, a pair of the coefficient-representing digital signals is read out from the memory 206. A pair of the I and Q compensation coefficients represented by the readout digital signals is determined in accordance with the calculated amplitude given by the power calculating portion 102.

The signal divider 219 separates a small portion from the output signal of the RF power amplifier 117, and feeds the separated small signal portion to the quadrature demodulator 221. The device 221 demodulates the portion of the output signal of the RF power amplifier 117 into analog baseband I and Q signals. The quadrature demodulator 221 outputs the analog baseband I signal to the A/D converter 222A. The quadrature demodulator 221 outputs the analog baseband Q signal to the A/D converter 222B. The A/D converter 222A changes the analog baseband I signal into a corresponding digital baseband I signal. The A/D converter 222A outputs the digital baseband I signal to the coefficient updating portion 223 as a recovered digital baseband I signal. The A/D converter 222B changes the analog baseband Q signal into a corresponding digital baseband Q signal. The A/D converter 222B outputs the digital baseband Q signal to the coefficient updating portion 223 as a recovered digital baseband Q signal.

The coefficient updating portion 223 receives the input digital baseband I and Q signals. The coefficient updating portion 223 calculates an error between a pair of the input digital baseband I and Q signals and a pair of the recovered digital baseband I and Q signals. The coefficient updating portion 223 calculates a pair of new I and Q compensation coefficients from the calculated error. The new I and Q compensation coefficients are designed to nullify the error. The coefficient updating portion 223 generates new digital signals representing the new I and Q compensation coefficients respectively. The coefficient updating portion 223 outputs a pair of the new coefficient-representing digital signals to the memory 206. In the memory 206, the new coefficient-representing digital signals replaces the old coefficient-representing digital signals which represent the old I and Q compensation coefficients designated by or corresponding to the calculated amplitude given by the power calculating portion 102. Accordingly, in the memory 206, a pair of the I and Q compensation coefficients corresponding to the calculated amplitude is renewed or updated in response to the output signals of the coefficient updating portion 223.

Preferably, the input digital baseband I and Q signals are fed via delay circuits (not shown) to the coefficient updating portion 223. The delay circuits provide temporal matching between a pair of the input digital baseband I and Q signals applied to the coefficient updating portion 223 and a pair of the recovered digital baseband I and Q signals applied to the coefficient updating portion 223.

The coefficient updating portion 223 includes, for example, a digital signal processor or a microcomputer having a combination of an input/output port, a signal processing section, a RAM (a random access memory), and a ROM (a read-only memory). In this case, the digital signal processor or the microcomputer operates in accordance with a program stored in the ROM. The program is designed to implement the previously-mentioned steps of operation of the coefficient updating portion 223.

Fourth Embodiment

Figure 6:
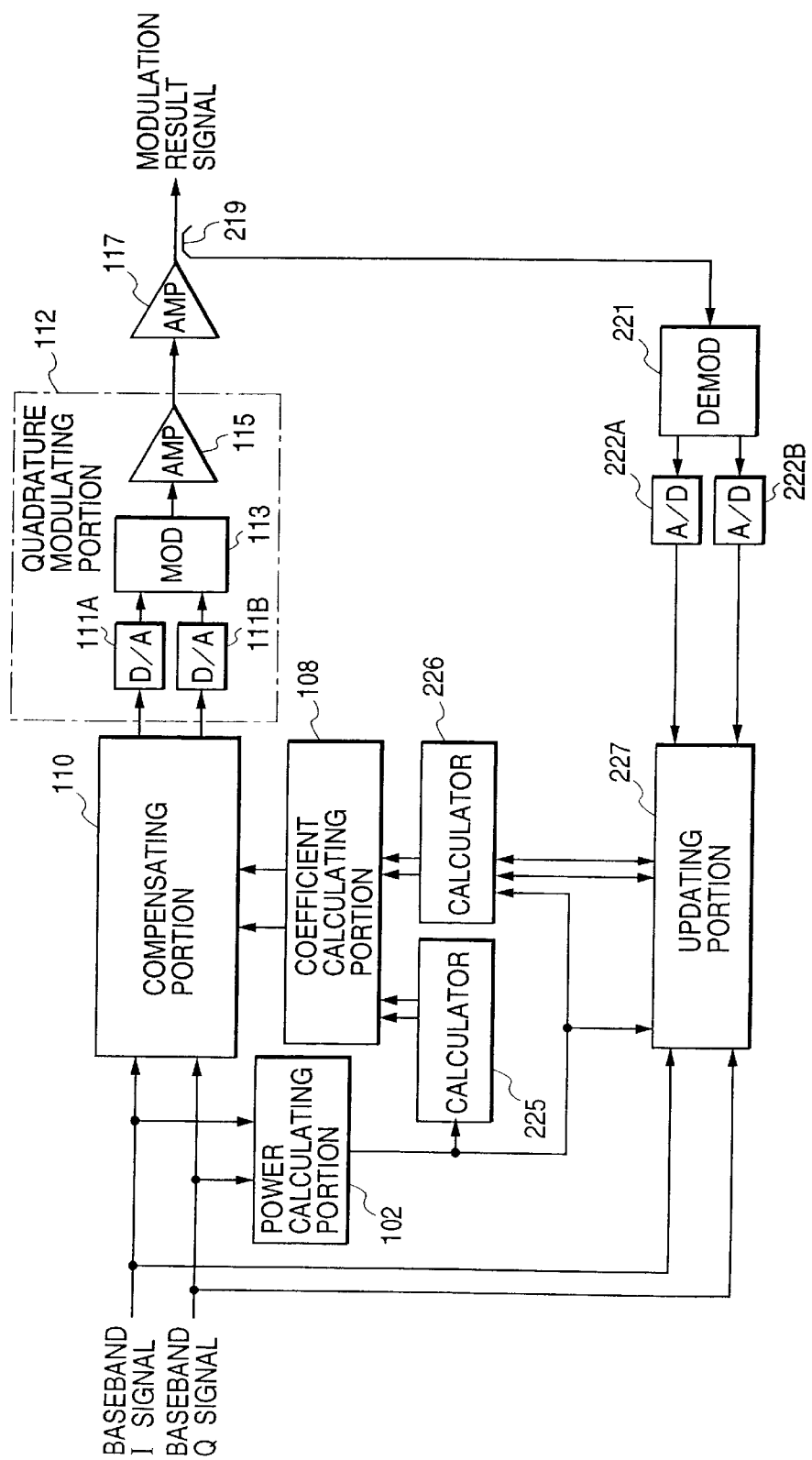
FIG. 6 is a block diagram of a portion of a radio transmitter equipped with a nonlinearity-caused distortion compensating system according to a fourth embodiment of this invention.

FIG. 6 shows a fourth embodiment of this invention which is similar to the embodiment of FIG. 5 except for design changes indicated hereinafter. The embodiment of FIG. 6 includes a calculator 225 instead of the memory 104 (see FIG. 5). In addition, the embodiment of FIG. 6 includes a calculator 226 and an equation updating portion 227 instead of the memory 206 and the coefficient updating portion 223 (see FIG. 5) respectively.

The calculator 225 receives the output signal of the power calculating portion 102 which represents the calculated amplitude (or the calculated power). The device 225 calculates an I compensation coefficient Ai and a Q compensation coefficient Aq from the calculated amplitude (or the calculated power) according to predetermined equations. These equations are designed so that the calculated I and Q compensation coefficients Ai and Aq will be effective in compensating for a signal distortion caused by the nonlinearity of the quadrature modulating portion 112. The calculator 225 generates digital signals representing the calculated I and Q compensation coefficients Ai and Aq. The calculator 225 outputs the coefficient-representing digital signals to the compensation-coefficient calculating portion 108.

The calculator 226 receives the output signal of the power calculating portion 102 which represents the calculated amplitude (or the calculated power). The device 226 calculates an I compensation coefficient Bi and a Q compensation coefficient Bq from the calculated amplitude (or the calculated power) according to I and Q equations. The I and Q equations are designed so that the calculated I and Q compensation coefficients Bi and Bq will be effective in compensating for a signal distortion caused by the nonlinearity of the RF power amplifier 117. As will be made clear later, the I and Q equations can be updated from predetermined initial states. The calculator 226 generates digital signals representing the calculated I and Q compensation coefficients Bi and Bq. The calculator 226 outputs the coefficient-representing digital signals to the compensation-coefficient calculating portion 108.

The equation updating portion 227 calculates an error between a pair of the input digital baseband I and Q signals and a pair of the recovered digital baseband I and Q signals. The equation updating portion 227 accesses the calculator 226, and updates the I and Q equations in response to the calculated error. For example, coefficients in the I and Q equations are updated. The updating of the I and Q equations is designed to nullify the error.

The equation updating portion 227 includes, for example, a digital signal processor or a microcomputer having a combination of an input/output port, a signal processing section, a RAM, and a ROM. In this case, the digital signal processor or the microcomputer operates in accordance with a program stored in the ROM. The program is designed to implement the previously-mentioned steps of operation of the equation updating portion 227.

Fifth Embodiment

Figure 7:
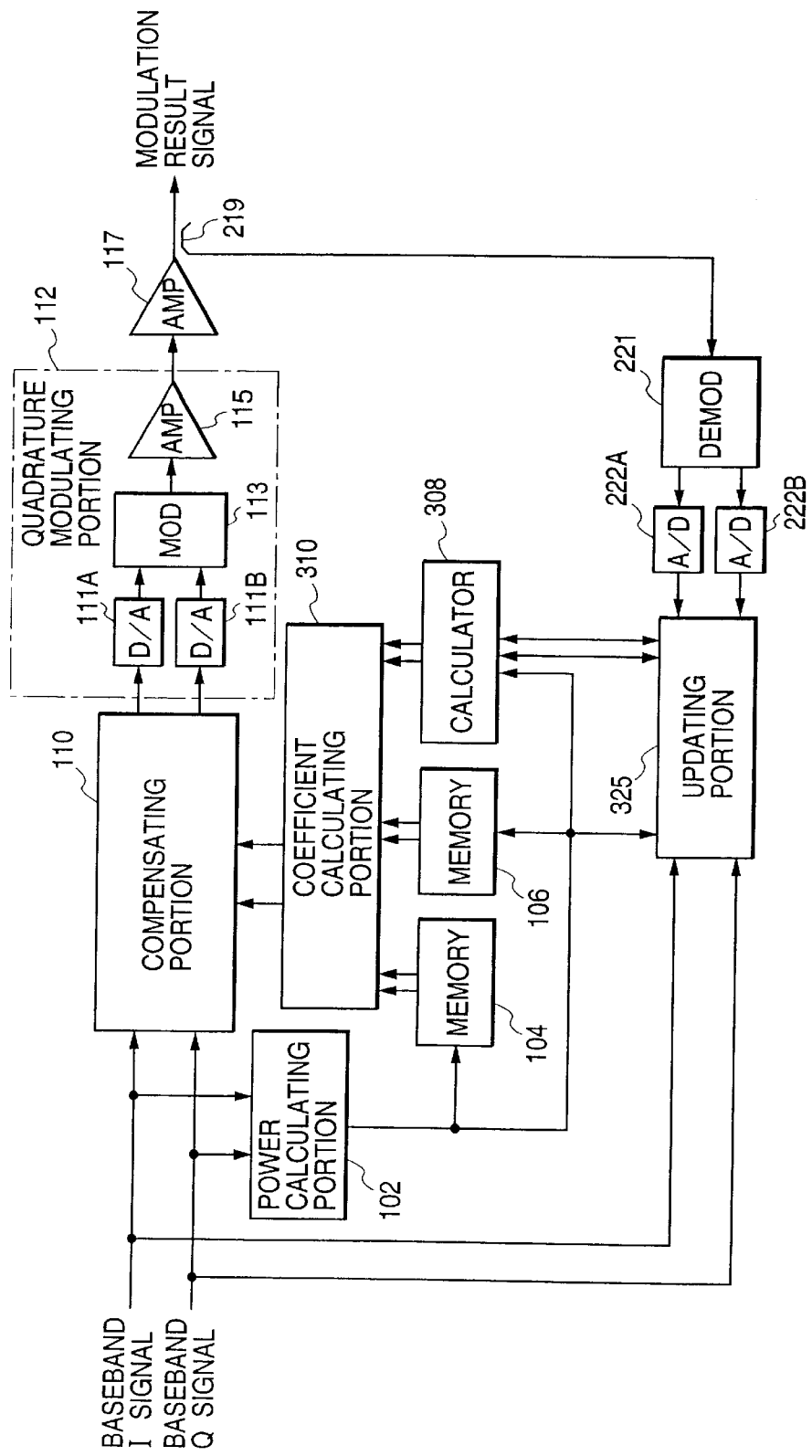
FIG. 7 is a block diagram of a portion of a radio transmitter equipped with a nonlinearity-caused distortion compensating system according to a fifth embodiment of this invention.

FIG. 7 shows a fifth embodiment of this invention which is similar to the embodiment of FIG. 5 except for design changes indicated hereinafter. The embodiment of FIG. 7 includes a read-only memory 106 instead of the memory 206 (see FIG. 5). The memory 106 in FIG. 7 is similar to the memory 106 in FIG. 1. The embodiment of FIG. 7 includes a compensation-coefficient calculating portion 310 and an equation updating portion 325 instead of the compensation-coefficient calculating portion 108 and the coefficient updating portion 223 (see FIG. 5) respectively. The embodiment of FIG. 7 includes a calculator 308 connected among the power calculating portion 102, the compensation-coefficient calculating portion 310, and the equation updating portion 325.

The calculator 308 receives the output signal of the power calculating portion 102 which represents the calculated amplitude (or the calculated power). The device 308 calculates an I compensation coefficient and a Q compensation coefficient from the calculated amplitude (or the calculated power) according to I and equations. The I and Q equations are designed so that the calculated I and Q compensation coefficients will be effective in compensating for a variation in characteristics of at least one of the quadrature modulating portion 112 and the RF power amplifier 117. As will be made clear later, the I and Q equations can be updated from predetermined initial states. The calculator 308 generates digital signals representing the calculated I and Q compensation coefficients. The calculator 308 outputs the coefficient-representing digital signals to the compensation-coefficient calculating portion 310.

The compensation-coefficient calculating portion 310 receives the readout digital signals (the output signals) from the memories 104 and 106. The compensation-coefficient calculating portion 310 computes a pair of final I and Q compensation coefficients from a pair of the I and Q compensation coefficients represented by the output signals of the memory 104, a pair of the I and Q compensation coefficients represented by the output signals of the memories 106, and a pair of the I and Q compensation coefficients represented by the output signals of the calculator 308. The computation of a pair of the final I and Q compensation coefficients is implemented by executing product or multiplication among a pair of the I and Q compensation coefficients represented by the output signals of the memory 104, a pair of the I and Q compensation coefficients represented by the output signals of the memories 106, and a pair of the I and Q compensation coefficients represented by the output signals of the calculator 308. The compensation-coefficient calculating portion 310 generates digital signals representing a pair of the computed final I and Q compensation coefficients. The compensation-coefficient calculating portion 310 outputs the coefficient-representing digital signals to the distortion compensating portion 110.

The equation updating portion 325 calculates an error between a pair of the input digital baseband I and Q signals and a pair of the recovered digital baseband I and Q signals. The equation updating portion 325 accesses the calculator 308, and updates the I and Q equations in response to the calculated error. For example, coefficients in the I and Q equations are updated. The updating of the I and Q equations is designed to nullify the error.

Sixth Embodiment

Figure 8:
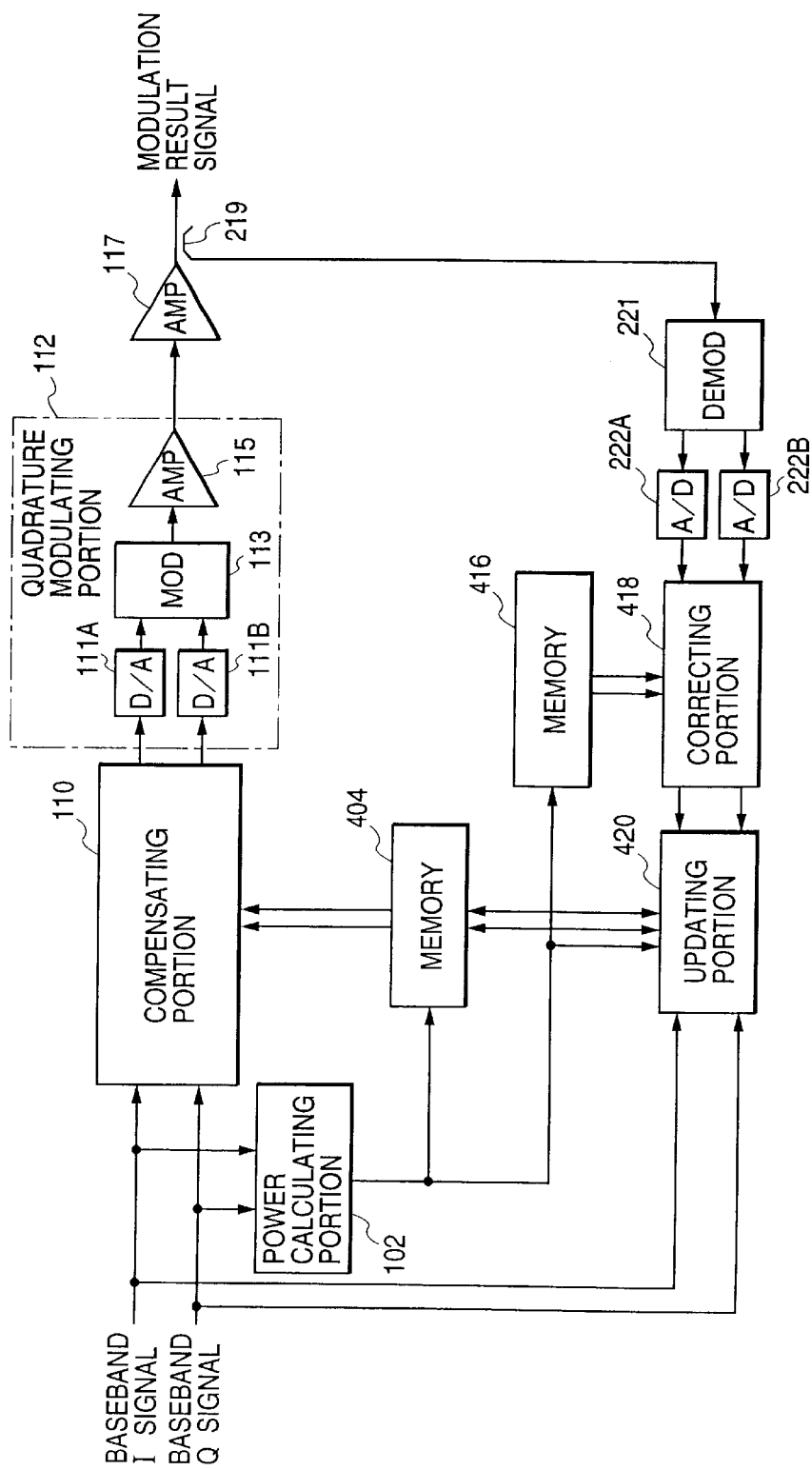
FIG. 8 is a block diagram of a portion of a radio transmitter equipped with a nonlinearity-caused distortion compensating system according to a sixth embodiment of this invention.

FIG. 8 shows a sixth embodiment of this invention which is similar to the embodiment of FIG. 5 except for design changes indicated hereinafter. The embodiment of FIG. 8 includes a read/write memory 404 instead of the memories 104 and 206 (see FIG. 5). The embodiment of FIG. 8 includes a coefficient updating portion 420 instead of the coefficient updating portion 223 (see FIG. 5). The embodiment of FIG. 8 further includes a read-only memory 416 and a signal correcting portion 418. The compensation-coefficient calculating portion 108 (see FIG. 5) is omitted from the embodiment of FIG. 8.

The memory 404 is connected among the power calculating portion 102, the distortion compensating portion 110, and the coefficient updating portion 420, The memory 416 is connected to the power calculating portion 102 and the signal correcting portion 418. The signal correcting portion 418 is connected to the A/D converters 222A and 222B. The signal correcting portion 418 is also connected to the coefficient updating portion 420.

The memory 404 has a first section and a second section. The first section of the memory 404 stores digital signals representing I compensation coefficients respectively. As will be made clear later, the I compensation coefficients can be updated from predetermined initial values. In the first section of the memory 404, the coefficient-representing digital signals are stored in storage locations having different addresses, respectively. The first section of the memory 404 is designed so that a desired relation between the calculated amplitude (or the calculated power) and the I compensation coefficient will be provided therein as a reference table. The second section of the memory 404 stores digital signals representing Q compensation coefficients respectively. As will be made clear later, the Q compensation coefficients can be updated from predetermined initial values. In the second section of the memory 404, the coefficient-representing digital signals are stored in storage locations having different addresses, respectively. The second section of the memory 404 is designed so that a desired relation between the calculated amplitude (or the calculated power) and the Q compensation coefficient will be provided therein as a reference table. The I compensation coefficients, the relation between the calculated amplitude and the I compensation coefficient, the Q compensation coefficients, and the relation between the calculated amplitude and the Q compensation coefficient are chosen to compensate for a signal distortion caused by the nonlinearity of the quadrature modulating portion 112.

It should be noted that the I compensation coefficients, the relation between the calculated amplitude and the I compensation coefficient, the Q compensation coefficients, and the relation between the calculated amplitude and the Q compensation coefficient may be chosen to compensate for signal distortions caused by the nonlinearity of the quadrature modulating portion 112 and the nonlinearity of the RF power amplifier 117.

One of the coefficient-representing digital signals is read out from the first section of the memory 404 in response to the address signal fed from the power calculating portion 102. The readout digital signal represents the I compensation coefficient which corresponds to the calculated amplitude given by the power calculating portion 102. Similarly, one of the coefficient-representing digital signals is read out from the second section of the memory 404 in response to the address signal fed from the power calculating portion 102. The readout digital signal represents the Q compensation coefficient which corresponds to the calculated amplitude given by the power calculating portion 102. In this way, a pair of the coefficient-representing digital signals is read out from the memory 404. A pair of the I and Q compensation coefficients represented by the readout digital signals is determined in accordance with the calculated amplitude given by the power calculating portion 102. A pair of the readout digital signals from the memory 404 is fed to the distortion compensating portion 110, and is used by the distortion compensating potion 110 as an indication of the final I and Q compensation coefficients.

The memory 416 has a first section and a second section. The first section of the memory 416 stores digital signals representing predetermined I corrective coefficients respectively. In the first section of the memory 416, the coefficient-representing digital signals are stored in storage locations having different addresses, respectively. The first section of the memory 416 is designed so that a desired relation between the calculated amplitude (or the calculated power) and the I corrective coefficient will be provided therein as a reference table. The second section of the memory 416 stores digital signals representing predetermined Q corrective coefficients respectively. In the second section of the memory 416, the coefficient-representing digital signals are stored in storage locations having different addresses, respectively. The second section of the memory 416 is designed so that a desired relation between the calculated amplitude (or the calculated power) and the Q corrective coefficient will be provided therein as a reference table. The I corrective coefficients, the relation between the calculated amplitude and the I corrective coefficient, the Q corrective coefficients, and the relation between the calculated amplitude and the Q corrective coefficient are chosen to correct a signal distortion caused by a nonlinearity of the quadrature demodulator 221.

One of the coefficient-representing digital signals is read out from the first section of the memory 416 in response to the address signal fed from the power calculating portion 102. The readout digital signal represents the I corrective coefficient which corresponds to the calculated amplitude given by the power calculating portion 102. Similarly, one of the coefficient-representing digital signals is read out from the second section of the memory 416 in response to the address signal fed from the power calculating portion 102. The readout digital signal represents the Q corrective coefficient which corresponds to the calculated amplitude given by the power calculating portion 102. In this way, a pair of the coefficient-representing digital signals is read out from the memory 416. A pair of the I and Q corrective coefficients represented by the readout digital signals is determined in accordance with the calculated amplitude given by the power calculating portion 102.

The signal correcting portion 418 receives the recovered digital baseband I signal and the recovered digital baseband Q signal from the A/D converters 222A and 222B. The signal correcting portion 418 receives the coefficient-representing digital signals from the memory 416. The signal correcting portion 418 corrects the recovered digital baseband I signal and the recovered digital baseband Q signal into a correction-resultant recovered digital baseband I signal and a correction-resultant recovered digital baseband Q signal in response to the I and Q corrective coefficients represented by the output signals of the memory 416. Specifically, the signal correcting portion 418 executes product or multiplication between a pair of the I and Q amplitude values represented by the recovered baseband I and Q signals and a pair of the I and Q corrective coefficients represented by the output signals of the memory 416, and thereby computes a pair of an I correction-resultant amplitude value and a Q correction-resultant amplitude value. The signal correcting portion 418 generates a correction-resultant recovered digital baseband I signal and a correction-resultant recovered digital baseband Q signal which represent the I correction-resultant amplitude value and the Q correction-resultant amplitude value respectively. The signal correction portion 418 outputs the correction-resultant recovered digital baseband I signal and the correction-resultant recovered digital baseband Q signal to the coefficient updating portion 420.

Preferably, a delay circuit or delay circuits (not shown) provide temporal matching between a pair of the recovered digital baseband I and Q signals applied to the signal correcting portion 418 and a pair of the coefficient-representing digital signals applied to the signal correcting portion 418.

The coefficient updating portion 420 receives the input digital baseband I and Q signals. The coefficient updating portion 420 calculates an error between a pair of the input digital baseband I and Q signals and a pair of the correction-resultant recovered digital baseband I and Q signals. The coefficient updating portion 420 calculates a pair of new I and Q compensation coefficients from the calculated error. The new I and Q compensation coefficients are designed to nullify the error. The coefficient updating portion 420 generates a pair of new digital signals representing the new I and Q compensation coefficients respectively. The coefficient updating portion 420 outputs the new coefficient-representing digital signals to the memory 404. In the memory 404, the new coefficient-representing digital signals replace the old coefficient-representing digital signals which represent the old I and Q compensation coefficients designated by or corresponding to the calculated amplitude given by the power calculating portion 102. Accordingly, in the memory 404, a pair of the I and Q compensation coefficients corresponding to the calculated amplitude is renewed or updated in response to the output signals of the coefficient updating portion 420.

Seventh Embodiment

Figure 9:
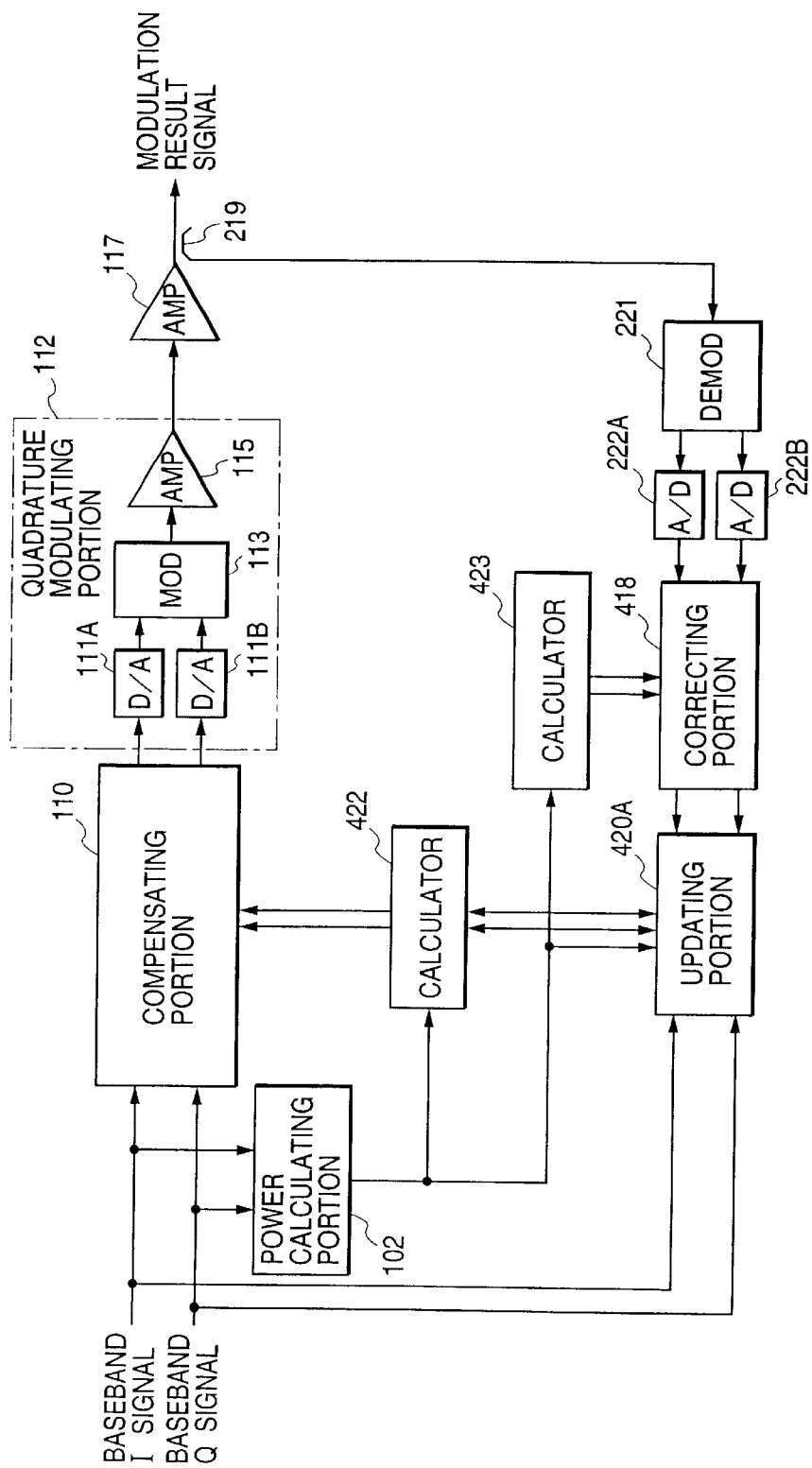
FIG. 9 is a block diagram of a portion of a radio transmitter equipped with a nonlinearity-caused distortion compensating system according to a seventh embodiment of this invention.

FIG. 9 shows a seventh embodiment of this invention which is similar to the embodiment of FIG. 8 except for design changes indicated hereinafter. The embodiment of FIG. 9 includes a calculator 423 instead of the memory 416 (see FIG. 8). In addition, the embodiment of FIG. 9 includes a calculator 422 and an equation updating portion 420A instead of the memory 404 and the coefficient updating portion 420 (see FIG. 8) respectively.

The calculator 423 receives the output signal of the power calculating portion 102 which represents the calculated amplitude (or the calculated power). The device 423 calculates an I corrective coefficient and a Q corrective coefficient from the calculated amplitude (or the calculated power) according to predetermined equations. These equations are designed so that the calculated I and Q corrective coefficients will be effective in correcting a signal distortion caused by the nonlinearity of the quadrature demodulator 221. The calculator 423 generates digital signals representing the calculated I and Q corrective coefficients. The calculator 423 outputs the coefficient-representing digital signals to the signal correcting portion 418.

The calculator 422 receives the output signal of the power calculating portion 102 which represents the calculated amplitude (or the calculated power). The device 422 calculates an I compensation coefficient and a Q compensation coefficient from the calculated amplitude (or the calculated power) according to I and Q equations. The I and Q equations are designed so that the calculated I and Q compensation coefficients will be effective in compensating for a signal distortion caused by at least one of the nonlinearity of the quadrature modulating portion 112 and the nonlinearity of the RF power amplifier 117. As will be made clear later, the I and Q equations can be updated from predetermined initial states. The calculator 422 generates digital signals representing the calculated I and Q compensation coefficients. The calculator 422 outputs the coefficient-representing digital signals to the distortion compensating portion 110.

The equation updating portion 420A calculates an error between a pair of the input digital baseband I and Q signals and a pair of the correction-resultant recovered digital baseband I and Q signals. The equation updating portion 420A accesses the calculator 422, and updates the I and Q equations in response to the calculated error. For example, coefficients in the I and Q equations are updated. The updating of the I and Q equations is designed to nullify the error.

Eighth Embodiment

Figure 10:
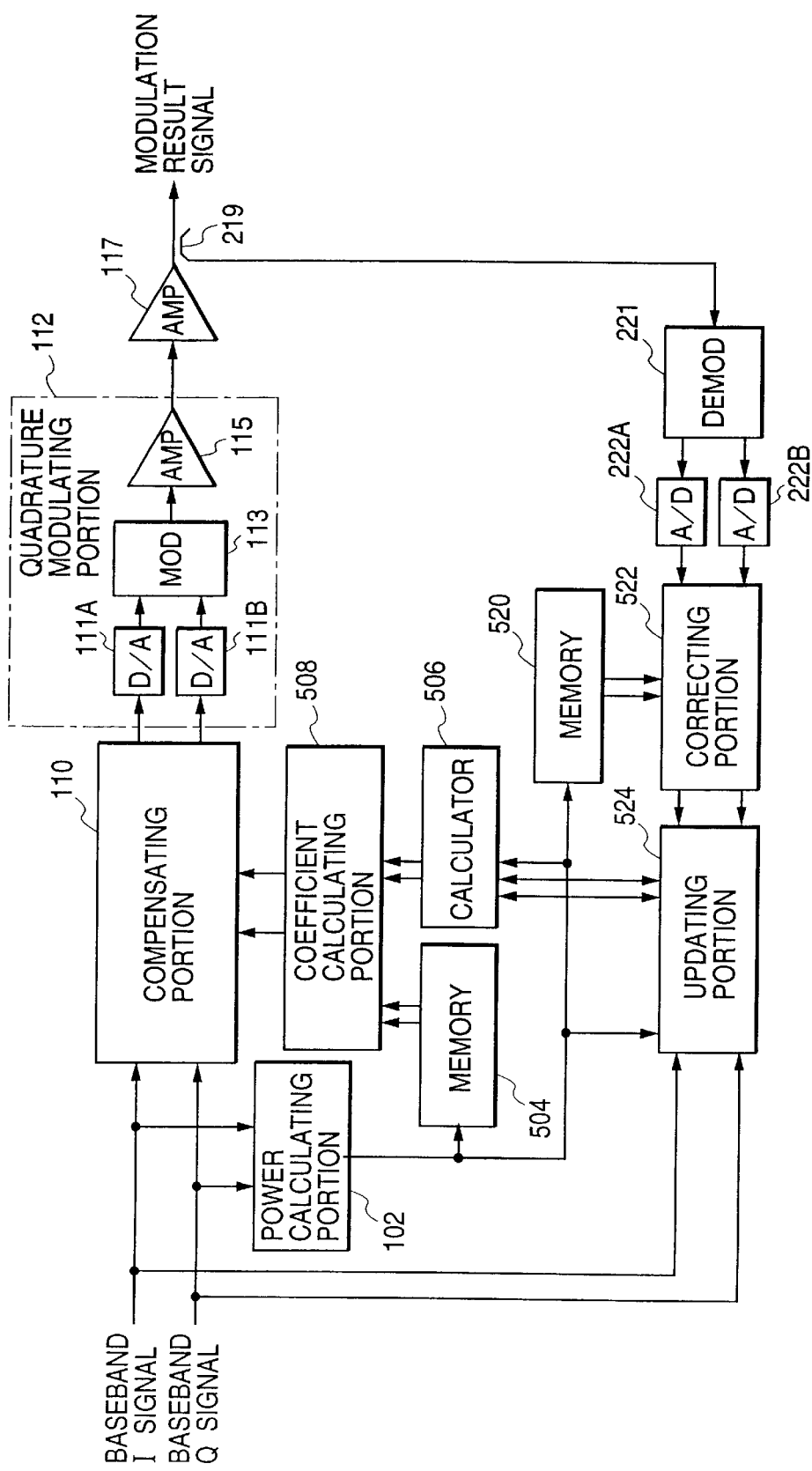
FIG. 10 is a block diagram of a portion of a radio transmitter equipped with a nonlinearity-caused distortion compensating system according to an eighth embodiment of this invention.

FIG. 10 shows an eighth embodiment of this invention which is similar to the embodiment of FIG. 5 except for design changes indicated hereinafter. The embodiment of FIG. 10 includes a read-only memory 504, a calculator 506, a compensation-coefficient calculating portion 508, and an equation updating portion 524 which replace the memory 104, the memory 206, the compensation-coefficient calculating portion 108, and the coefficient updating portion 223 (see FIG. 5) respectively. The embodiment of FIG. 10 further includes a read-only memory 520 and a signal correcting portion 522.

The memory 520 is connected to the power calculating portion 102 and the signal correcting portion 522. The signal correcting portion 522 is connected to the A/D converters 222A and 222B. The signal correcting portion 522 is also connected to the equation updating portion 524.

The memory 504 has a first section and a second section. The first section of the memory 504 stores digital signals representing predetermined I compensation coefficients respectively. In the first section of the memory 504, the coefficient-representing digital signals are stored in storage locations having different addresses, respectively. The first section of the memory 504 is designed so that a desired relation between the calculated amplitude (or the calculated power) and the I compensation coefficient will be provided therein as a reference table. The second section of the memory 504 stores digital signals representing predetermined Q compensation coefficients respectively. In the second section of the memory 504, the coefficient-representing digital signals are stored in storage locations having different addresses, respectively. The second section of the memory 504 is designed so that a desired relation between the calculated amplitude (or the calculated power) and the Q compensation coefficient will be provided therein as a reference table. The I compensation coefficients, the relation between the calculated amplitude and the I compensation coefficient, the Q compensation coefficients, and the relation between the calculated amplitude and the Q compensation coefficient are chosen to compensate for a signal distortion caused by the nonlinearity of the quadrature modulating portion 112.

It should be noted that the I compensation coefficients, the relation between the calculated amplitude and the I compensation coefficient, the Q compensation coefficients, and the relation between the calculated amplitude and the Q compensation coefficient may be chosen to compensate for signal distortions caused by the nonlinearity of the quadrature modulating portion 112 and the nonlinearity of the RF power amplifier 117.

One of the coefficient-representing digital signals is read out from the first section of the memory 504 in response to the address signal fed from the power calculating portion 102. The readout digital signal represents the I compensation coefficient which corresponds to the calculated amplitude given by the power calculating portion 102. Similarly, one of the coefficient-representing digital signals is read out from the second section of the memory 504 in response to the address signal fed from the power calculating portion 102. The readout digital signal represents the Q compensation coefficient which corresponds to the calculated amplitude given by the power calculating portion 102. In this way, a pair of the coefficient-representing digital signals is read out from the memory 504. A pair of the I and Q compensation coefficients represented by the readout digital signals is determined in accordance with the calculated amplitude given by the power calculating portion 102.

The calculator 506 receives the output signal of the power calculating portion 102 which represents the calculated amplitude (or the calculated power). The device 506 calculates an I compensation coefficient and a Q compensation coefficient from the calculated amplitude (or the calculated power) according to I and Q equations. The I and Q equations are designed so that the calculated I and Q compensation coefficients will be effective in compensating for a variation in characteristics of at least one of the quadrature modulating portion 112 and the RF power amplifier 117. As will be made clear later, the I and Q equations can be updated from predetermined initial states. The calculator 506 generates digital signals representing the calculated I and Q compensation coefficients. The calculator 506 outputs the coefficient-representing digital signals to the compensation-coefficient calculating portion 508.

The compensation-coefficient calculating portion 508 receives the readout digital signals (the output signals) from the memory 504. The compensation-coefficient calculating portion 508 computes a pair of final I and Q compensation coefficients from a pair of the I and Q compensation coefficients represented by the output signals of the memory 504 and a pair of the I and Q compensation coefficients represented by the output signals of the calculator 506. The computation of a pair of the final I and Q compensation coefficients is implemented by executing product or multiplication among a pair of the I and Q compensation coefficients represented by the output signals of the memory 504 and a pair of the I and Q compensation coefficients represented by the output signals of the calculator 506. The compensation-coefficient calculating portion 508 generates digital signals representing a pair of the computed final I and Q compensation coefficients. The compensation-coefficient calculating portion 508 outputs the coefficient-representing digital signals to the distortion compensating portion 110.

The memory 520 and the signal correcting portion 522 are similar to the memory 416 and the signal correcting portion 418 in FIG. 8, respectively. The signal correcting portion 522 outputs correction-resultant recovered digital baseband I and Q signals to the equation updating portion 524.

The equation updating portion 524 calculates an error between a pair of the input digital baseband I and Q signals and a pair of the correction-resultant recovered digital baseband I and Q signals. The equation updating portion 524 accesses the calculator 506, and updates the I and Q equations in response to the calculated error. For example, coefficients in the I and Q equations are updated. The updating of the I and Q equations is designed to nullify the error.

Ninth Embodiment

Figure 11:
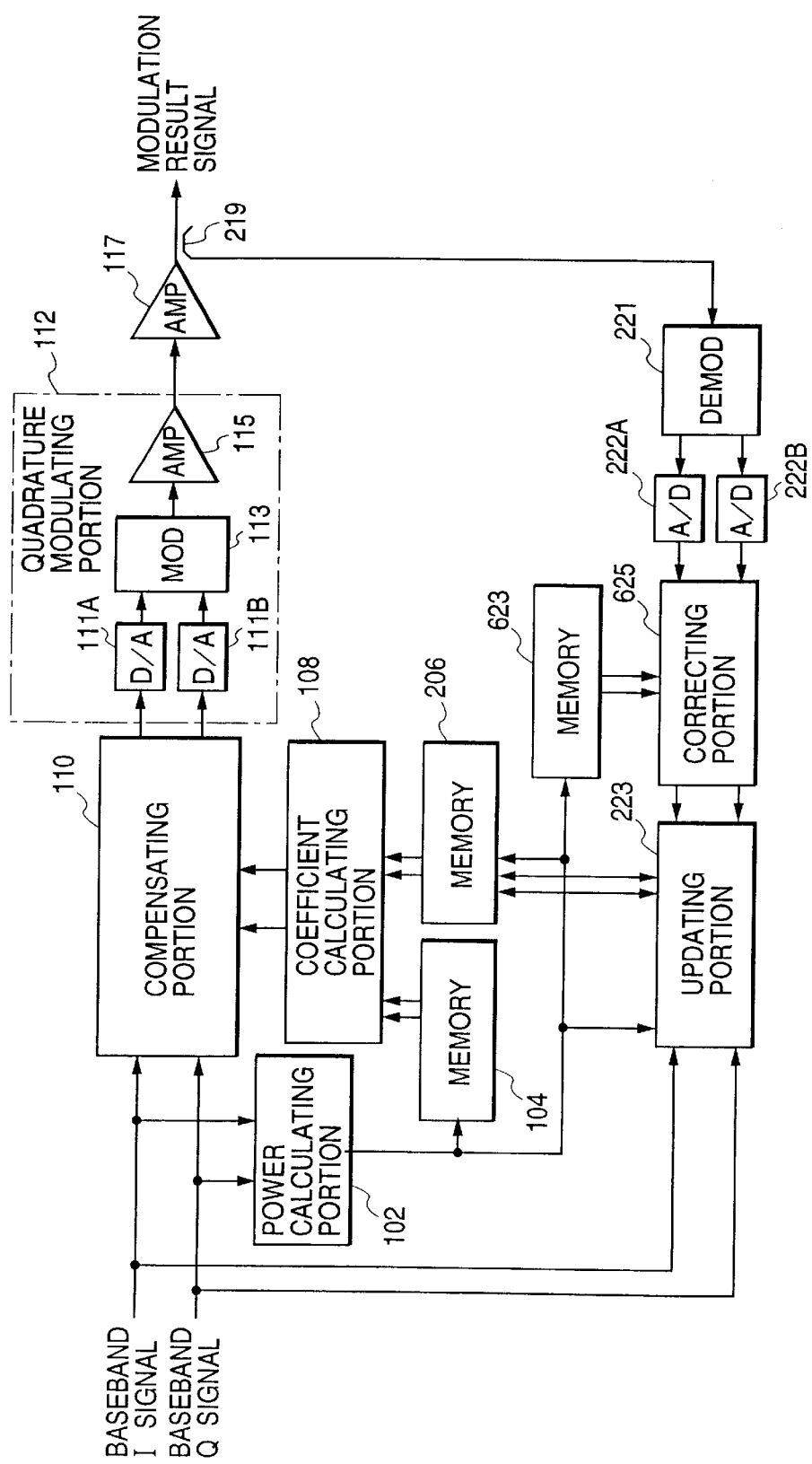
FIG. 11 is a block diagram of a portion of a radio transmitter equipped with a nonlinearity-caused distortion compensating system according to a ninth embodiment of this invention.

FIG. 11 shows a ninth embodiment of this invention which is similar to the embodiment of FIG. 5 except for design changes indicated hereinafter. The embodiment of FIG. 11 includes a read-only memory 623 and a signal correcting portion 625.

The memory 623 is connected to the power calculating portion 102 and the signal correcting portion 625. The signal correcting portion 625 is connected to the A/D converters 222A and 222B. The signal correcting portion 625 is also connected to the coefficient updating portion 223.

The memory 623 and the signal correcting portion 625 are similar to the memory 416 and the signal correcting portion 418 in FIG. 8, respectively. The signal correcting portion 625 outputs correction-resultant recovered digital baseband I and Q signals to the coefficient updating portion 223. The coefficient updating portion 223 renews the coefficient-representing signals in the memory 206 in response to the output signals of the signal correcting portion 625.

Tenth Embodiment

Figure 12:
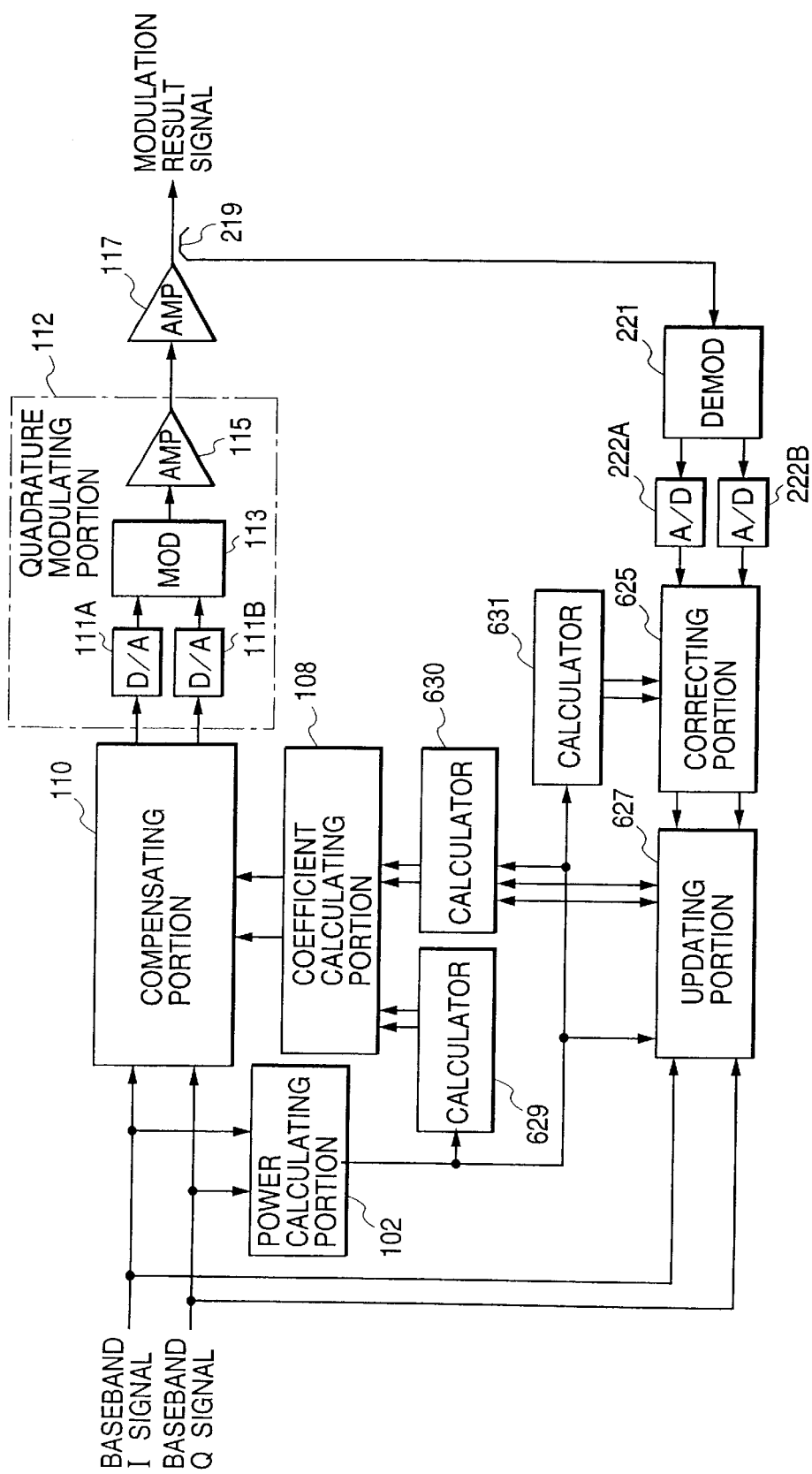
FIG. 12 is a block diagram of a portion of a radio transmitter equipped with a nonlinearity-caused distortion compensating system according to a tenth embodiment of this invention.

FIG. 12 shows a tenth embodiment of this invention which is similar to the embodiment of FIG. 11 except for design changes indicated hereinafter. The embodiment of FIG. 12 includes a calculator 629 instead of the memory 104 (see FIG. 11). In addition, the embodiment of FIG. 12 includes a calculator 630 and an equation updating portion 627 instead of the memory 206 and the coefficient updating portion 223 (see FIG. 11) respectively. Furthermore, the embodiment of FIG. 12 includes a calculator 631 instead of the memory 623.

The calculator 629 receives the output signal of the power calculating portion 102 which represents the calculated amplitude (or the calculated power). The device 629 calculates an I compensation coefficient and a Q compensation coefficient from the calculated amplitude (or the calculated power) according to predetermined equations. These equations are designed so that the calculated I and Q compensation coefficients will be effective in compensating for a signal distortion caused by the nonlinearity of the quadrature modulating portion 112. The calculator 629 generates digital signals representing the calculated I and Q compensation coefficients. The calculator 629 outputs the coefficient-representing digital signals to the compensation-coefficient calculating portion 108.

The calculator 630 receives the output signal of the power calculating portion 102 which represents the calculated amplitude (or the calculated power). The device 630 calculates an I compensation coefficient and a Q compensation coefficient from the calculated amplitude (or the calculated power) according to I and Q equations. The I and Q equations are designed so that the calculated I and Q compensation coefficients will be effective in compensating for a signal distortion caused by the nonlinearity of the RF power amplifier 117. As will be made clear later, the I and Q equations can be updated from predetermined initial states. The calculator 630 generates digital signals representing the calculated I and Q compensation coefficients. The calculator 630 outputs the coefficient-representing digital signals to the compensation-coefficient calculating portion 108.

The equation updating portion 627 calculates an error between a pair of the input digital baseband I and Q signals and a pair of the correction-resultant recovered digital baseband I and Q signals. The equation updating portion 627 accesses the calculator 630, and updates the I and Q equations in response to the calculated error. For example, coefficients in the I and Q equations are updated. The updating of the I and Q equations is designed to nullify the error.

The calculator 631 receives the output signal of the power calculating portion 102 which represents the calculated amplitude (or the calculated power). The device 631 calculates an I corrective coefficient and a Q corrective coefficient from the calculated amplitude (or the calculated power) according to predetermined equations. These equations are designed so that the calculated I and Q corrective coefficients will be effective in correcting a signal distortion caused by the nonlinearity of the quadrature demodulator 221. The calculator 631 generates digital signals representing the calculated I and Q corrective coefficients. The calculator 631 outputs the coefficient-representing digital signals to the signal correcting portion 625.

Eleventh Embodiment

Figure 13:
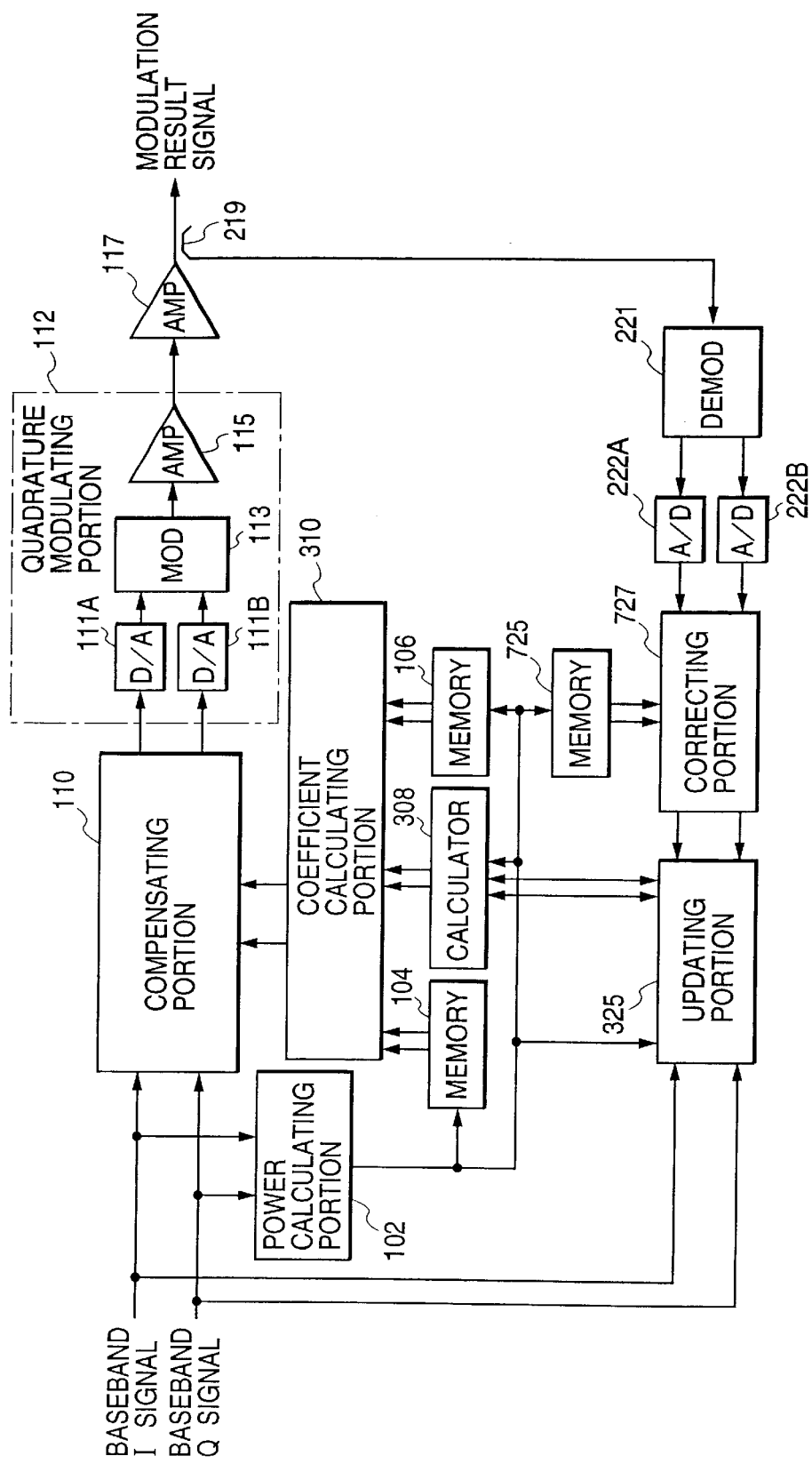
FIG. 13 is a block diagram of a portion of a radio transmitter equipped with a nonlinearity-caused distortion compensating system according to an eleventh embodiment of this invention.

FIG. 13 shows an eleventh embodiment of this invention which is similar to the embodiment of FIG. 7 except for design changes indicated hereinafter. The embodiment of FIG. 13 includes a read only memory 725 and a signal correcting portion 727.

The memory 725 is connected to the power calculating portion 102 and the signal correcting portion 727. The signal correcting portion 727 is connected to the A/D converters 222A and 222B. The signal correcting portion 727 is also connected to the equation updating portion 325.

The memory 725 and the signal correcting portion 727 are similar to the memory 416 and the signal correcting portion 418 in FIG. 8, respectively. The signal correcting portion 727 outputs correction-resultant recovered digital baseband I and Q signals to the equation updating portion 325. The equation updating portion 325 accesses the calculator 308, and updates the I and Q equations in response to the output signals of the signal correcting portion 727.

Twelfth Embodiment

Figure 14:
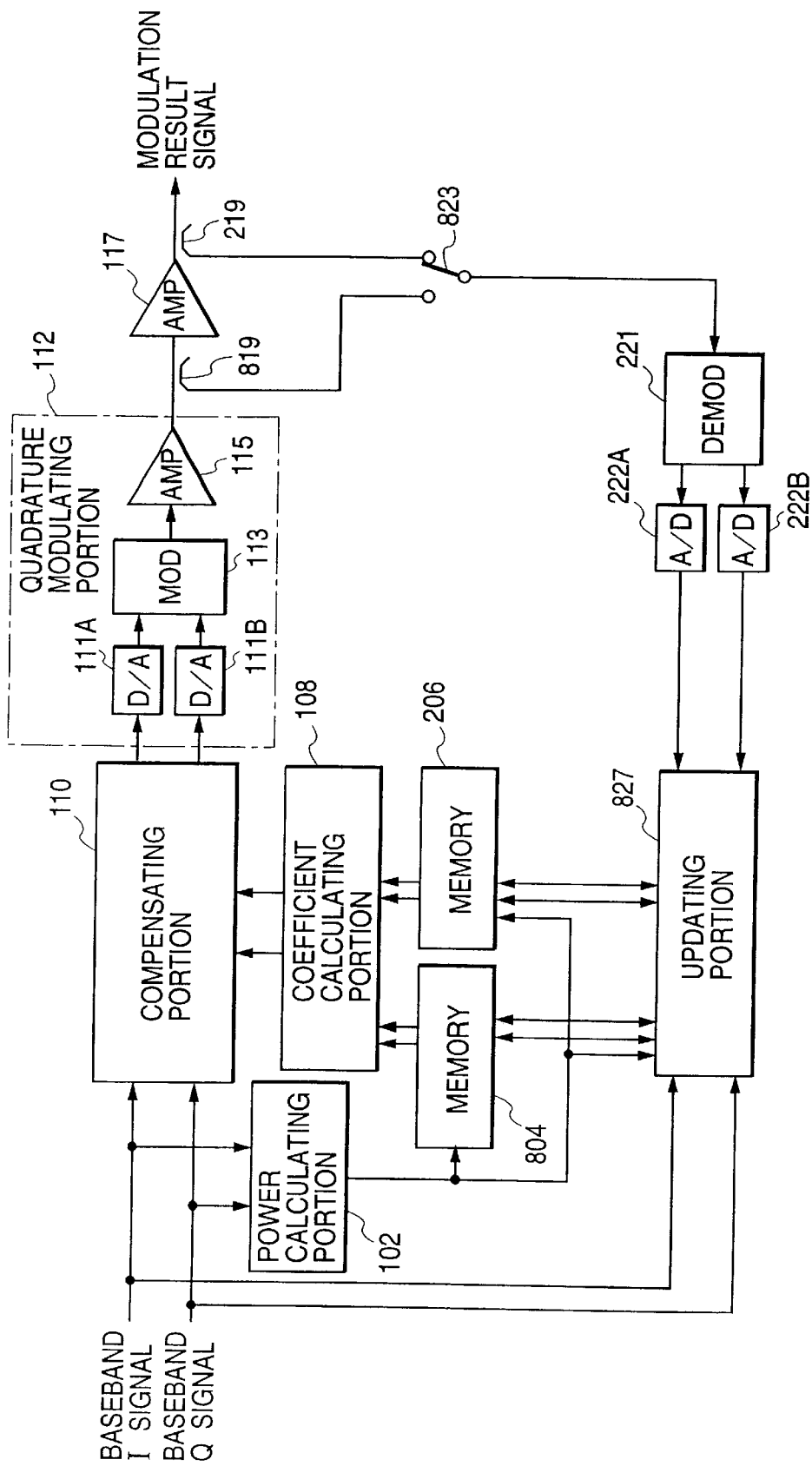
FIG. 14 is a block diagram of a portion of a radio transmitter equipped with a nonlinearity-caused distortion compensating system according to a twelfth embodiment of this invention.

FIG. 14 shows a twelfth embodiment of this invention which is similar to the embodiment of FIG. 5 except for design changes indicated hereinafter. The embodiment of FIG. 14 includes a read/write memory 804 and a coefficient updating portion 827 instead of the memory 104 and the coefficient updating portion 223 (see FIG. 5) respectively. The embodiment of FIG. 14 includes a signal divider 819 and a switch 823.

The signal divider 819 is associated with a signal transmission line extending between the output terminal of the quadrature modulating portion 112 and the input terminal of the RF power amplifier 117. The switch 823 is connected among the signal divider 219, the signal divider 819, and the quadrature demodulator 221.

The memory 804 has a first section and a second section. The first section of the memory 804 stores digital signals representing I compensation coefficients respectively. As will be made clear later, the I compensation coefficients can be updated from predetermined initial values. In the first section of the memory 804, the coefficient-representing digital signals are stored in storage locations having different addresses, respectively. The first section of the memory 804 is designed so that a desired relation between the calculated amplitude (or the calculated power) and the I compensation coefficient will be provided therein as a reference table. The second section of the memory 804 stores digital signals representing Q compensation coefficients respectively. As will be made clear later, the Q compensation coefficients can be updated from predetermined initial values. In the second section of the memory 804, the coefficient-representing digital signals are stored in storage locations having different addresses, respectively. The second section of the memory 804 is designed so that a desired relation between the calculated amplitude (or the calculated power) and the Q compensation coefficient will be provided therein as a reference table. The I compensation coefficients, the relation between the calculated amplitude and the I compensation coefficient, the Q compensation coefficients, and the relation between the calculated amplitude and the Q compensation coefficient are chosen to compensate for a signal distortion caused by the nonlinearity of the quadrature modulating portion 112.

One of the coefficient-representing digital signals is read out from the first section of the memory 804 in response to the address signal fed from the power calculating portion 102. The readout digital signal represents the I compensation coefficient which corresponds to the calculated amplitude given by the power calculating portion 102. Similarly, one of the coefficient-representing digital signals is read out from the second section of the memory 804 in response to the address signal fed from the power calculating portion 102. The readout digital signal represents the Q compensation coefficient which corresponds to the calculated amplitude given by the power calculating portion 102. In this way, a pair of the coefficient-representing digital signals is read out from the memory 804. A pair of the I and Q compensation coefficients represented by the readout digital signals is determined in accordance with the calculated amplitude given by the power calculating portion 102. The readout digital signals from the memory 804 are fed to the compensation-coefficient calculating portion 108.

The signal divider 219 separates a small portion from the output signal of the RF power amplifier 117, and feeds the separated signal portion to the switch 823. The signal divider 819 separates a small portion from the output signal of the quadrature modulating portion 112, and feeds the separated signal portion to the switch 823. The switch 823 selects one of the portion of the output signal of the RF power amplifier 117 and the portion of the output signal of the quadrature modulating portion 112. The switch 823 transmits the selected signal portion to the quadrature demodulator 221. The device 221 demodulates the signal portion, which is transmitted from the switch 823, into analog baseband I and Q signals. The quadrature demodulator 221 outputs the analog baseband I signal to the A/D converter 222A. The quadrature demodulator 221 outputs the analog baseband Q signal to the A/D converter 222B. The A/D converter 222A changes the analog baseband I signal into a corresponding digital baseband I signal. The A/D converter 222A outputs the digital baseband I signal to the coefficient updating portion 827 as a recovered digital baseband I signal. The A/D converter 222B changes the analog baseband Q signal into a corresponding digital baseband Q signal. The A/D converter 222B outputs the digital baseband Q signal to the coefficient updating portion 827 as a recovered digital baseband Q signal.

The coefficient updating portion 827 receives the input digital baseband I and Q signals. The coefficient updating portion 827 calculates an error between a pair of the input digital baseband I and Q signals and a pair of the recovered digital baseband I and Q signals. The coefficient updating portion 827 calculates a pair of new I and Q compensation coefficients from the calculated error. The new I and Q compensation coefficients are designed to nullify the error. The coefficient updating portion 827 generates a pair of new digital signals representing the new I and Q compensation coefficients.

When the switch 823 selects the portion of the output signal of the RF power amplifier 117, the coefficient updating portion 827 outputs a pair of the new coefficient-representing digital signals to the memory 206. In the memory 206, the new coefficient-representing digital signals replace the old coefficient-representing digital signals which represent the old I and Q compensation coefficients designated by or corresponding to the calculated amplitude given by the power calculating portion 102. Accordingly, in the memory 206, a pair of the I and Q compensation coefficients corresponding to the calculated amplitude is renewed or updated in response to the output signals of the coefficient updating portion 827.

When the switch 823 selects the portion of the output signal of the quadrature modulating portion 112, the coefficient updating portion 827 outputs a pair of the new coefficient-representing digital signals to the memory 804. In the memory 804, the new coefficient-representing digital signals replace the old coefficient-representing digital signals which represent the old I and Q compensation coefficients designated by or corresponding to the calculated amplitude given by the power calculating portion 102. Accordingly, in the memory 804, a pair of the I and Q compensation coefficients corresponding to the calculated amplitude is renewed or updated in response to the output signals of the coefficient updating portion 827.

For example, the coefficient updating portion 827 controls the switch 823. In this case, the coefficient updating portion 827 generates a control signal, and feeds the control signal to the switch 823. The switch 823 is changed in response to the control signal fed from the coefficient updating portion 827. The coefficient updating portion 827 controls the switch 823 to select the portion of the output signal of the RF power amplifier 117 when updating the coefficient-representing digital signals in the memory 206. The coefficient updating portion 827 controls the switch 823 to select the portion of the output signal of the quadrature modulating portion 112 when updating the coefficient-representing digital signals in the memory 804.

Thirteenth Embodiment

Figure 15:
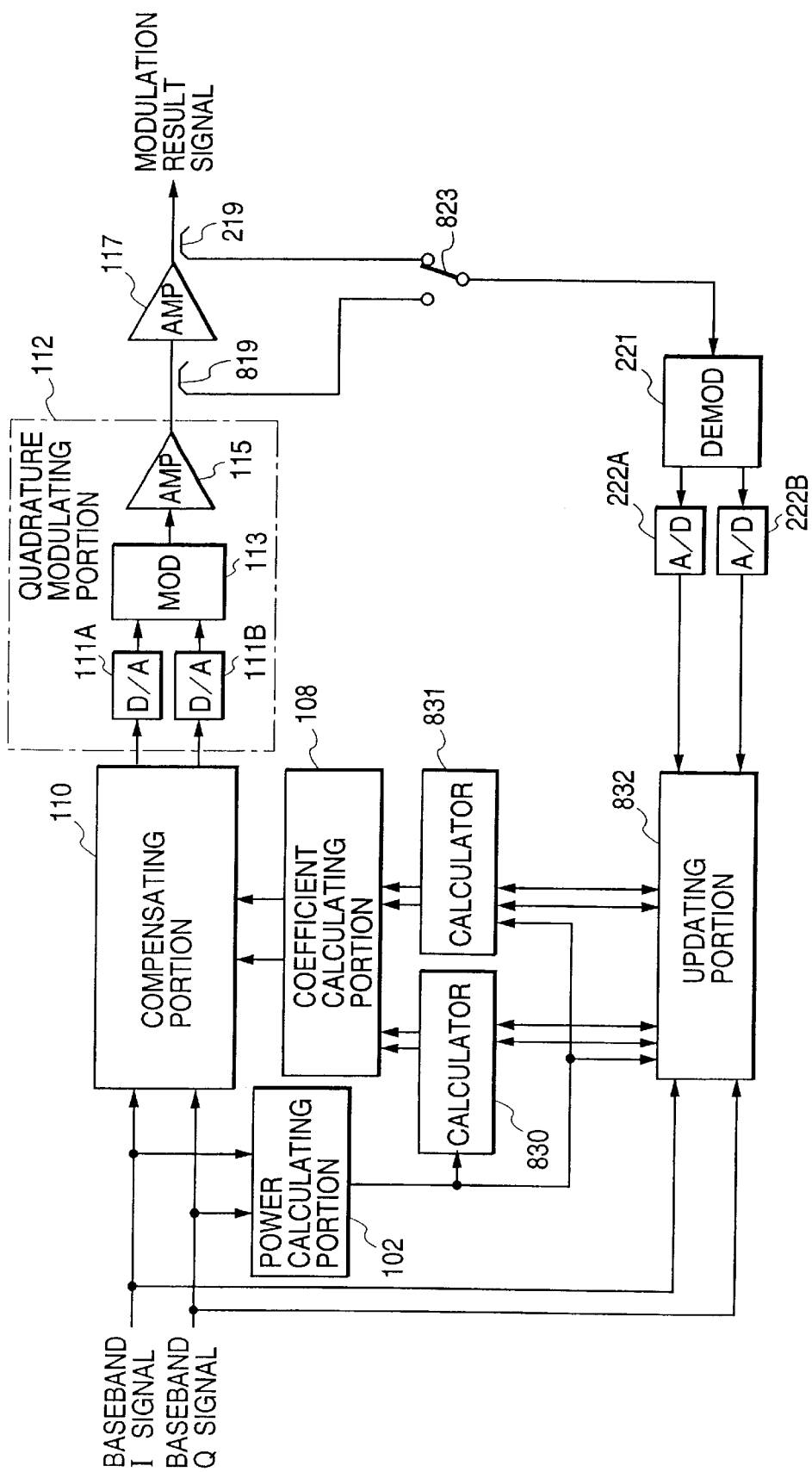
FIG. 15 is a block diagram of a portion of a radio transmitter equipped with a nonlinearity-caused distortion compensating system according to a thirteenth embodiment of this invention.

FIG. 15 shows a thirteenth embodiment of this invention which is similar to the embodiment of FIG. 14 except for design changes indicated hereinafter. The embodiment of FIG. 15 includes a calculator 830, a calculator 831, and an equation updating portion 832 instead of the memory 804, the memory 206, and the coefficient updating portion 827 (see FIG. 14) respectively.

The calculator 830 receives the output signal of the power calculating portion 102 which represents the calculated amplitude (or the calculated power). The device 830 calculates an I compensation coefficient and a Q compensation coefficient from the calculated amplitude (or the calculated power) according to I and Q equations. The I and Q equations are designed so that the calculated I and Q compensation coefficients will be effective in compensating for a signal distortion caused by the nonlinearity of the quadrature modulating portion 112. As will be made clear later, the I and Q equations can be updated from predetermined initial states. The calculator 830 generates digital signals representing the calculated I and Q compensation coefficients. The calculator 830 outputs the coefficient-representing digital signals to the compensation-coefficient calculating portion 108.

The calculator 831 receives the output signal of the power calculating portion 102 which represents the calculated amplitude (or the calculated power). The device 831 calculates an I compensation coefficient and a Q compensation coefficient from the calculated amplitude (or the calculated power) according to I and Q equations. The I and Q equations are designed so that the calculated I and Q compensation coefficients will be effective in compensating for a signal distortion caused by the nonlinearity of the RF power amplifier 117. As will be made clear later, the I and Q equations can be updated from predetermined initial states. The calculator 831 generates digital signals representing the calculated I and Q compensation coefficients. The calculator 831 outputs the coefficient-representing digital signals to the compensation-coefficient calculating portion 108.

The equation updating portion 832 calculates an error between a pair of the input digital baseband I and Q signals and a pair of the recovered digital baseband I and Q signals.

When the switch 823 selects the portion of the output signal of the RF power amplifier 117, the equation updating portion 832 accesses the calculator 831 and updates the I and Q equations in response to the calculated error. For example, coefficients in the I and Q equations are updated. The updating of the I and Q equations is designed to nullify the error.

When the switch 823 selects the portion of the output signal of the quadrature modulating portion 112, the equation updating portion 832 accesses the calculator 830 and updates the I and Q equations in response to the calculated error. For example, coefficients in the I and Q equations are updated. The updating of the I and Q equations is designed to nullify the error.

Fourteenth Embodiment

Figure 16:
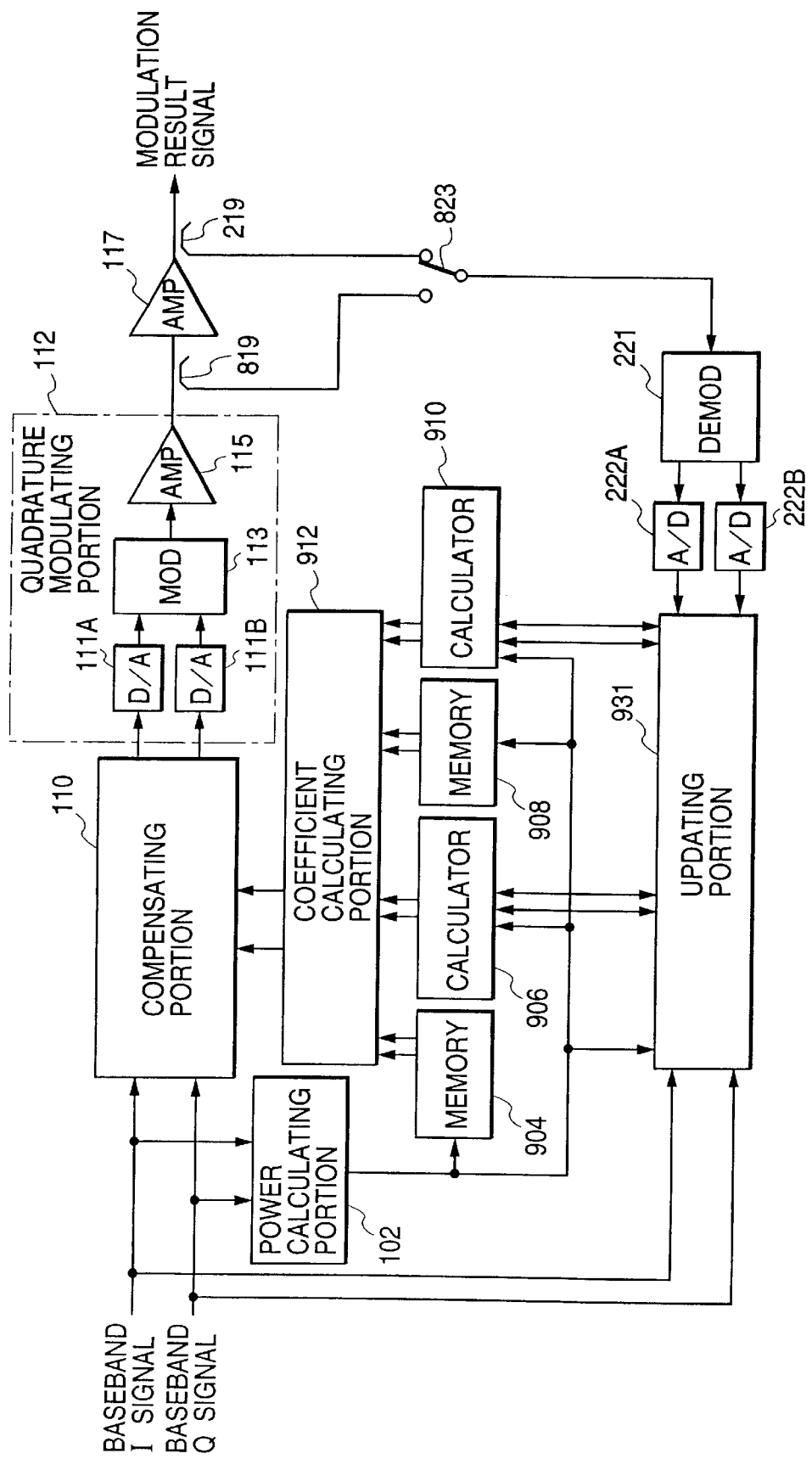
FIG. 16 is a block diagram of a portion of a radio transmitter equipped with a nonlinearity-caused distortion compensating system according to a fourteenth embodiment of this invention.

FIG. 16 shows a fourteenth embodiment of this invention which is similar to the embodiment of FIG. 14 except for design changes indicated hereinafter. The embodiment of FIG. 16 includes a compensation-coefficient calculating portion 912 and an equation updating portion 931 instead of the compensation-coefficient calculating portion 108 and the coefficient updating portion 827 (see FIG. 14) respectively. The embodiment of FIG. 16 includes read-only memories 904 and 908, and calculators 906 and 910. The memories 206 and 804 (see FIG. 14) are omitted from the embodiment of FIG. 16.

The memory 904 is connected between the power calculating portion 102 and the compensation-coefficient calculating portion 912. The memory 908 is connected between the power calculating portion 102 and the compensation-coefficient calculating portion 912. The calculator 906 is connected among the power calculating portion 102, the compensation-coefficient calculating portion 912, and the equation updating portion 931. The calculator 910 is connected among the power calculating portion 102, the compensation-coefficient calculating portion 912, and the equation updating portion 931.

The memory 904 is similar to the memory 104 in FIG. 1. The memory 904 outputs a pair of coefficient-representing digital signals to the compensation-coefficient calculating portion 912 in response to the address signal fed from the power calculating portion 102. The output signals of the memory 904 represent I and Q compensation coefficients which are designed to compensate for a signal distortion caused by the nonlinearity of the quadrature modulating portion 112.

The memory 908 is similar to the memory 106 in FIG. 1. The memory 908 outputs a pair of coefficient-representing digital signals to the compensation-coefficient calculating portion 912 in response to the address signal fed from the power calculating portion 102. The output signals of the memory 908 represent I and Q compensation coefficients which are designed to compensate for a signal distortion caused by the nonlinearity of the RF power amplifier 117.

The calculator 906 receives the output signal of the power calculating portion 102 which represents the calculated amplitude (or the calculated power). The device 906 calculates an I compensation coefficient and a Q compensation coefficient from the calculated amplitude (or the calculated power) according to I and Q equations. The I and Q equations are designed so that the calculated I and Q compensation coefficients will be effective in compensating for a variation in characteristics of the quadrature modulating portion 112. As will be made clear later, the I and Q equations can be updated from predetermined initial states. The calculator 906 generates digital signals representing the calculated I and Q compensation coefficients. The calculator 906 outputs the coefficient-representing digital signals to the compensation-coefficient calculating portion 912.

The calculator 910 receives the output signal of the power calculating portion 102 which represents the calculated amplitude (or the calculated power). The device 910 calculates an I compensation coefficient and a Q compensation coefficient from the calculated amplitude (or the calculated power) according to I and Q equations. The I and Q equations are designed so that the calculated I and Q compensation coefficients will be effective in compensating for a variation in characteristics of the RF power amplifier 117. As will be made clear later, the I and Q equations can be updated from predetermined initial states. The calculator 910 generates digital signals representing the calculated I and Q compensation coefficients. The calculator 910 outputs the coefficient-representing digital signals to the compensation-coefficient calculating portion 912.

The compensation-coefficient calculating portion 912 computes a pair of final I and Q compensation coefficients from a pair of the I and Q compensation coefficients represented by the output signals of the memory 904, a pair of the I and Q compensation coefficients represented by the output signals of the memory 908, a pair of the I and Q compensation coefficients represented by the output signals of the calculator 906, and a pair of the I and Q compensation coefficients represented by the output signals of the calculator 910. The computation of a pair of the final I and Q compensation coefficients is implemented by executing product or multiplication among a pair of the I and Q compensation coefficients represented by the output signals of the memory 904, a pair of the I and Q compensation coefficients represented by the output signals of the memory 908, a pair of the I and Q compensation coefficients represented by the output signals of the calculator 906, and a pair of the I and Q compensation coefficients represented by the output signals of the calculator 910. The compensation-coefficient calculating portion 912 generates digital signals representing a pair of the computed final I and Q compensation coefficients. The compensation-coefficient calculating portion 912 outputs the coefficient-representing digital signals to the distortion compensating portion 110.

The equation updating portion 931 calculates an error between a pair of the input digital baseband I and Q signals and a pair of the recovered digital baseband I and Q signals.

When the switch 823 selects the portion of the output signal of the RF power amplifier 117, the equation updating portion 931 accesses the calculator 910 and updates the I and Q equations in response to the calculated error. For example, coefficients in the I and Q equations are updated. The updating of the I and Q equations is designed to nullify the error.

When the switch 823 selects the portion of the output signal of the quadrature modulating portion 112, the equation updating portion 931 accesses the calculator 906 and updates the I and Q equations in response to the calculated error. For example, coefficients in the I and Q equations are updated. The updating of the I and Q equations is designed to nullify the error.

Fifteenth Embodiment

Figure 17:
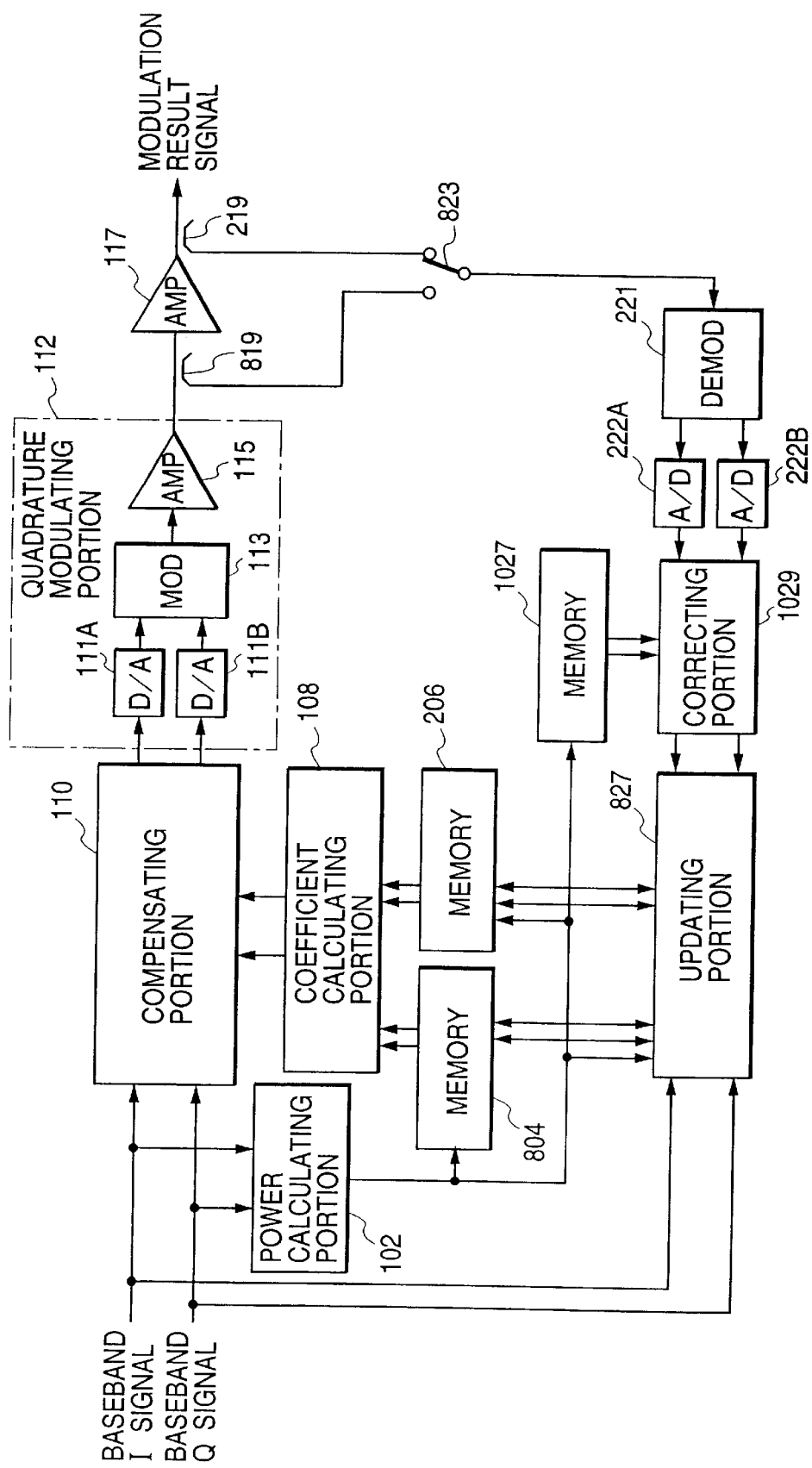
FIG. 17 is a block diagram of a portion of a radio transmitter equipped with a nonlinearity-caused distortion compensating system according to a fifteenth embodiment of this invention.

FIG. 17 shows a fifteenth embodiment of this invention which is similar to the embodiment of FIG. 14 except for design changes indicated hereinafter. The embodiment of FIG. 17 includes a read-only memory 1027 and a signal correcting portion 1029.

The memory 1027 is connected to the power calculating portion 102 and the signal correcting portion 1029. The signal correcting portion 1029 is connected to the A/D converters 222A and 222B. The signal correcting portion 1029 is also connected to the coefficient updating portion 827.

The memory 1027 and the signal correcting portion 1029 are similar to the memory 416 and the signal correcting portion 418 in FIG. 8, respectively. The signal correcting portion 1029 outputs correction-resultant recovered digital baseband I and Q signals to the coefficient updating portion 827. The coefficient updating portion 827 renews the coefficient-representing signals in the memory 206 or the memory 804 in response to the output signals of the signal correcting portion 1029.

Sixteenth Embodiment

Figure 18:
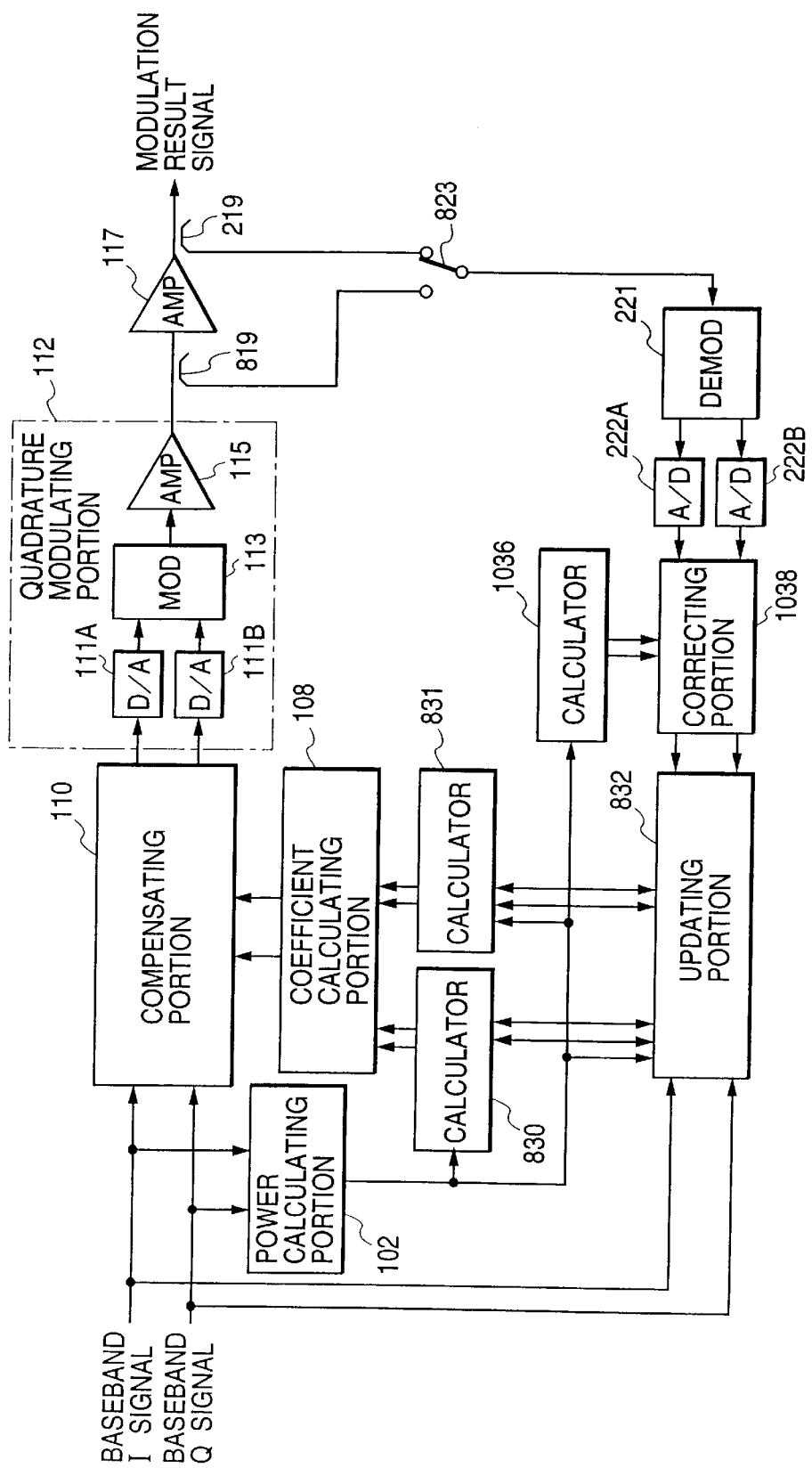
FIG. 18 is a block diagram of a portion of a radio transmitter equipped with a nonlinearity-caused distortion compensating system according to a sixteenth embodiment of this invention.

FIG. 18 shows a sixteenth embodiment of this invention which is similar to the embodiment of FIG. 15 except for design changes indicated hereinafter. The embodiment of FIG. 18 includes a calculator 1036 and a signal correcting portion 1038.

The calculator 1036 is connected to the power calculating portion 102 and the signal correcting portion 1038. The signal correcting portion 1038 is connected to the A/D converters 222A and 222B. The signal correcting portion 1038 is also connected to the equation updating portion 832.

The calculator 1036 is similar to the calculator 631 in FIG. 12. The calculator 1036 generates digital signals representative of calculated I and Q corrective coefficients in response to the output signal of the power calculating portion 102. The calculator 1036 outputs the coefficient-representing digital signals to the signal correcting portion 1038.

The signal correcting portion 1038 is similar to the signal correction portion 625 in FIG. 11 or FIG. 12. The signal correcting portion 1038 implements signal correction in response to the I and Q corrective coefficients represented by the output signals of the calculator 1036. The signal correcting portion 1038 outputs correction-resultant recovered digital baseband I and signals to the equation updating portion 832. The equation updating portion 832 accesses the calculator 830 or the calculator 831, and updates the I and Q equations in response to the output signals of the signal correcting portion 1038.

Seventeenth Embodiment

Figure 19:
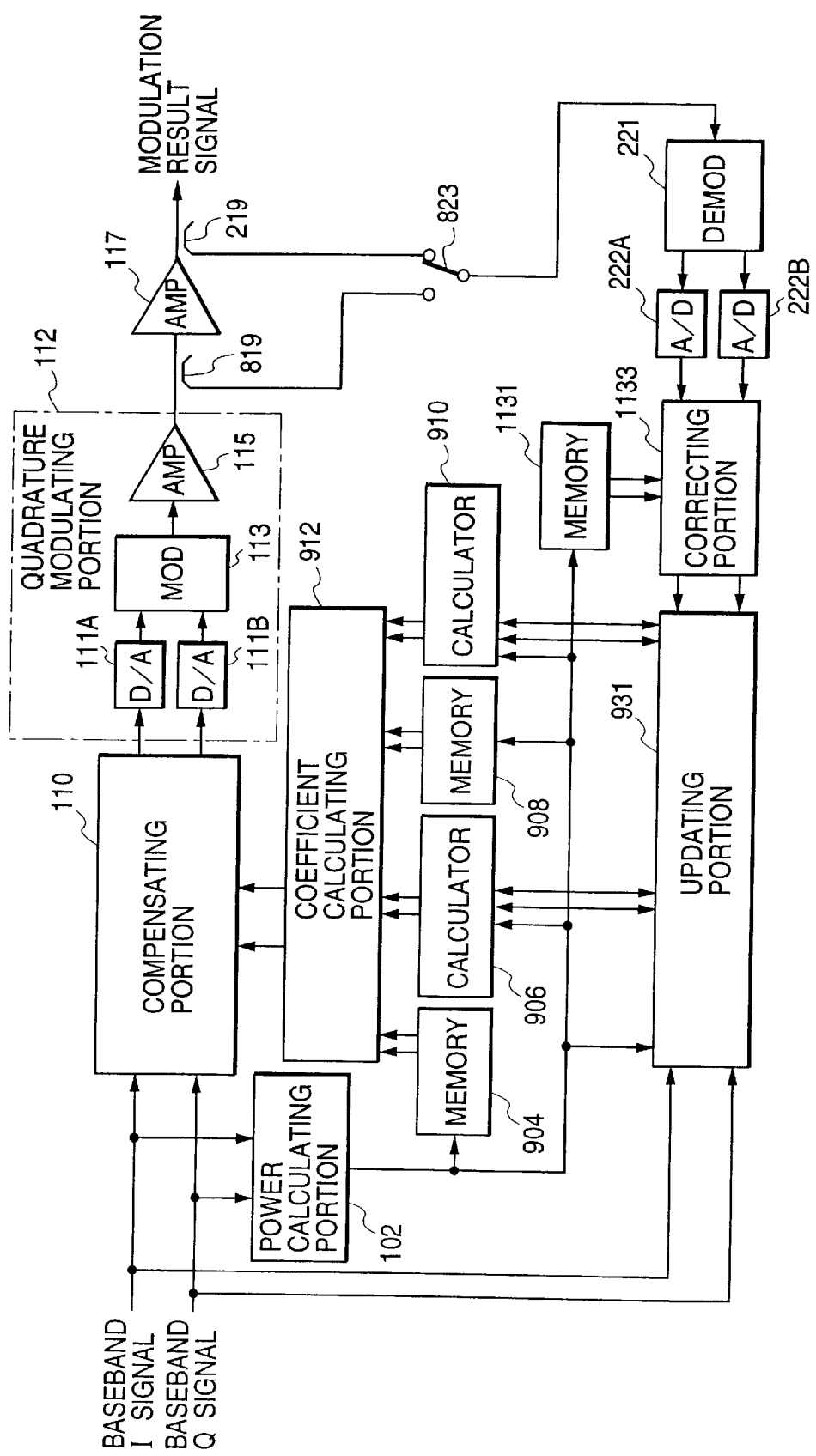
FIG. 19 is a block diagram of a portion of a radio transmitter equipped with a nonlinearity-caused distortion compensating system according to a seventeenth embodiment of this invention.

FIG. 19 shows a seventeenth embodiment of this invention which is similar to the embodiment of FIG. 16 except for design changes indicated hereinafter. The embodiment of FIG. 19 includes a read-only memory 1131 and a signal correcting portion 1133.

The memory 1131 is connected to the power calculating portion 102 and the signal correcting portion 1133. The signal correcting portion 1133 is connected to the A/D converters 222A and 222B. The signal correcting portion 1133 is also connected to the equation updating portion 931.

The memory 1131 and the signal correcting portion 1133 are similar to the memory 416 and the signal correcting portion 418 in FIG. 8, respectively. The signal correcting portion 1133 outputs correction-resultant recovered digital baseband I and Q signals to the equation updating portion 931. The equation updating portion 931 accesses the calculator 906 or the calculator 910, and updates the I and Q equations in response to the output signals of the signal correcting portion 1133.

Eighteenth Embodiment

Figure 20:
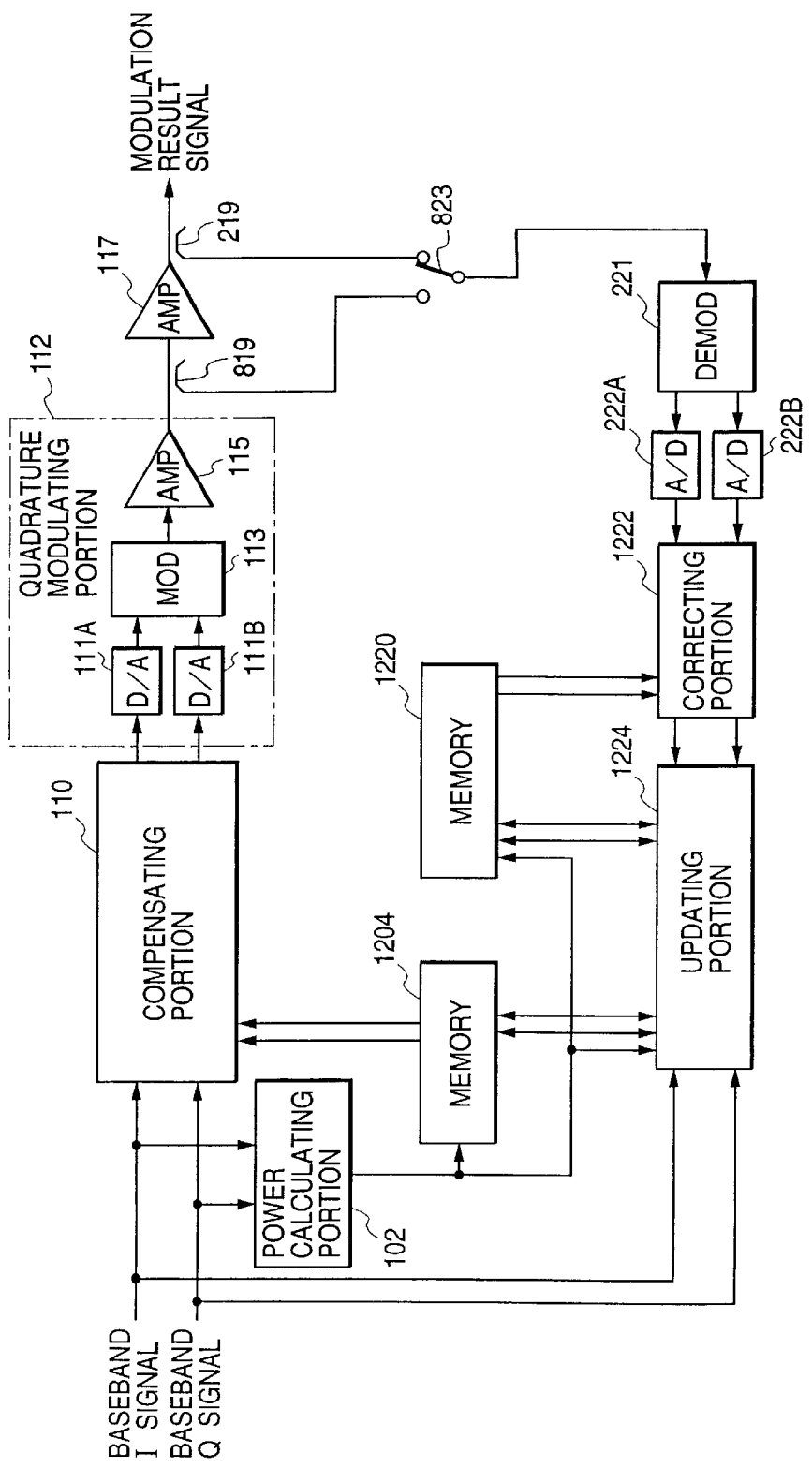
FIG. 20 is a block diagram of a portion of a radio transmitter equipped with a nonlinearity-caused distortion compensating system according to an eighteenth embodiment of this invention.

FIG. 20 shows an eighteenth embodiment of this invention which is similar to the embodiment of FIG. 14 except for design changes indicated hereinafter. The embodiment of FIG. 20 includes a coefficient updating portion 1224 instead of the coefficient updating portion 827 (see FIG. 14). The embodiment of FIG. 20 includes read/write memories 1204 and 1220, and a signal correcting portion 1222. The memories 206 and 804, and the compensation-coefficient calculating portion 108 (see FIG. 14) are omitted from the embodiment of FIG. 20.

The memory 1204 is connected among the power calculating portion 102, the distortion compensating portion 110, and the coefficient updating portion 1224. The memory 1220 is connected among the power calculating portion 102, the signal correcting portion 1222, and the coefficient updating portion 1224. The signal correcting portion 1222 is connected to the A/D converters 222A and 222B. The signal correcting portion 1222 is also connected to the coefficient updating portion 1224.

The memory 1204 is similar to the memory 404 in FIG. 8. As will be explained later, coefficient-representing digital signals in the memory 1204 can be updated.

The memory 1220 has a first section and a second section. The first section of the memory 1220 stores digital signals representing I corrective coefficients respectively. As will be made clear later, the I corrective coefficients can be updated from predetermined initial values. In the first section of the memory 1220, the coefficient-representing digital signals are stored in storage locations having different addresses, respectively. The first section of the memory 1220 is designed so that a desired relation between the calculated amplitude (or the calculated power) and the I corrective coefficient will be provided therein as a reference table. The second section of the memory 1220 stores digital signals representing Q corrective coefficients respectively. As will be made clear later, the Q corrective coefficients can be updated from predetermined initial values. In the second section of the memory 1220, the coefficient-representing digital signals are stored in storage locations having different addresses, respectively. The second section of the memory 1220 is designed so that a desired relation between the calculated amplitude (or the calculated power) and the Q corrective coefficient will be provided therein as a reference table. The I corrective coefficients, the relation between the calculated amplitude and the I corrective coefficient, the Q corrective coefficients, and the relation between the calculated amplitude and the Q corrective coefficient are chosen to correct a signal distortion caused by the nonlinearity of the quadrature demodulator 221.

One of the coefficient-representing digital signals is read out from the first section of the memory 1220 in response to the address signal fed from the power calculating portion 102. The readout digital signal represents the I corrective coefficient which corresponds to the calculated amplitude given by the power calculating portion 102. Similarly, one of the coefficient-representing digital signals is read out from the second section of the memory 1220 in response to the address signal fed from the power calculating portion 102. The readout digital signal represents the Q corrective coefficient which corresponds to the calculated amplitude given by the power calculating portion 102. In this way, a pair of the coefficient-representing digital signals is read out from the memory 1220. A pair of the I and Q corrective coefficients represented by the readout digital signals is determined in accordance with the calculated amplitude given by the power calculating portion 102.

The signal correcting portion 1222 is similar to the signal correcting portion 418 in FIG. 8. The signal correcting portion 1222 receives the recovered digital baseband I signal and the recovered digital baseband Q signal from the A/D converters 222A and 222B. The signal correcting portion 1222 receives the coefficient-representing digital signals from the memory 1220. The signal correcting portion 1222 corrects the recovered digital baseband I signal and the recovered digital baseband Q signal into a correction-resultant recovered digital baseband I signal and a correction-resultant recovered digital baseband Q signal in response to the I and Q corrective coefficients represented by the output signals of the memory 1220. The signal correcting portion 1222 outputs the correction-resultant recovered digital baseband I signal and the correction-resultant recovered digital baseband Q signal to the coefficient updating portion 1224.

The coefficient updating portion 1224 receives the input digital baseband I and Q signals. The coefficient updating portion 1224 calculates an error between a pair of the input digital baseband I and Q signals and a pair of the correction-resultant recovered digital baseband I and Q signals.

When the switch 823 selects the portion of the output signal of the RF power amplifier 117, the coefficient updating portion 1224 calculates a pair of new I and Q compensation coefficients from the calculated error. The new I and Q compensation coefficients are designed to nullify the error. The coefficient updating portion 1224 generates a pair of new digital signals representing the new I and Q compensation coefficients respectively. When the switch 823 selects the portion of the output signal of the RF power amplifier 117, the coefficient updating portion 1224 outputs a pair of the new coefficient-representing digital signals to the memory 1204. In the memory 1204, the new coefficient-representing digital signals replace the old coefficient-representing digital signals which represent the old I and Q compensation coefficients designated by or corresponding to the calculated amplitude given by the power calculating portion 102. Accordingly, in the memory 1204, a pair of the I and Q compensation coefficients corresponding to the calculated amplitude is renewed or updated in response to the output signals of the coefficient updating portion 1224.

When the switch 823 selects the portion of the output signal of the quadrature modulating portion 112, the coefficient updating portion 1224 calculates a pair of new I and Q corrective coefficients from the calculated error. The new I and Q corrective coefficients are designed to nullify the error. The coefficient updating portion 1224 generates a pair of new digital signals representing the new I and Q corrective coefficients respectively. When the switch 823 selects the portion of the output signal of the quadrature modulating portion 112, the coefficient updating portion 1224 outputs a pair of the new coefficient-representing digital signals to the memory 1220. In the memory 1220, the new coefficient-representing digital signals replace the old coefficient-representing digital signals which represent the old I and Q corrective coefficients designated by or corresponding to the calculated amplitude given by the power calculating portion 102. Accordingly, in the memory 1220, a pair of the I and Q corrective coefficients corresponding to the calculated amplitude is renewed or updated in response to the output signals of the coefficient updating portion 1224.

Nineteenth Embodiment

Figure 21:
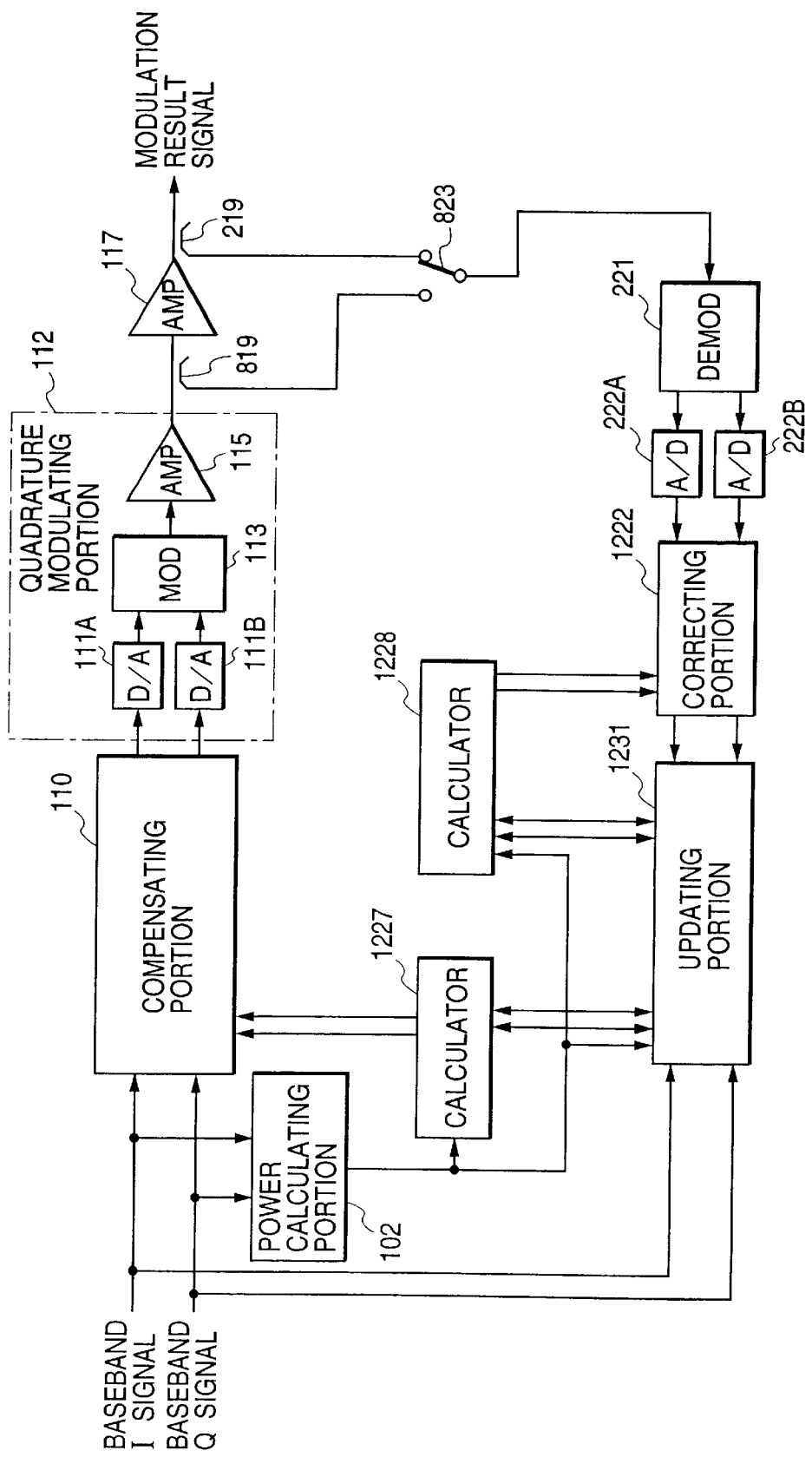
FIG. 21 is a block diagram of a portion of a radio transmitter equipped with a nonlinearity-caused distortion compensating system according to a nineteenth embodiment of this invention.

FIG. 21 shows a nineteenth embodiment of this invention which is similar to the embodiment of FIG. 20 except for design changes indicated hereinafter. The embodiment of FIG. 21 includes a calculator 1227, a calculator 1228, and an equation updating portion 1231 instead of the memory 1204, the memory 1220, and the coefficient updating portion 1224 (see FIG. 20) respectively.

The calculator 1227 receives the output signal of the power calculating portion 102 which represents the calculated amplitude (or the calculated power). The device 1227 calculates an I compensation coefficient and a Q compensation coefficient from the calculated amplitude (or the calculated power) according to I and Q equations. The I and Q equations are designed so that the calculated I and Q compensation coefficients will be effective in compensating for a signal distortion caused by at least one of the nonlinearity of the quadrature modulating portion 112 and the nonlinearity of the RF power amplifier 117. As will be made clear later, the I and Q equations can be updated from predetermined initial states. The calculator 1227 generates digital signals representing the calculated I and Q compensation coefficients. The calculator 1227 outputs the coefficient-representing digital signals to the distortion compensating portion 110.

The calculator 1228 receives the output signal of the power calculating portion 102 which represents the calculated amplitude (or the calculated power). The device 1228 calculates an I corrective coefficient and a Q corrective coefficient from the calculated amplitude (or the calculated power) according to I and Q equations. The I and Q equations are designed so that the calculated I and Q corrective coefficients will be effective in compensating for a signal distortion caused by the nonlinearity of the quadrature demodulator 221. As will be made clear later, the I and Q equations can be updated from predetermined initial states. The calculator 1228 generates digital signals representing the calculated I and Q corrective coefficients. The calculator 1228 outputs the coefficient-representing digital signals to the signal correcting portion 1222.

The signal correcting portion 1222 implements signal correction in response to the I and Q corrective coefficients represented by the output signals of the calculator 1228. The signal correcting portion 1222 outputs the correction-resultant recovered digital baseband I signal and the correction-resultant recovered digital baseband Q signal to the equation updating portion 1231.

The equation updating portion 1231 receives the input digital baseband I and Q signals. The equation updating portion 1231 calculates an error between a pair of the input digital baseband I and Q signals and a pair of the correction-resultant recovered digital baseband I and Q signals.

When the switch 823 selects the portion of the output signal of the RF power amplifier 117, the equation updating portion 1231 accesses the calculator 1227 and updates the I and Q equations in response to the calculated error. For example, coefficients in the I and Q equations are updated. The updating of the I and Q equations is designed to nullify the error.

When the switch 823 selects the portion of the output signal of the quadrature modulating portion 112, the equation updating portion 832 accesses the calculator 1223 and updates the I and Q equations in response to the calculated error. For example, coefficients in the I and Q equations are updated. The updating of the I and Q equations is designed to nullify the error.

Twentieth Embodiment

Figure 22:
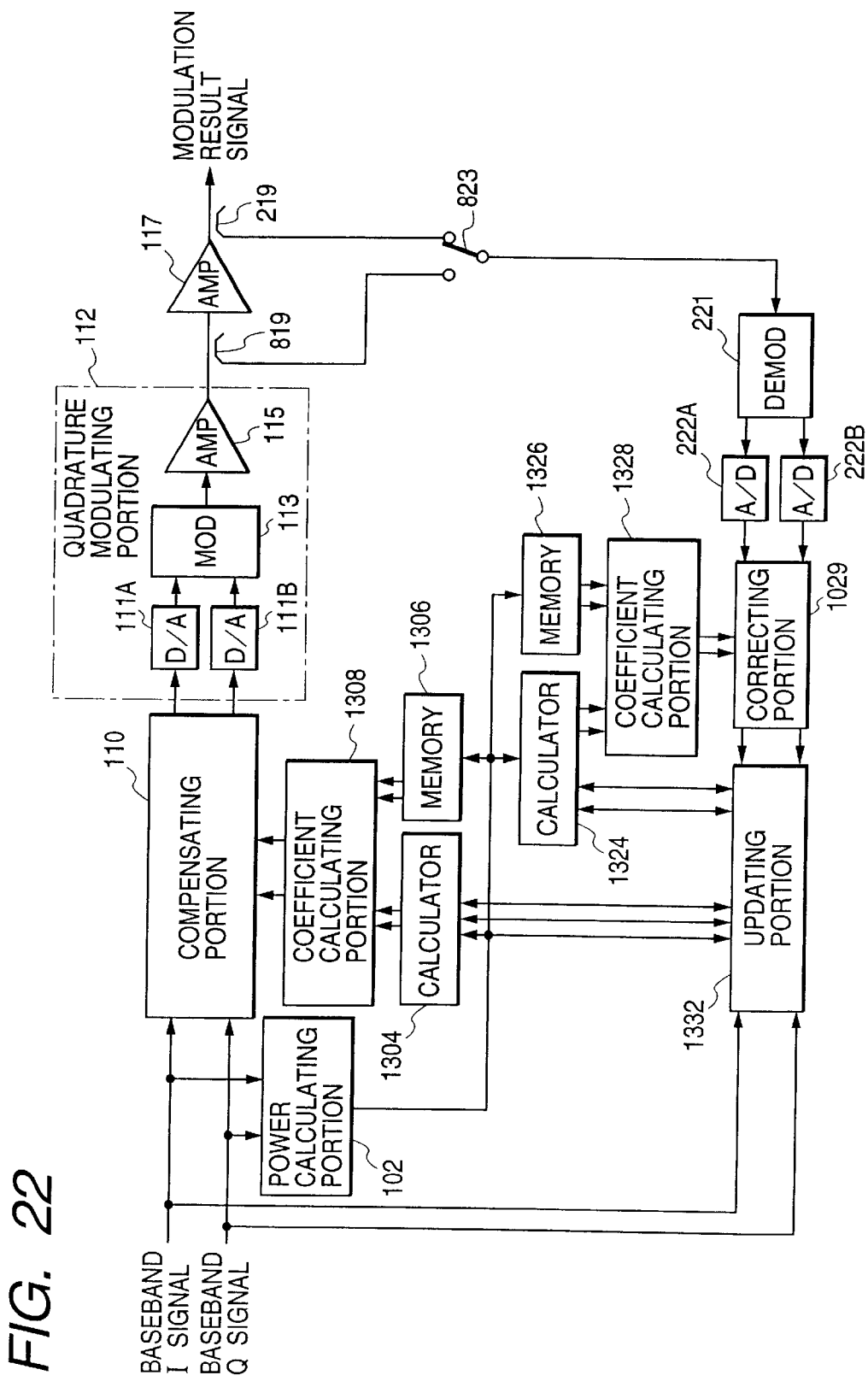
FIG. 22 is a block diagram of a portion of a radio transmitter equipped with a nonlinearity-caused distortion compensating system according to a twentieth embodiment of this invention.

FIG. 22 shows a twentieth embodiment of this invention which is similar to the embodiment of FIG. 17 except for design changes indicated hereinafter. The embodiment of FIG. 22 includes a calculator 1304 and a read-only memory 1306 instead of the memories 804 and 206 (see FIG. 17). The embodiment of FIG. 22 includes a compensation-coefficient calculating portion 1308 instead of the compensation-coefficient calculating portion 108 (see FIG. 17). The embodiment of FIG. 22 includes an equation updating portion 1332 instead of the coefficient updating portion 827 (see FIG. 17). The embodiment of FIG. 22 includes a calculator 1324, a read-only memory 1326, a corrective-coefficient calculating portion 1328 which replace the memory 1027 (see FIG. 17).

The calculator 1304 is connected among the power calculating portion 102, the compensation-coefficient calculating portion 1308, and the equation updating portion 1332. The memory 1306 is connected between the power calculating portion 102 and the compensation-coefficient calculating portion 1308. The compensation-coefficient calculating portion 1308 is connected to the distortion compensating portion 110.

The calculator 1324 is connected among the power calculating portion 102, the corrective-coefficient calculating portion 1328, and the equation updating portion 1332. The memory 1326 is connected between the power calculating portion 102 and the corrective-coefficient calculating portion 1328. The corrective-coefficient calculating portion 1328 is connected to the signal correcting portion 1029. The signal correcting portion 1029 is connected to the equation updating portion 1332.

The calculator 1304 is similar to the calculator 506 in FIG. 10. The calculator 1304 receives the output signal of the power calculating portion 102 which represents the calculated amplitude (or the calculated power). The device 1304 calculates an I compensation coefficient and a Q compensation coefficient from the calculated amplitude (the calculates power) according to updatable I and Q equations. The I and Q equations are designed so that the calculated I and Q compensation coefficients will be effective in compensating for a variation in characteristics of at least one of the quadrature modulating portion 112 and the RF power amplifier 117. The calculator 1304 outputs digital signals representative of the calculated I and Q compensation coefficients to the compensation-coefficient calculating portion 1308.

The memory 1306 is similar to the memory 504 in FIG. 10. The memory 1306 outputs a pair of digital signals representative of I and Q compensation coefficients to the compensation-coefficient calculating portion 1308 in response to the address signal fed from the power calculating portion 102. The I and Q compensation coefficients represented by the output signals of the memory 1306 are designed to compensate for a signal distortion caused by at least one of the nonlinearity of the quadrature modulating portion 112 and the nonlinearity of the RF power amplifier 117.

The compensation-coefficient calculating portion 1308 is similar to the compensation-coefficient calculating portion 508 in FIG. 10. The compensation-coefficient calculating portion 1308 computes a pair of final I and Q compensation coefficients from a pair of the I and Q compensation coefficients represented by the output signals of the calculator 1304 and a pair of the I and Q compensation coefficients represented by the output signals of the memory 1306. The compensation-coefficient calculating portion 1308 outputs digital signals representative of the calculated final I and Q compensation coefficients to the distortion compensating portion 110.

The calculator 1324 receives the output signal of the power calculating portion 102 which represents the calculated amplitude (or the calculated power). The device 1324 calculates an I corrective coefficient and a Q corrective coefficient from the calculated amplitude (or the calculated power) according to I and Q equations. The I and Q equations are designed so that the calculated I and Q corrective coefficients will be effective in compensating for a variation in the characteristics of the quadrature demodulator 221. As will be made clear later, the I and Q equations can be updated from predetermined initial states. The calculator 1324 generates digital signals representing the calculated I and Q corrective coefficients. The calculator 1324 outputs the coefficient-representing digital signals to the corrective-coefficient calculating portion 1328.

The memory 1326 is similar to the memory 416 in FIG. 8. The memory 1326 outputs a pair of digital signals representative of I and Q corrective coefficients to the corrective-coefficient calculating portion 1328 in response to the address signal fed from the power calculating portion 102. The I and Q corrective coefficients represented by the output signals of the memory 1326 are designed to compensate for a signal distortion caused by the nonlinearity of the quadrature demodulator 221.

The corrective-coefficient calculating portion 1328 computes a pair of final I and Q corrective coefficients from a pair of the I and Q corrective coefficients represented by the output signals of the calculator 1324 and a pair of the I and Q corrective coefficients represented by the output signals of the memory 1326. The computation of a pair of the final I and Q corrective coefficients is implemented by executing product or multiplication among a pair of the I and Q corrective coefficients represented by the output signals of the calculator 1324 and a pair of the I and Q compensation coefficients represented by the output signals of the memory 1326. The corrective-coefficient calculating portion 1328 generates digital signals representing a pair of the computed final I and Q corrective coefficients. The corrective-coefficient calculating portion 1328 outputs the coefficient-representing digital signals to the signal correcting portion 1029.

The signal correcting portion 1029 implements signal correction in response to the final I and Q corrective coefficients represented by the output signals of the corrective-coefficient-calculating portion 1328. The signal correcting portion 1029 outputs the correction-resultant recovered digital baseband I signal and the correction-resultant recovered digital baseband Q signal to the equation updating portion 1332.

The equation updating portion 1332 receives the input digital baseband I and Q signals. The equation updating portion 1332 calculates an error between a pair of the input digital baseband I and Q signals and a pair of the correction-resultant recovered digital baseband I and Q signals.

When the switch 823 selects the portion of the output signal of the RF power amplifier 117, the equation updating portion 1332 accesses the calculator 1304 and updates the I and Q equations in response to the calculated error. For example, coefficients in the I and Q equations are updated. The updating of the I and Q equations is designed to nullify the error.

When the switch 823 selects the portion of the output signal of the quadrature modulating portion 112, the equation updating portion 1332 accesses the calculator 1324 and updates the I and Q equations in response to the calculated error. For example, coefficients in the I and Q equations are updated. The updating of the I and Q equations is designed to nullify the error.

Twenty-First Embodiment

Figure 23:
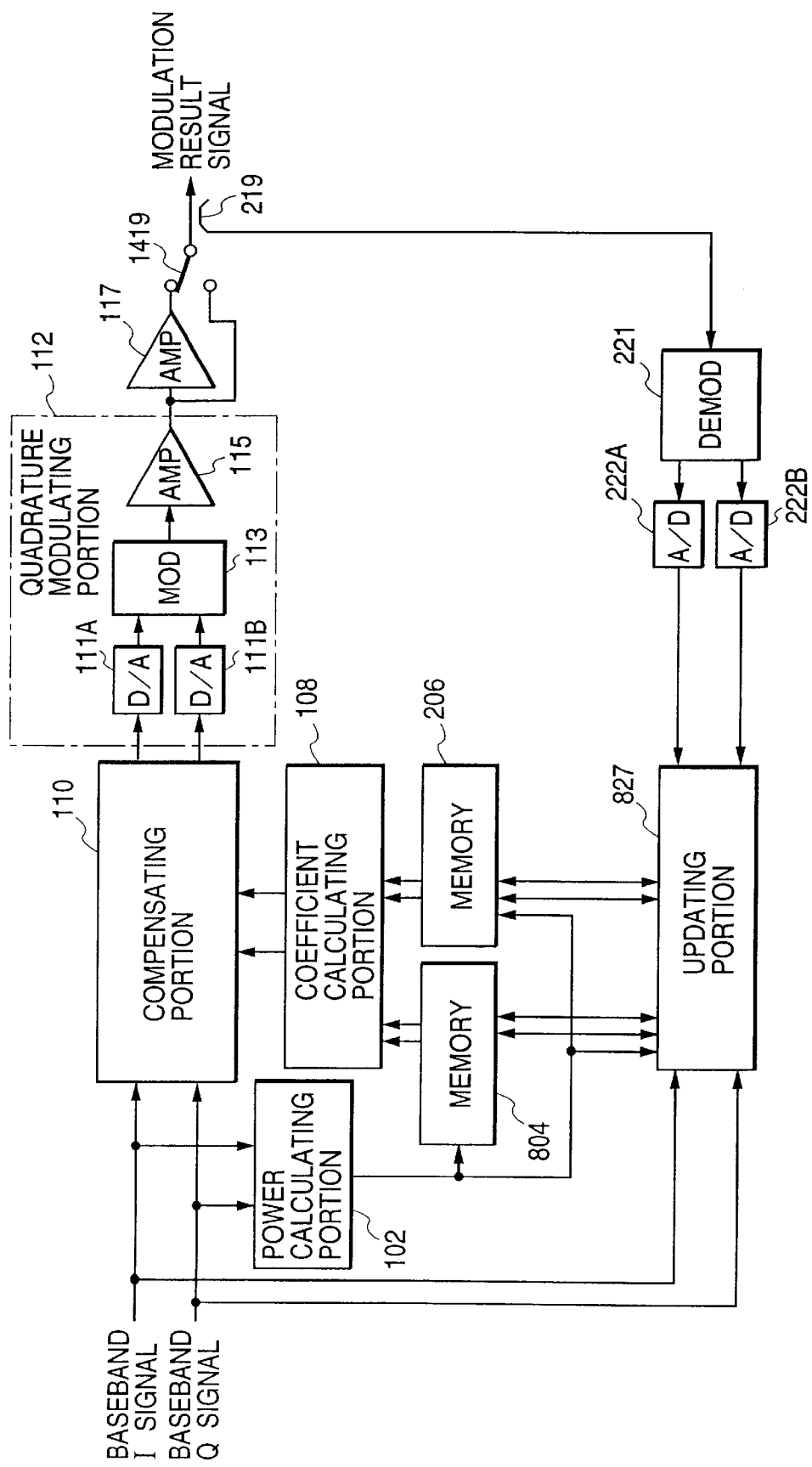
FIG. 23 is a block diagram of a portion of a radio transmitter equipped with a nonlinearity-caused distortion compensating system according to a twenty-first embodiment of this invention.

FIG. 23 shows a twenty-first embodiment of this invention which is similar to the embodiment of FIG. 14 except for design changes indicated hereinafter. The embodiment of FIG. 23 includes a switch 1419 interposed between the output terminal of the RF power amplifier 117 and the signal divider 219. The switch 1419 is connected to the output terminal of the quadrature modulating portion 112 (that is, the output terminal of the amplifier circuit 115). The signal divider 819 and the switch 823 (see FIG. 14) are omitted from the embodiment of FIG. 23. In the embodiment of FIG. 23, the signal divider 219 is directly connected to the quadrature demodulator 221.

The switch 1419 selects one of the output signal of the output signal of the RF power amplifier 117 and the output signal of the quadrature modulating portion 112. The switch 1419 transmits the selected signal to a later stage with which the signal divider 219 is associated. The signal divider 219 feeds a small portion of the signal from the switch 1419 to the quadrature demodulator 221.

When the switch 1419 selects the output signal of the RF power amplifier 117, the coefficient updating portion 827 outputs a pair of the new coefficient-representing digital signals to the memory 206. In the memory 206, the new coefficient-representing digital signals replace the old coefficient-representing digital signals which represent the old I and Q compensation coefficients designated by or corresponding to the calculated amplitude given by the power calculating portion 102. Accordingly, in the memory 206, a pair of the I and Q compensation coefficients corresponding to the calculated amplitude is renewed or updated in response to the output signals of the coefficient updating portion 827.

When the switch 1419 selects the output signal of the quadrature modulating portion 112, the coefficient updating portion 827 outputs a pair of the new coefficient-representing digital signals to the memory 804. In the memory 804, the new coefficient-representing digital signals replace the old coefficient-representing digital signals which represent the old I and Q compensation coefficients designated by or corresponding to the calculated amplitude given by the power calculating portion 102. Accordingly, in the memory 804, a pair of the I and Q compensation coefficients corresponding to the calculated amplitude is renewed or updated in response to the output signals of the coefficient updating portion 827.

Twenty-Second Embodiment

Figure 24:
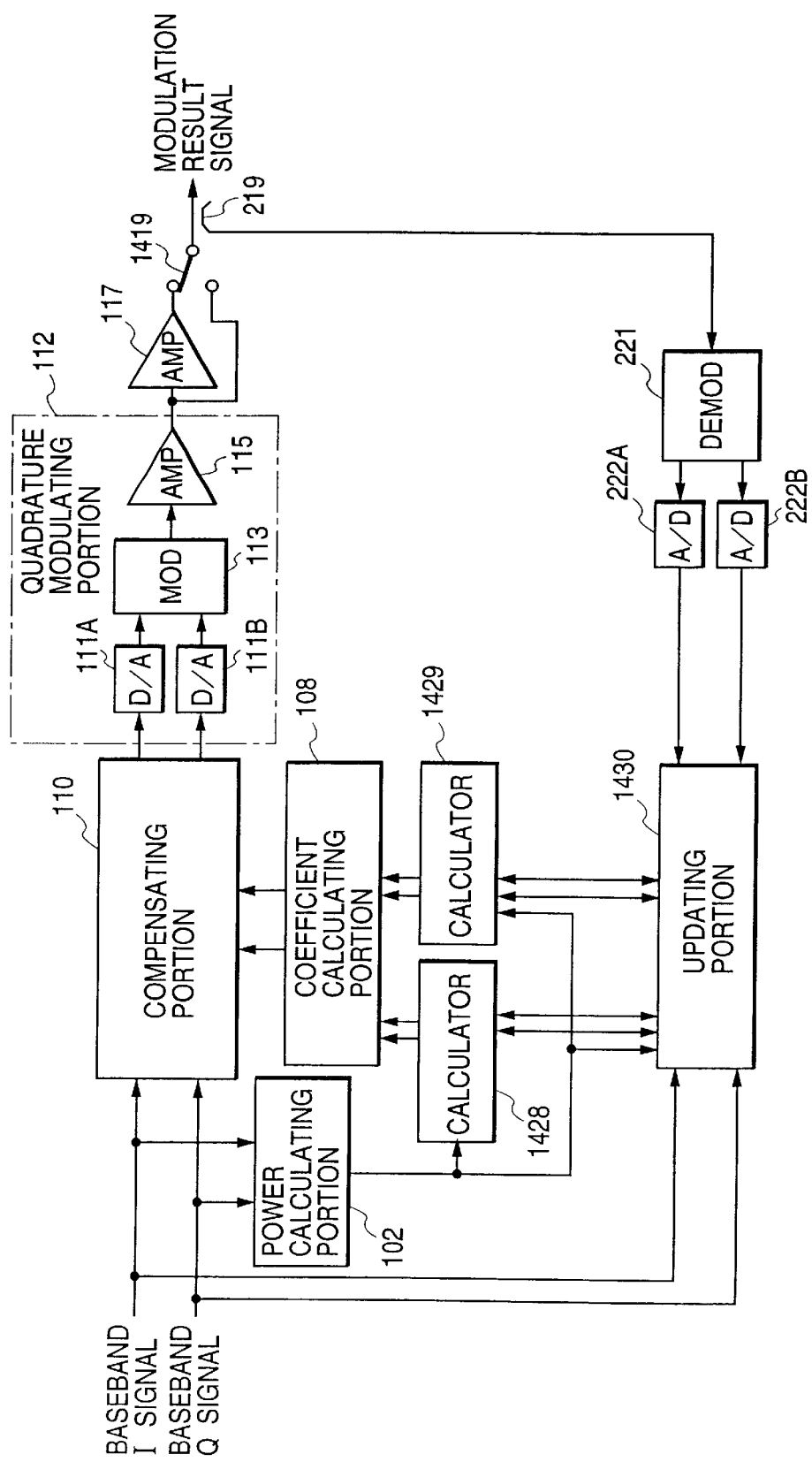
FIG. 24 is a block diagram of a portion of a radio transmitter equipped with a nonlinearity-caused distortion compensating system according to a twenty-second embodiment of this invention.

FIG. 24 shows a twenty-second embodiment of this invention which is similar to the embodiment of FIG. 23 except for design changes indicated hereinafter. The embodiment of FIG. 24 includes a calculator 1428, a calculator 1429, and an equation updating portion 1430 instead of the memory 804, the memory 206, and the coefficient updating portion 827 (see FIG. 23) respectively.

The calculator 1428 receives the output signal of the power calculating portion 102 which represents the calculated amplitude (the calculated power). The device 1428 calculates an I compensation coefficient and a Q compensation coefficient from the calculated amplitude (or the calculated power) according to I and Q equations. The I and Q equations are designed so that the calculated I and Q compensation coefficients will be effective in compensating for a signal distortion caused by the nonlinearity of the quadrature modulating portion 112. As will be made clear later, the I and Q equations can be updated from predetermined initial states. The calculator 1428 generates digital signals representing the calculated I and Q compensation coefficients. The calculator 1428 outputs the coefficient-representing digital signals to the compensation-coefficient calculating portion 108.

The calculator 1429 receives the output signal of the power calculating portion 102 which represents the calculated amplitude (or the calculated power). The device 1429 calculates an I compensation coefficient and a Q compensation coefficient from the calculated amplitude (or the calculated power) according to I and Q equations. The I and Q equations are designed so that the calculated I and Q compensation coefficients will be effective in compensating for a signal distortion caused by the nonlinearity of the RF power amplifier 117. As will be made clear later, the I and Q equations can be updated from predetermined initial states. The calculator 1429 generates digital signals representing the calculated I and Q compensation coefficients. The calculator 1429 outputs the coefficient-representing digital signals to the compensation-coefficient calculating portion 108.

The equation updating portion 1430 calculates an error between a pair of the input digital baseband I and Q signals and a pair of the recovered digital baseband I and Q signals.

When the switch 1419 selects the output signal of the RF power amplifier 117, the equation updating portion 1430 accesses the calculator 1429 and updates the I and Q equations in response to the calculated error. For example, coefficients in the I and Q equations are updated. The updating of the I and Q equations is designed to nullify the error.

When the switch 1419 selects the output signal of the quadrature modulating portion 112, the equation updating portion 1430 accesses the calculator 1428 and updates the I and Q equations in response to the calculated error. For example, coefficients in the I and Q equations are updated. The updating of the I and Q equations is designed to nullify the error.

Twenty-Third Embodiment

Figure 25:
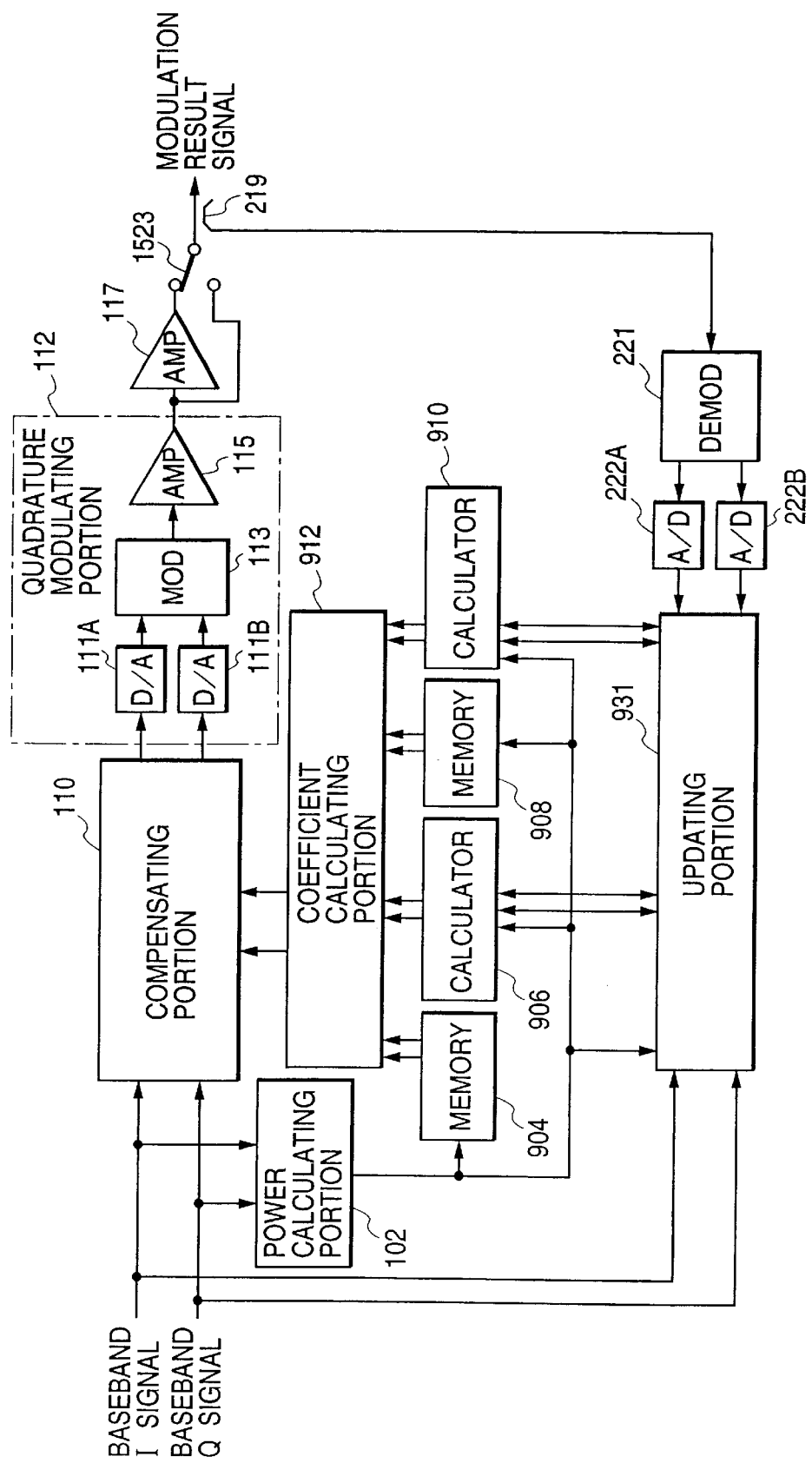
FIG. 25 is a block diagram of a portion of a radio transmitter equipped with a nonlinearity-caused distortion compensating system according to a twenty-third embodiment of this invention.

FIG. shows a twenty-third embodiment of this invention which is similar to the embodiment of FIG. 16 except for design changes indicated hereinafter. The embodiment of FIG. includes a switch 1523 interposed between the output terminal of the RF power amplifier 117 and the signal divider 219. The switch 1523 is connected to the output terminal of the quadrature modulating portion 112 (that is, the output terminal of the amplifier circuit 115). The signal divider 819 and the switch 823 (see FIG. 16) are omitted from the embodiment of FIG. 25. In the embodiment of FIG. 25, the signal divider 219 is directly connected to the quadrature demodulator 221.

The switch 1523 selects one of the output signal of the output signal of the RF power amplifier 117 and the output signal of the quadrature modulating portion 112. The switch 1523 transmits the selected signal to a later stage with which the signal divider 219 is associated. The signal divider 219 feeds a small portion of the signal from the switch 1523 to the quadrature demodulator 221.

When the switch 1523 selects the output signal of the RF power amplifier 117, the equation updating portion 931 accesses the calculator 910 and updates the I and Q equations in response to the calculated error. For example, coefficients in the I and Q equations are updated. The updating of the I and Q equations is designed to nullify the error.

When the switch 1523 selects the portion of the output signal of the quadrature modulating portion 112, the equation updating portion 931 accesses the calculator 906 and updates the I and Q equations in response to the calculated error. For example, coefficients in the I and Q equations are updated. The updating of the I and Q equations is designed to nullify the error.

Twenty-Fourth Embodiment

Figure 26:
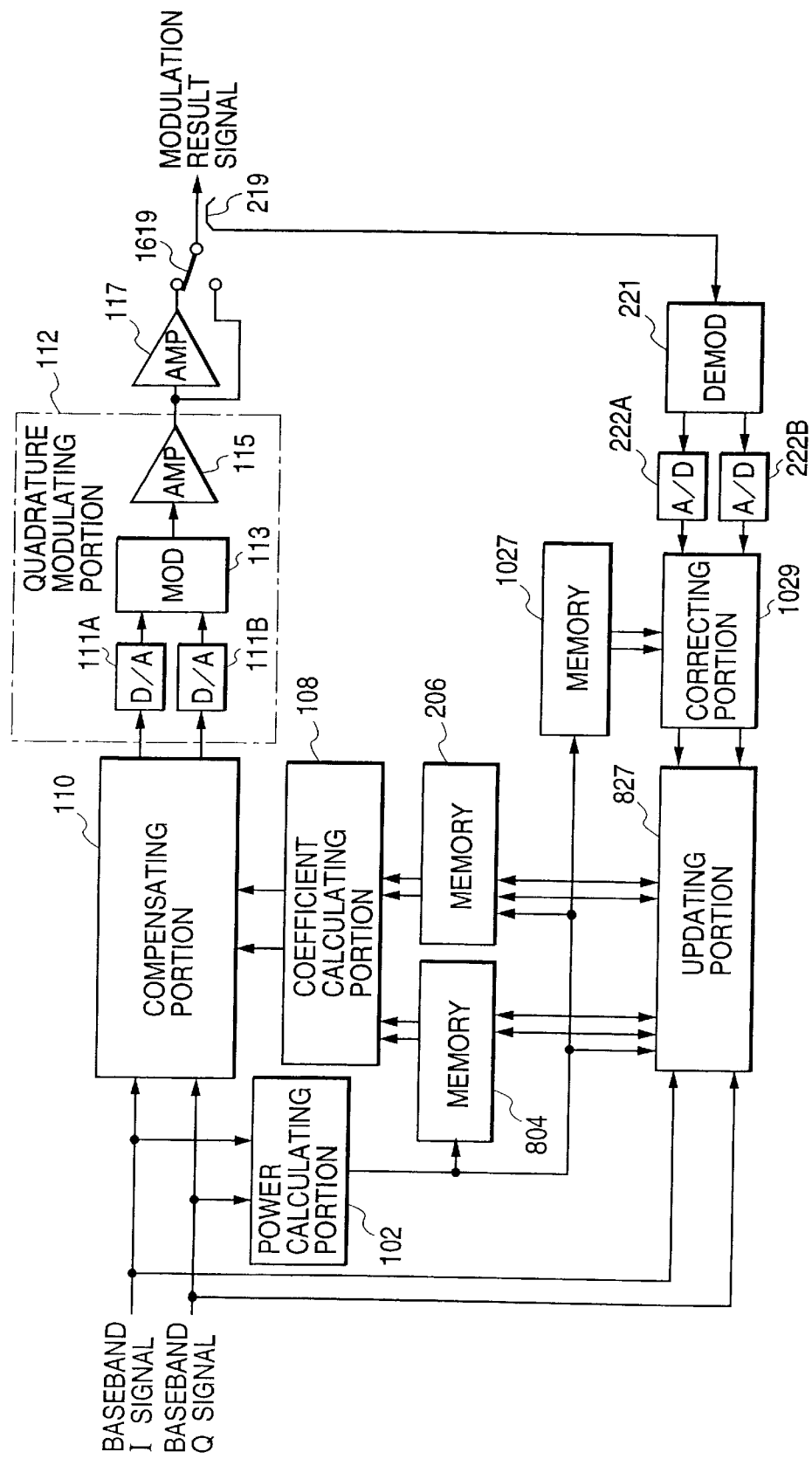
FIG. 26 is a block diagram of a portion of a radio transmitter equipped with a nonlinearity-caused distortion compensating system according to a twenty-fourth embodiment of this invention.

FIG. 26 shows a twenty-fourth embodiment of this invention which is similar to the embodiment of FIG. 17 except for design changes indicated hereinafter. The embodiment of FIG. 26 includes a switch 1619 interposed between the output terminal of the RF power amplifier 117 and the signal divider 219. The switch 1619 is connected to the output terminal of the quadrature modulating portion 112 (that is, the output terminal of the amplifier circuit 115). The signal divider 819 and the switch 823 (see FIG. 17) are omitted from the embodiment of FIG. 26. In the embodiment of FIG. 26, the signal divider 219 is directly connected to the quadrature demodulator 221.

The switch 1619 selects one of the output signal of the output signal of the RF power amplifier 117 and the output signal of the quadrature modulating portion 112. The switch 1619 transmits the selected signal to a later stage with which the signal divider 219 is associated. The signal divider 219 feeds a small portion of the signal from the switch 1619 to the quadrature demodulator 221.

When the switch 1619 selects the output signal of the RF power amplifier 117, the coefficient updating portion 827 outputs a pair of the new coefficient-representing digital signals to the memory 206. In the memory 206, the new coefficient-representing digital signals replace the old coefficient-representing digital signals which represent the old I and Q compensation coefficients designated by or corresponding to the calculated amplitude given by the power calculating portion 102. Accordingly, in the memory 206, a pair of the I and Q compensation coefficients corresponding to the calculated amplitude is renewed or updated in response to the output signals of the coefficient updating portion 827.

When the switch 1619 selects the output signal of the quadrature modulating portion 112, the coefficient updating portion 827 outputs a pair of the new coefficient-representing digital signals to the memory 804. In the memory 804, the new coefficient-representing digital signals replace the old coefficient-representing digital signals which represent the old I and Q compensation coefficients designated by or corresponding to the calculated amplitude given by the power calculating portion 102. Accordingly, in the memory 804, a pair of the I and Q compensation coefficients corresponding to the calculated amplitude is renewed or updated in response to the output signals of the coefficient updating portion 827.

Twenty-Fifth Embodiment

Figure 27:
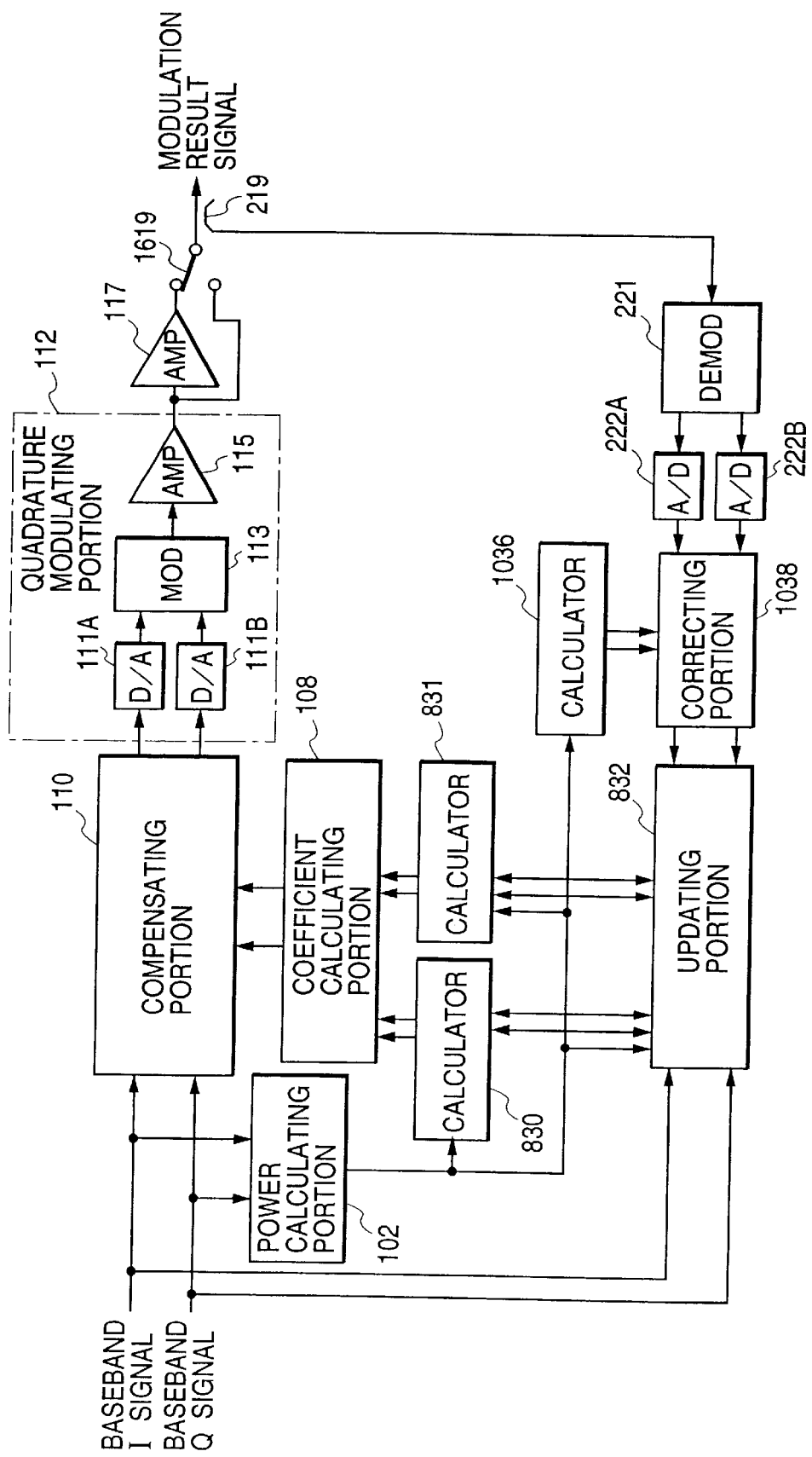
FIG. 27 is a block diagram of a portion of a radio transmitter equipped with a nonlinearity-caused distortion compensating system according to a twenty-fifth embodiment of this invention.

FIG. 27 shows a twenty-fifth embodiment of this invention which is similar to the embodiment of FIG. 18 except for design changes indicated hereinafter. The embodiment of FIG. 27 includes a switch 1619 interposed between the output terminal of the RF power amplifier 117 and the signal divider 219. The switch 1619 is connected to the output terminal of the quadrature modulating portion 112 (that is, the output terminal of the amplifier circuit 115). The signal divider 819 and the switch 823 (see FIG. 18) are omitted from the embodiment of FIG. 27. In the embodiment of FIG. 27, the signal divider 219 is directly connected to the quadrature demodulator 221.

The switch 1619 selects one of the output signal of the output signal of the RF power amplifier 117 and the output signal of the quadrature modulating portion 112. The switch 1619 transmits the selected signal to a later stage with which the signal divider 219 is associated. The signal divider 219 feeds a small portion of the signal from the switch 1619 to the quadrature demodulator 221.

When the switch 1619 selects the output signal of the RF power amplifier 117, the equation updating portion 832 accesses the calculator 831 and updates the I and Q equations in response to the calculated error. For example, coefficients in the I and Q equations are updated. The updating of the I and Q equations is designed to nullify the error.

When the switch 1619 selects the output signal of the quadrature modulating portion 112, the equation updating portion 832 accesses the calculator 830 and updates the I and Q equations in response to the calculated error. For example, coefficients in the I and Q equations are updated. The updating of the I and Q equations is designed to nullify the error.

Twenty-Sixth Embodiment

Figure 28:
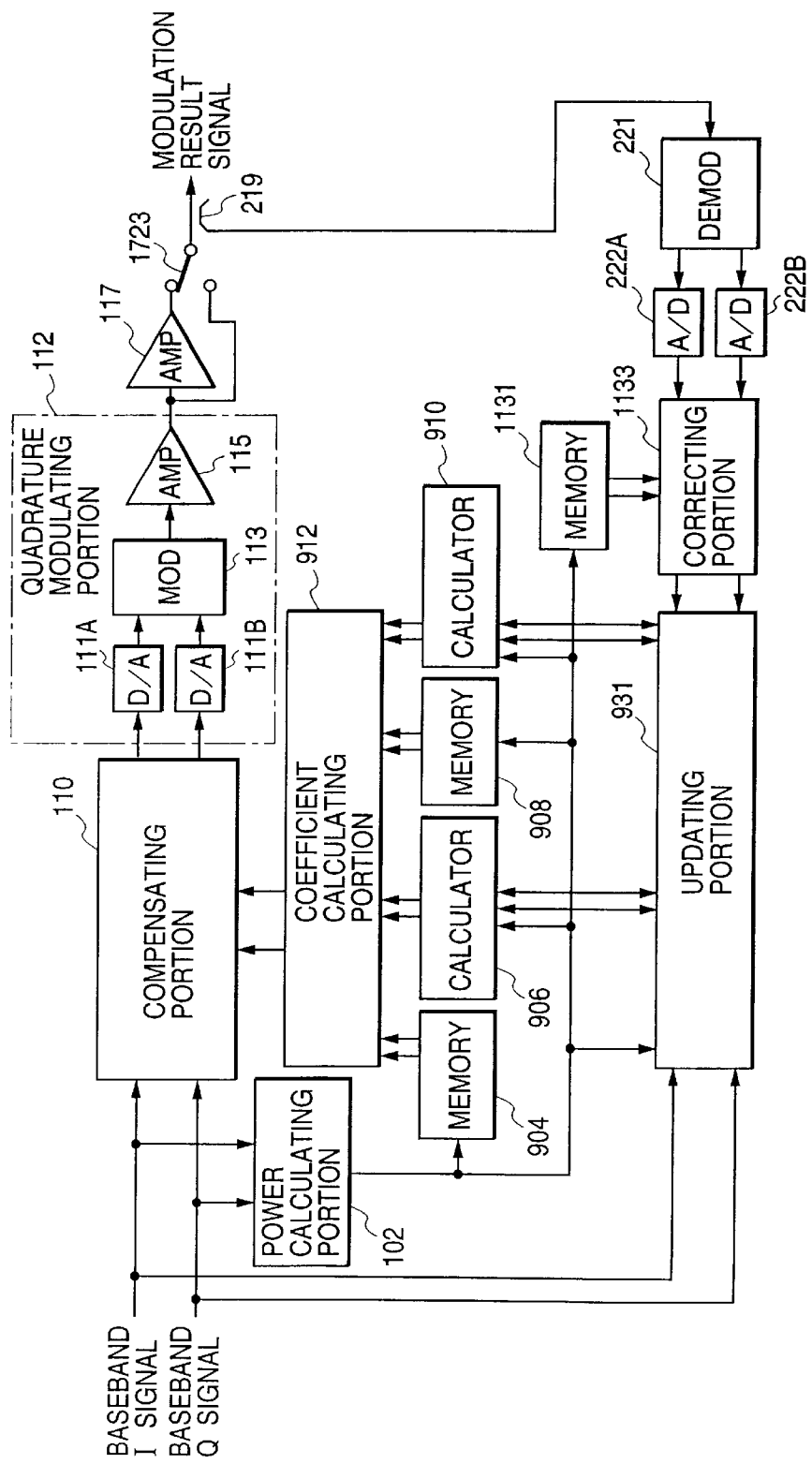
FIG. 28 is a block diagram of a portion of a radio transmitter equipped with a nonlinearity-caused distortion compensating system according to a twenty-sixth embodiment of this invention.

FIG. 28 shows a twenty-sixth embodiment of this invention which is similar to the embodiment of FIG. 19 except for design changes indicated hereinafter. The embodiment of FIG. 28 includes a switch 1723 interposed between the output terminal of the RF power amplifier 117 and the signal divider 219. The switch 1723 is connected to the output terminal of the quadrature modulating portion 112 (that is, the output terminal of the amplifier circuit 115). The signal divider 819 and the switch 823 (see FIG. 19) are omitted from the embodiment of FIG. 28. In the embodiment of FIG. 28, the signal divider 219 is directly connected to the quadrature demodulator 221.

The switch 1723 selects one of the output signal of the output signal of the RF power amplifier 117 and the output signal of the quadrature modulating portion 112. The switch 1723 transmits the selected signal to a later stage with which the signal divider 219 is associated. The signal divider 219 feeds a small portion of the signal from the switch 1723 to the quadrature demodulator 221.

When the switch 1723 selects the output signal of the RF power amplifier 117, the equation updating portion 931 accesses the calculator 910 and updates the I and Q equations in response to the calculated error. For example, coefficients in the I and Q equations are updated. The updating of the I and Q equations is designed to nullify the error.

When the switch 1723 selects the output signal of the quadrature modulating portion 112, the equation updating portion 931 accesses the calculator 906 and updates the I and Q equations in response to the calculated error. For example, coefficients in the I and Q equations are updated. The updating of the I and Q equations is designed to nullify the error.

Twenty-Seventh Embodiment

Figure 29:
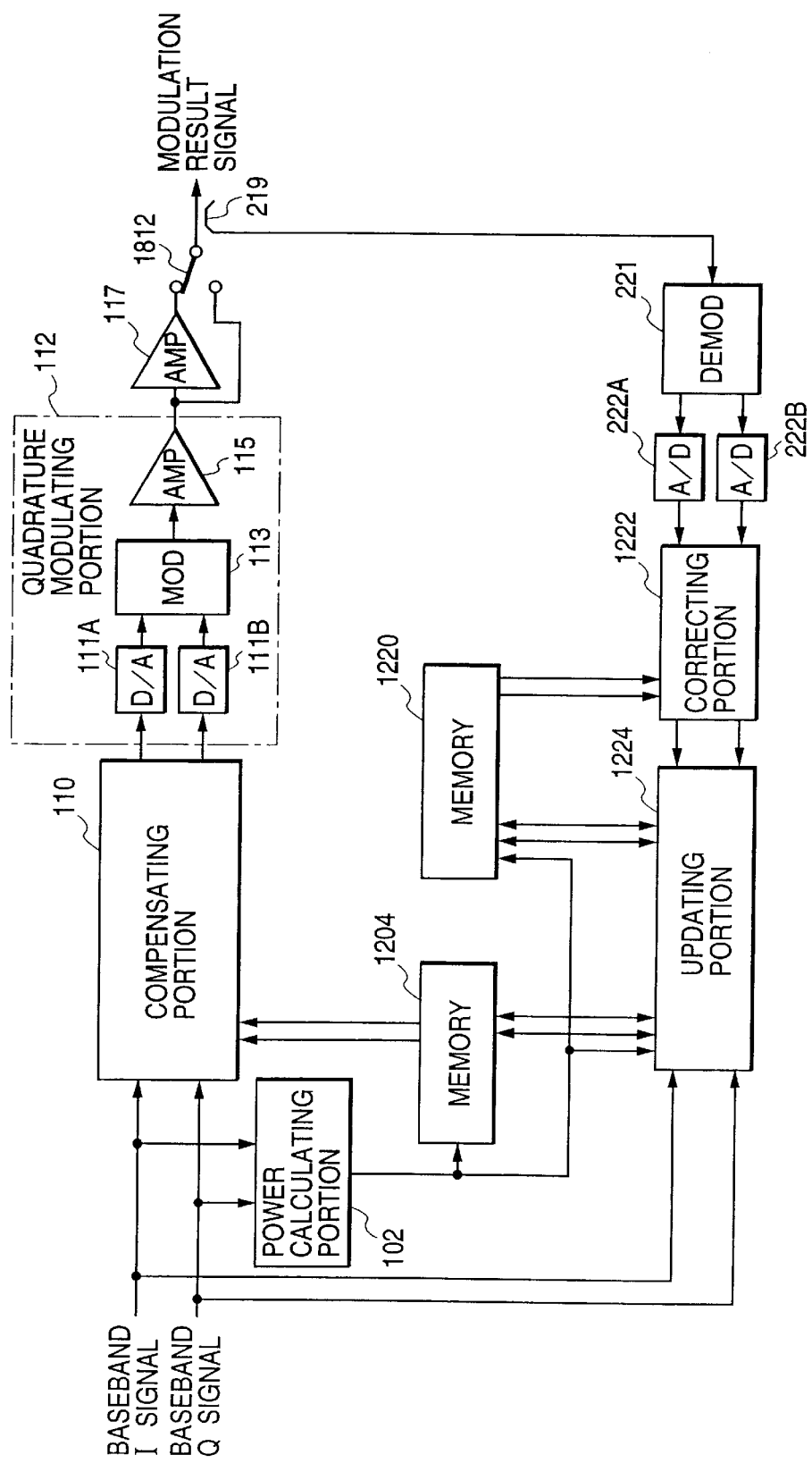
FIG. 29 is a block diagram of a portion of a radio transmitter equipped with a nonlinearity-caused distortion compensating system according to a twenty-seventh embodiment of this invention.

FIG. 29 shows a twenty-seventh embodiment of this invention which is similar to the embodiment of FIG. except for design changes indicated hereinafter. The embodiment of FIG. 29 includes a switch 1812 interposed between the output terminal of the RF power amplifier 117 and the signal divider 219. The switch 1812 is connected to the output terminal of the quadrature modulating portion 112 (that is, the output terminal of the amplifier circuit 115). The signal divider 819 and the switch 823 (see FIG. 20) are omitted from the embodiment of FIG. 29. In the embodiment of FIG. 29, the signal divider 219 is directly connected to the quadrature demodulator 221.

The switch 1812 selects one of the output signal of the output signal of the RF power amplifier 117 and the output signal of the quadrature modulating portion 112. The switch 1812 transmits the selected signal to a later stage with which the signal divider 219 is associated. The signal divider 219 feeds a small portion of the signal from the switch 1812 to the quadrature demodulator 221.

When the switch 1812 selects the output signal of the RF power amplifier 117, the coefficient updating portion 1224 calculates a pair of new I and Q compensation coefficients from the calculated error. The new I and Q compensation coefficients are designed to nullify the error. The coefficient updating portion 1224 generates a pair of new digital signals representing the new I and Q compensation coefficients respectively. When the switch 1812 selects the output signal of the RF power amplifier 117, the coefficient updating portion 1224 outputs a pair of the new coefficient-representing digital signals to the memory 1204. In the memory 1204, the new coefficient-representing digital signals replace the old coefficient-representing digital signals which represent the old I and Q compensation coefficients designated by or corresponding to the calculated amplitude given by the power calculating portion 102. Accordingly, in the memory 1204, a pair of the I and Q compensation coefficients corresponding to the calculated amplitude is renewed or updated in response to the output signals of the coefficient updating portion 1224.

When the switch 1812 selects the output signal of the quadrature modulating portion 112, the coefficient updating portion 1224 calculates a pair of new I and Q corrective coefficients from the calculated error. The new I and Q corrective coefficients are designed to nullify the error. The coefficient updating portion 1224 generates a pair of new digital signals representing the new I and Q corrective coefficients respectively. When the switch 1812 selects the output signal of the quadrature modulating portion 112, the coefficient updating portion 1224 outputs a pair of the new coefficient-representing digital signals to the memory 1220. In the memory 1220, the new coefficient-representing digital signals replace the old coefficient-representing digital signals which represent the old I and Q corrective coefficients designated by or corresponding to the calculated amplitude given by the power calculating portion 102. Accordingly, in the memory 1220, a pair of the I and Q corrective coefficients corresponding to the calculated amplitude is renewed or updated in response to the output signals of the coefficient updating portion 1224.

Twenty-Eighth Embodiment

Figure 30:
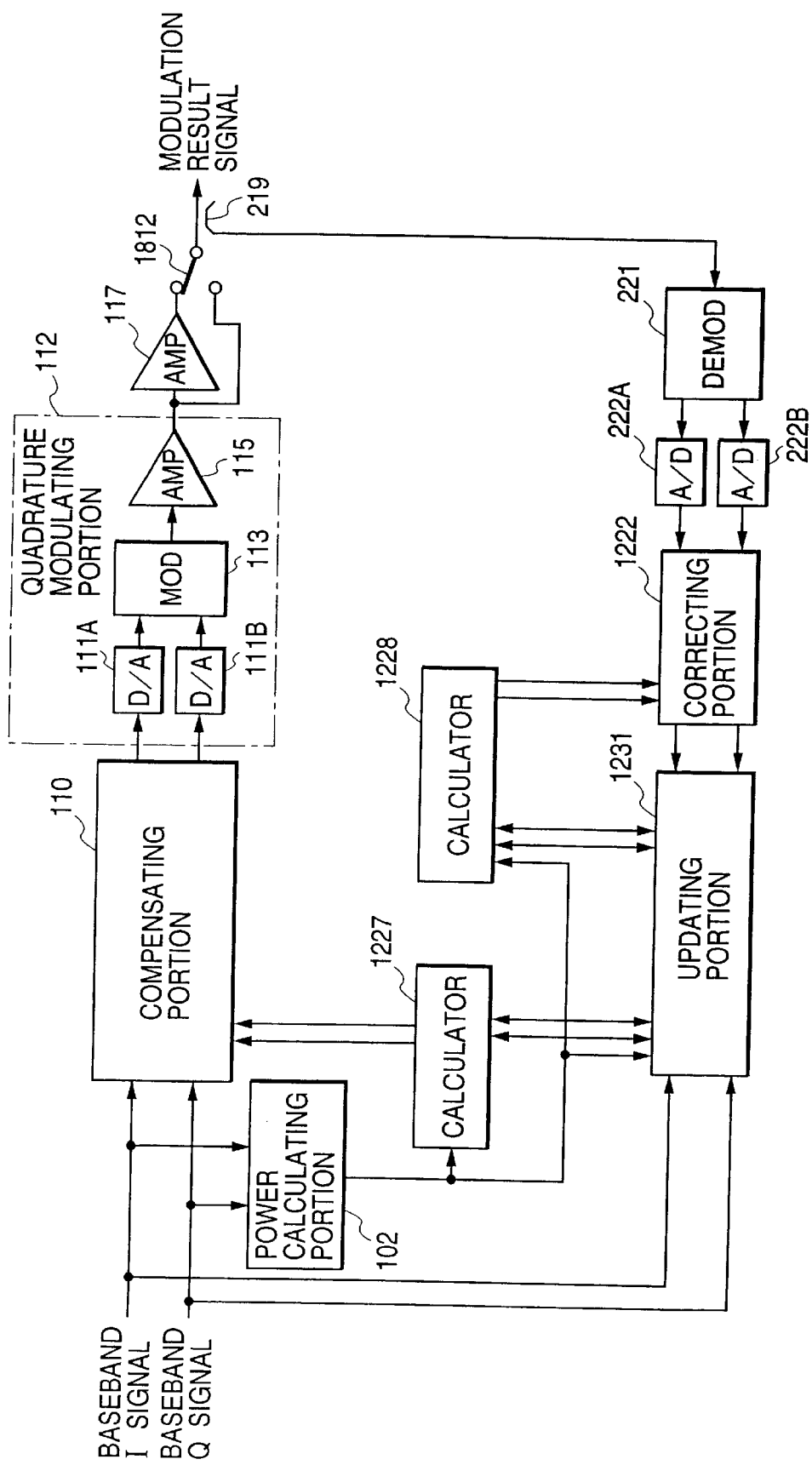
FIG. 30 is a block diagram of a portion of a radio transmitter equipped with a nonlinearity-caused distortion compensating system according to a twenty-eighth embodiment of this invention.

FIG. 30 shows a twenty-eighth embodiment of this invention which is similar to the embodiment of FIG. 21 except for design changes indicated hereinafter. The embodiment of FIG. 30 includes a switch 1812 interposed between the output terminal of the RF power amplifier 117 and the signal divider 219. The switch 1812 is connected to the output terminal of the quadrature modulating portion 112 (that is, the output terminal of the amplifier circuit 115). The signal divider 819 and the switch 823 (see FIG. 21) are omitted from the embodiment of FIG. 30. In the embodiment of FIG. 30, the signal divider 219 is directly connected to the quadrature demodulator 221.

The switch 1812 selects one of the output signal of the output signal of the RF power amplifier 117 and the output signal of the quadrature modulating portion 112. The switch 1812 transmits the selected signal to a later stage with which the signal divider 219 is associated. The signal divider 219 feeds a small portion of the signal from the switch 1812 to the quadrature demodulator 221.

When the switch 1812 selects the output signal of the RF power amplifier 117, the equation updating portion 1231 accesses the calculator 1227 and updates the I and Q equations in response to the calculated error. For example, coefficients in the I and Q equations are updated. The updating of the I and Q equations is designed to nullify the error.

When the switch 1812 selects the output signal of the quadrature modulating portion 112, the equation updating portion 832 accesses the calculator 1228 and updates the I and Q equations in response to the calculated error. For example, coefficients in the I and Q equations are updated. The updating of the I and Q equations is designed to nullify the error.

Twenty-Ninth Embodiment

Figure 31:
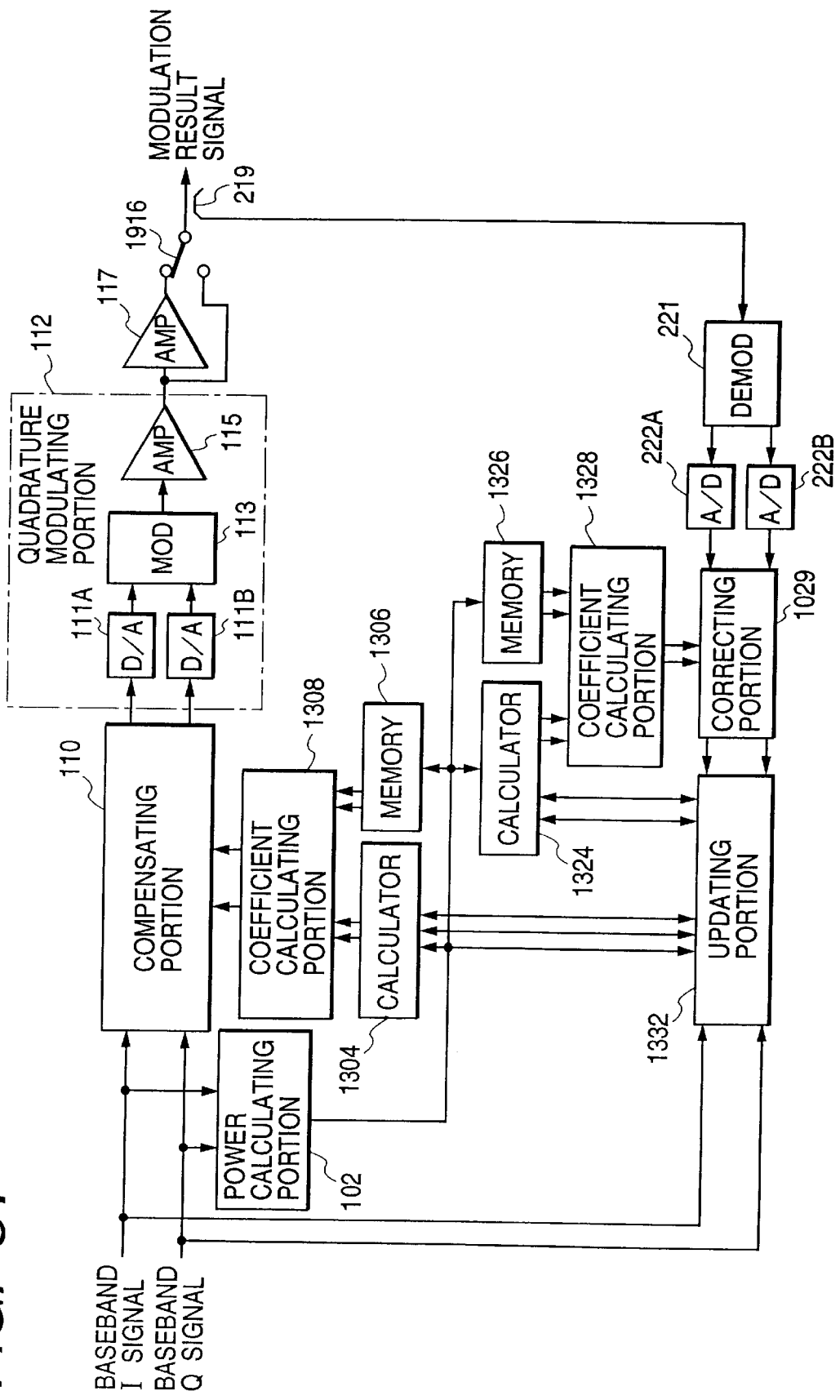
FIG. 31 is a block diagram of a portion of a radio transmitter equipped with a nonlinearity-caused distortion compensating system according to a twenty-ninth embodiment of this invention.

FIG. 31 shows a twenty-ninth embodiment of this invention which is similar to the embodiment of FIG. 22 except for design changes indicated hereinafter. The embodiment of FIG. 31 includes a switch 1916 interposed between the output terminal of the RF power amplifier 117 and the signal divider 219. The switch 1916 is connected to the output terminal of the quadrature modulating portion 112 (that is, the output terminal of the amplifier circuit 115). The signal divider 819 and the switch 823 (see FIG. 22) are omitted from the embodiment of FIG. 31. In the embodiment of FIG. 31, the signal divider 219 is directly connected to the quadrature demodulator 221.

The switch 1916 selects one of the output signal of the output signal of the RF power amplifier 117 and the output signal of the quadrature modulating portion 112. The switch 1916 transmits the selected signal to a later stage with which the signal divider 219 is associated. The signal divider 219 feeds a small portion of the signal from the switch 1916 to the quadrature demodulator 221.

When the switch 1916 selects the output signal of the RF power amplifier 117, the equation updating portion 1332 accesses the calculator 1304 and updates the I and Q equations in response to the calculated error. For example, coefficients in the I and Q equations are updated. The updating of the I and Q equations is designed to nullify the error.

When the switch 1916 selects the output signal of the quadrature modulating portion 112, the equation updating portion 1332 accesses the calculator 1324 and updates the I and Q equations in response to the calculated error. For example, coefficients in the I and Q equations are updated. The updating of the I and Q equations is designed to nullify the error.

What is claimed is:

1. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first distortion compensating coefficients in response to the value calculated by the power calculating portion, the first distortion compensating coefficients being designed to compensate for a signal distortion caused by a nonlinearity of the quadrature modulating portion;

second means for determining second distortion compensating coefficients in response to the value calculated by the power calculating portion, the second distortion compensating coefficients being designed to compensate for a signal distortion caused by a nonlinearity of the RF power amplifier;

a compensation-coefficient calculating portion for calculating final distortion compensating coefficients from the first distortion compensating coefficients determined by the first means and the second distortion compensating coefficients determined by the second means;

a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier; and third means for feeding the second baseband signals generated by the distortion compensating portion to the quadrature modulating portion.

2. A nonlinearity-caused distortion compensating system as recited in claim 1, wherein the first means includes a first memory for storing signals representing a first reference table providing a relation between the first distortion compensating coefficients and the value calculated by the power calculating portion, and the second means includes a second memory for storing signals representing a second reference table providing a relation between the second distortion compensating coefficients and the value calculated by the power calculating portion.

3. A nonlinearity-caused distortion compensating system as recited in claim 1, wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

4. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first distortion compensating coefficients in response to the value calculated by the power calculating portion, the first distortion compensating coefficients being designed to compensate for a signal distortion caused by a nonlinearity of the quadrature modulating portion;

second means for determining second distortion compensating coefficients in response to the value calculated by the power calculating portion according to a relation therebetween, the second distortion compensating coefficients being designed to compensate for a signal distortion caused by a nonlinearity of the RF power amplifier;

a compensation-coefficient calculating portion for calculating final distortion compensating coefficients from the first distortion compensating coefficients determined by the first means and the second distortion compensating coefficients determined by the second means;

a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier;

third means for feeding the second baseband signals generated by the distortion compensating portion to the quadrature modulating portion;

a signal divider connected to the RF power amplifier for separating a portion from an output signal of the RF power amplifier;

a quadrature demodulator for demodulating the signal portion separated by the signal divider into third baseband signals quadrature with respect to each other; and an updating portion for calculating an error between the first baseband signals and the third baseband signals, and for updating, in response to the calculated error, the relation between the second distortion compensating coefficients and the value calculated by the power calculating portion which is used by the second means.

5. A nonlinearity-caused distortion compensating system as recited in claim 4, wherein the first means includes a first memory for storing signals representing a first reference table providing a relation between the first distortion compensating coefficients and the value calculated by the power calculating portion, and the second means includes a second memory for storing signals representing a second reference table providing the relation between the second distortion compensating coefficients and the value calculated by the power calculating portion.

6. A nonlinearity-caused distortion compensating system as recited in claim 4, wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

7. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion, the first compensation coefficients being designed to compensate for a signal distortion caused by a nonlinearity of the quadrature modulating portion;

second means for determining second compensation coefficients in response to the value calculated by the power calculating portion, the second compensation coefficients being designed to compensate for a signal distortion caused by a nonlinearity of the RF power amplifier;

a calculator for calculating third compensation coefficients from the value calculated by the power calculating portion according to equations, the third compensation coefficients being designed to compensate for a variation in characteristics of at least one of the quadrature modulating portion and the RF power amplifier;

a compensation-coefficient calculating portion for calculating final compensation coefficients from the first compensation coefficients determined by the first means, the second compensation coefficients determined by the second means, and the third compensation coefficients calculated by the calculator;

a compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier and to compensate for a variation in the characteristics of at least one of the quadrature modulating portion and the RF power amplifier;

third means for feeding the second baseband signals generated by the compensating portion to the quadrature modulating portion;

a signal divider connected to the RF power amplifier for separating a portion from an output signal of the RF power amplifier;

a quadrature demodulator for demodulating the signal portion separated by the signal divider into third baseband signals quadrature with respect to each other; and an updating portion for calculating an error between the first baseband signals and the third baseband signals, and for updating the equations used by the calculator in response to the calculated error.

8. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining compensation coefficients in response to the value calculated by the power calculating portion according to a relation therebetween, the compensation coefficients being designed to compensate for a signal distortion caused by at least one of a nonlinearity of the quadrature modulating portion and a nonlinearity of the RF power amplifier;

a compensating portion for converting the first baseband signals into second baseband signals quadrature with respect to each other in response to the compensation coefficients determined by the first means to compensate for a signal distortion caused by at least one of the nonlinearity of the quadrature modulating portion and the nonlinearity of the RF power amplifier;

second means for feeding the second baseband signals generated by the compensating portion to the quadrature modulating portion;

a signal divider connected to the RF power amplifier for separating a portion from an output signal of the RF power amplifier;

a quadrature demodulator for demodulating the signal portion separated by the signal divider into third baseband signals quadrature with respect to each other;

third means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, and for updating, in response to the calculated error, the relation between the compensation coefficients and the value calculated by the power calculating portion which is provided by the first means.

9. A nonlinearity-caused distortion compensating system as recited in claim 8, wherein the first means includes a first memory for storing signals representing a first reference table providing the relation between the compensation coefficients and the value calculated by the power calculating portion, and the third means includes a second memory for storing signals representing a second reference table providing a relation between the corrective coefficients and the value calculated by the power calculating portion.

10. A nonlinearity-caused distortion compensating system as recited in claim 8, wherein the first means includes a first calculator for calculating the compensation coefficients from the value calculated by the power calculating portion according to first equations, and the third means includes a second calculator for calculating the corrective coefficients from the value calculated by the power calculating portion according to second equations.

11. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion, the first compensation coefficients being designed to compensate for a signal distortion caused by at least one of a nonlinearity of the quadrature modulating portion and a nonlinearity of the RF power amplifier;

a calculator for calculating second compensation coefficients from the value calculated by the power calculating portion according to equations, the second compensation coefficients being designed to compensate for a variation in characteristics of at least one of the quadrature modulating portion and the RF power amplifier;

a compensation-coefficient calculating portion for calculating final compensation coefficients from the first compensation coefficients determined by the first means and the second compensation coefficients determined by the calculator;

a compensating portion for converting the first baseband signals into second baseband signals quadrature with respect to each other in response to the final compensation coefficients calculated by the compensation-coefficient calculating portion to compensate for a signal distortion caused by at least one of the nonlinearity of the quadrature modulating portion and the nonlinearity of the RF power amplifier and to compensate for a variation in the characteristics of at least one of the quadrature modulating portion and the RF power amplifier;

second means for feeding the second baseband signals generated by the compensating portion to the quadrature modulating portion;

a signal divider connected to the RF power amplifier for separating a portion from an output signal of the RF power amplifier;

a quadrature demodulator for demodulating the signal portion separated by the signal divider into third baseband signals quadrature with respect to each other;

third means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, and for updating the equations used by the calculator in response to the calculated error.

12. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first distortion compensating coefficients in response to the value calculated by the power calculating portion, the first distortion compensating coefficients being designed to compensate for a signal distortion caused by a nonlinearity of the quadrature modulating portion;

second means for determining second distortion compensating coefficients in response to the value calculated by the power calculating portion according to a relation therebetween, the second distortion compensating coefficients being designed to compensate for a signal distortion caused by a nonlinearity of the RF power amplifier;

a compensation-coefficient calculating portion for calculating final distortion compensating coefficients from the first distortion compensating coefficients determined by the first means and the second distortion compensating coefficients determined by the second means;

a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier;

third means for feeding the second baseband signals generated by the distortion compensating portion to the quadrature modulating portion;

a signal divider connected to the RF power amplifier for separating a portion from an output signal of the RF power amplifier;

a quadrature demodulator for demodulating the signal portion separated by the signal divider into third baseband signals quadrature with respect to each other;

fourth means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the fourth means to compensate for a signal distortion caused by the nonlinearity of the quadrature demodulator; and an updating portion for calculating an error between the first baseband signals and the fourth baseband signals, and for updating, in response to the calculated error, the relation between the second distortion compensating coefficients and the value calculated by the power calculating portion which is used by the second means.

13. A nonlinearity-caused distortion compensating system as recited in claim 12, wherein the first means includes a first memory for storing signals representing a first reference table providing a relation between the first distortion compensating coefficients and the value calculated by the power calculating portion, and the second means includes a second memory for storing signals representing a second reference table providing the relation between the second distortion compensating coefficients and the value calculated by the power calculating portion, and the fourth means includes a third memory for storing signals representing a third reference table providing a relation between the corrective coefficients and the value calculated by the power calculating portion.

14. A nonlinearity-caused distortion compensating system as recited in claim 12, wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations, and the fourth means includes a third calculator for calculating the corrective coefficients from the value calculated by the power calculating portion according to third equations.

15. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion, the first compensation coefficients being designed to compensate for a signal distortion caused by a nonlinearity of the quadrature modulating portion;

second means for determining second compensation coefficients in response to the value calculated by the power calculating portion, the second compensation coefficients being designed to compensate for a signal distortion caused by a nonlinearity of the RF power amplifier;

a calculator for calculating third compensation coefficients from the value calculated by the power calculating portion according to equations, the third compensation coefficients being designed to compensate for a variation in characteristics of at least one of the quadrature modulating portion and the REF power amplifier;

a compensation-coefficient calculating portion for calculating final compensation coefficients from the first compensation coefficients determined by the first means, the second compensation coefficients determined by the second means, and the third compensation coefficients calculated by the calculator;

a compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier and to compensate for a variation in the characteristics of at least one of the quadrature modulating portion and the RF power amplifier;

third means for feeding the second baseband signals generated by the compensating portion to the quadrature modulating portion;

a signal divider connected to the RF power amplifier for separating a portion from an output signal of the RF power amplifier;

a quadrature demodulator for demodulating the signal portion separated by the signal divider into third baseband signals quadrature with respect to each other;

fourth means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the fourth means to compensate for a signal distortion caused by the nonlinearity of the quadrature demodulator; and an updating portion for calculating an error between the first baseband signals and the fourth baseband signals, and for updating the equations used by the calculator in response to the calculated error.

16. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first distortion compensating coefficients in response to the value calculated by the power calculating portion according to a relation therebetween, the first distortion compensating coefficients being designed to compensate for a signal distortion caused by a nonlinearity of the quadrature modulating portion;

second means for determining second distortion compensating coefficients in response to the value calculated by the power calculating portion according to a relation therebetween, the second distortion compensating coefficients being designed to compensate for a signal distortion caused by a nonlinearity of the RF power amplifier;

a compensation-coefficient calculating portion for calculating final distortion compensating coefficients from the first distortion compensating coefficients determined by the first means and the second distortion compensating coefficients determined by the second means;

a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the PF power amplifier;

third means for feeding the second baseband signals generated by the distortion compensating portion to the quadrature modulating portion;

a first signal divider connected to the quadrature modulating portion for separating a portion from an output signal of the quadrature modulating portion;

a second signal divider connected to the RF power amplifier for separating a portion from an output signal of the RF power amplifier;

a switch for selecting one of the signal portion separated by the first signal divider and the signal portion separated by the second signal divider;

a quadrature demodulator for demodulating the signal portion selected by the switch into third baseband signals quadrature with respect to each other; and an updating portion for calculating an error between the first baseband signals and the third baseband signals, for updating, in response to the calculated error, the relation between the first distortion compensating coefficients and the value calculated by the power calculating portion which is used by the first means when the switch selects the signal portion separated by the first signal divider, and for updating, in response to the calculated error, the relation between the second distortion compensating coefficients and the value calculated by the power calculating portion which is used by the second means when the switch selects the signal portion separated by the second signal divider.

17. A nonlinearity-caused distortion compensating system as recited in claim 16, wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion.

18. A nonlinearity-caused distortion compensating system as recited in claim 16, wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

19. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion according to a relation therebetween, the first compensation coefficients being designed to compensate for a signal distortion caused by a nonlinearity of the quadrature modulating portion;

second means for determining second compensation coefficients in response to the value calculated by the power calculating portion according to a relation therebetween, the second compensation coefficients being designed to compensate for a signal distortion caused by a nonlinearity of the RF power amplifier;

a first calculator for calculating third compensation coefficients from the value calculated by the power calculating portion according to first equations, the third compensation coefficients being designed to compensate for a variation in characteristics of the quadrature modulating portion;

a second calculator for calculating fourth compensation coefficients from the value calculated by the power calculating portion according to second equations, the fourth compensation coefficients being designed to compensate for a variation in characteristics of the RF power amplifier;

a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator;

a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier;

third means for feeding the second baseband signals generated by the distortion compensating portion to the quadrature modulating portion;

a first signal divider connected to the quadrature modulating portion for separating a portion from an output signal of the quadrature modulating portion;

a second signal divider connected to the RF power amplifier for separating a portion from an output signal of the RF power amplifier;

a switch for selecting one of the signal portion separated by the first signal divider and the signal portion separated by the second signal divider;

a quadrature demodulator for demodulating the signal portion selected by the switch into third baseband signals quadrature with respect to each other; and an updating portion for calculating an error between the first baseband signals and the third baseband signals, for updating the first equations used by the first calculator in response to the calculated error when the switch selects the signal portion separated by the first signal divider, and for updating the second equations used by the second calculator in response to the calculated error when the switch selects the signal portion separated by the second signal divider.

20. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first distortion compensating coefficients in response to the value calculated by the power calculating portion according to a relation therebetween, the first distortion compensating coefficients being designed to compensate for a signal distortion caused by a nonlinearity of the quadrature modulating portion;

second means for determining second distortion compensating coefficients in response to the value calculated by the power calculating portion according to a relation therebetween, the second distortion compensating coefficients being designed to compensate for a signal distortion caused by a nonlinearity of the RF power amplifier;

a compensation-coefficient calculating portion for calculating final distortion compensating coefficients from the first distortion compensating coefficients determined by the first means and the second distortion compensating coefficients determined by the second means;

a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier;

third means for feeding the second baseband signals generated by the distortion compensating portion to the quadrature modulating portion;

a first signal divider connected to the quadrature modulating portion for separating a portion from an output signal of the quadrature modulating portion;

a second signal divider connected to the RF power amplifier for separating a portion from an output signal of the RF power amplifier;

a switch for selecting one of the signal portion separated by the first signal divider and the signal portion separated by the second signal divider;

a quadrature demodulator for demodulating the signal portion selected by the switch into third baseband signals quadrature with respect to each other;

fourth means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the first distortion compensating coefficients and the value calculated by the power calculating portion which is used by the first means when the switch selects the signal portion separated by the first signal divider, and for updating, in response to the calculated error, the relation between the second distortion compensating coefficients and the value calculated by the power calculating portion which is used by the second means when the switch selects the signal portion separated by the second signal divider.

21. A nonlinearity-caused distortion compensating system as recited in claim 20, wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion, and the fourth means includes a third memory for storing signals representing a third reference table providing a relation between the corrective coefficients and the value calculated by the power calculating portion.

22. A nonlinearity-caused distortion compensating system as recited in claim 20, wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations, and the fourth means includes a third calculator for calculating the corrective coefficients from the value calculated by the power calculating portion according to third equations.

23. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion according to a relation therebetween, the first compensation coefficients being designed to compensate for a signal distortion caused by a nonlinearity of the quadrature modulating portion;

second means for determining second compensation coefficients in response to the value calculated by the power calculating portion according to a relation therebetween, the second compensation coefficients being designed to compensate for a signal distortion caused by a nonlinearity of the RF power amplifier;

a first calculator for calculating third compensation coefficients from the value calculated by the power calculating portion according to first equations, the third compensation coefficients being designed to compensate for a variation in characteristics of the quadrature modulating portion;

a second calculator for calculating fourth compensation coefficients from the value calculated by the power calculating portion according to second equations, the fourth compensation coefficients being designed to compensate for a variation in characteristics of the RF power amplifier;

a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator;

a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier;

third means for feeding the second baseband signals generated by the distortion compensating portion to the quadrature modulating portion;

a first signal divider connected to the quadrature modulating portion for separating a portion from an output signal of the quadrature modulating portion;

a second signal divider connected to the RF power amplifier for separating a portion from an output signal of the RF power amplifier;

a switch for selecting one of the signal portion separated by the first signal divider and the signal portion separated by the second signal divider;

a quadrature demodulator for demodulating the signal portion selected by the switch into third baseband signals quadrature with respect to each other;

fourth means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating the first equations used by the first calculator in response to the calculated error when the switch selects the signal portion separated by the first signal divider, and for updating the second equations used by the second calculator in response to the calculated error when the switch selects the signal portion separated by the second signal divider.

24. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining compensation coefficients in response to the value calculated by the power calculating portion according to a relation therebetween, the compensation coefficients being designed to compensate for a signal distortion caused by at least one of a nonlinearity of the quadrature modulating portion and a nonlinearity of the RF power amplifier;

a distortion compensating portion for converting the first baseband signals into second baseband signals quadrature with respect to each other in response to the compensation coefficients determined by the first means to compensate for a signal distortion caused by at least one of the nonlinearity of the quadrature modulating portion and the nonlinearity of the RF power amplifier;

second means for feeding the second baseband signals generated by the distortion compensating portion to the quadrature modulating portion;

a first signal divider connected to the quadrature modulating portion for separating a portion from an output signal of the quadrature modulating portion;

a second signal divider connected to the RF power amplifier for separating a portion from an output signal of the RF power amplifier;

a switch for selecting one of the signal portion separated by the first signal divider and the signal portion separated by the second signal divider;

a quadrature demodulator for demodulating the signal portion selected by the switch into third baseband signals quadrature with respect to each other;

third means for determining corrective coefficients in response to the value calculated by the power calculating portion according to a relation therebetween, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the compensation coefficients and the value calculated by the power calculating portion which is used by the first means when the switch selects the signal portion separated by the second signal divider, and for updating, in response to the calculated error, the relation between the corrective coefficients and the value calculated by the power calculating portion which is used by the third means when the switch selects the signal portion separated by the first signal divider.

25. A nonlinearity-caused distortion compensating system as recited in claim 24, wherein the first means includes a first memory for storing signals representing a first reference table providing the relation between the compensation coefficients and the value calculated by the power calculating portion, and the third means includes a second memory for storing signals representing a second reference table providing the corrective coefficients and the value calculated by the power calculating portion.

26. A nonlinearity-caused distortion compensating system as recited in claim 24, wherein the first means includes a first calculator for calculating the compensation coefficients from the value calculated by the power calculating portion according to first equations, and the third means includes a second calculator for calculating the corrective coefficients from the value calculated by the power calculating portion according to second equations.

27. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion, the first compensation coefficients being designed to compensate for a signal distortion caused by at least one of a nonlinearity of the quadrature modulating portion and a nonlinearity of the RF power amplifier;

a first calculator for calculating second compensation coefficients from the value calculated by the power calculating portion according to first equations, the second compensation coefficients being designed to compensate for a variation in characteristics of at least one of the quadrature modulating portion and the RF power amplifier;

a compensation-coefficient calculating portion for calculating final compensation coefficients from the first compensation coefficients determined by the first means and the second compensation coefficients determined by the first calculator;

a distortion compensating portion for converting the first baseband signals into second baseband signals quadrature with respect to each other in response to the final compensation coefficients calculated by the compensation-coefficient calculating portion to compensate for a signal distortion caused by at least one of the nonlinearity of the quadrature modulating portion and the nonlinearity of the RF power amplifier, and to compensate for a variation in the characteristics of at least one of the quadrature modulating portion and the RF power amplifier;

second means for feeding the second baseband signals generated by the distortion compensating portion to the quadrature modulating portion;

a first signal divider connected to the quadrature modulating portion for separating a portion from an output signal of the quadrature modulating portion;

a second signal divider connected to the RF power amplifier for separating a portion from an output signal of the RF power amplifier;

a switch for selecting one of the signal portion separated by the first signal divider and the signal portion separated by the second signal divider;

a quadrature demodulator for demodulating the signal portion selected by the switch into third baseband signals quadrature with respect to each other;

third means for determining first corrective coefficients in response to the value calculated by the power calculating portion, the first corrective coefficients being designed to compensate for a signal distortion caused by a nonlinearity of the quadrature demodulator;

a second calculator for calculating second corrective coefficients from the value calculated by the power calculating portion according to second equations, the second corrective coefficients being designed to compensate for a variation in characteristics of the quadrature demodulator;

a corrective-coefficient calculating portion for calculating final corrective coefficients from the first corrective coefficients determined by the third means and the second corrective coefficients determined by the second calculator;

a correcting portion for converting the third baseband signals generated by the quadrature demodulator into fourth baseband signals quadrature with respect to each other in response to the final corrective coefficients determined by the corrective-coefficient calculating portion to compensate for a signal distortion caused by the nonlinearity of the quadrature demodulator, and to compensate for a variation in the characteristics of the quadrature demodulator; and an updating portion for calculating an error between the first baseband signals and the fourth baseband signals, for updating the first equations used by the first calculator in response to the calculated error when the switch selects the signal portion separated by the second signal divider, and for updating the second equations used by the second calculator in response to the calculated error when the switch selects the signal portion separated by the first signal divider.

28. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first distortion compensating coefficients in response to the value calculated by the power calculating portion according to a relation therebetween, the first distortion compensating coefficients being designed to compensate for a signal distortion caused by a nonlinearity of the quadrature modulating portion;

second means for determining second distortion compensating coefficients in response to the value calculated by the power calculating portion according to a relation therebetween, the second distortion compensating coefficients being designed to compensate for a signal distortion caused by a nonlinearity of the RF power amplifier;

a compensation-coefficient calculating portion for calculating final distortion compensating coefficients from the first distortion compensating coefficients determined by the first means and the second distortion compensating coefficients determined by the second means;

a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier;

third means for feeding the second baseband signals generated by the distortion compensating portion to the quadrature modulating portion;

a switch connected to the quadrature modulating portion and the RF power amplifier for selecting one of an output signal of the quadrature modulating portion and an output signal of the RF power amplifier;

a signal divider connected to the switch for separating a portion from the signal selected by the switch;

a quadrature demodulator for demodulating the signal portion selected by the switch into third baseband signals quadrature with respect to each other; and an updating portion for calculating an error between the first baseband signals and the third baseband signals, for updating, in response to the calculated error, the relation between the first distortion compensating coefficients and the value calculated by the power calculating portion which is used by the first means when the switch selects the output signal of the quadrature modulating portion, and for updating, in response to the calculated error, the relation between the second distortion compensating coefficients and the value calculated by the power calculating portion which is used by the second means when the switch selects the output signal of the RF power amplifier.

29. A nonlinearity-caused distortion compensating system as recited in claim 28, wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion.

30. A nonlinearity-caused distortion compensating system as recited in claim 28, wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations.

31. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion according to a relation therebetween, the first compensation coefficients being designed to compensate for a signal distortion caused by a nonlinearity of the quadrature modulating portion;

second means for determining second compensation coefficients in response to the value calculated by the power calculating portion according to a relation therebetween, the second compensation coefficients being designed to compensate for a signal distortion caused by a nonlinearity of the RF power amplifier;

a first calculator for calculating third compensation coefficients from the value calculated by the power calculating portion according to first equations, the third compensation coefficients being designed to compensate for a variation in characteristics of the quadrature modulating portion;

a second calculator for calculating fourth compensation coefficients from the value calculated by the power calculating portion according to second equations, the fourth compensation coefficients being designed to compensate for a variation in characteristics of the RF power amplifier;

a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator;

a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier;

third means for feeding the second baseband signals generated by the distortion compensating portion to the quadrature modulating portion;

a switch connected to the quadrature modulating portion and the RF power amplifier for selecting one of an output signal of the quadrature modulating portion and an output signal of the RF power amplifier;

a signal divider connected to the switch for separating a portion from the signal selected by the switch;

a quadrature demodulator for demodulating the signal portion selected by the switch into third baseband signals quadrature with respect to each other; and an updating portion for calculating an error between the first baseband signals and the third baseband signals, for updating the first equations used by the first calculator in response to the calculated error when the switch selects the output signal of the quadrature modulating portion, and for updating the second equations used by the second calculator in response to the calculated error when the switch selects the output signal of the PF power amplifier.

32. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first distortion compensating coefficients in response to the value calculated by the power calculating portion according to a relation therebetween, the first distortion compensating coefficients being designed to compensate for a signal distortion caused by a nonlinearity of the quadrature modulating portion;

second means for determining second distortion compensating coefficients in response to the value calculated by the power calculating portion according to a relation therebetween, the second distortion compensating coefficients being designed to compensate for a signal distortion caused by a nonlinearity of the RF power amplifier;

a compensation-coefficient calculating portion for calculating final distortion compensating coefficients from the first distortion compensating coefficients determined by the first means and the second distortion compensating coefficients determined by the second means;

a distortion compensating portion for converting the first baseband signals into second baseband signals quadrature with respect to each other in response to the final distortion compensating coefficients calculated by the compensation-coefficient calculating portion to compensate for signal distortions caused by the nonlinearity of the quadrature modulating portion and the nonlinearity of the RF power amplifier;

third means for feeding the second baseband signals generated by the distortion compensating portion to the quadrature modulating portion;

a switch connected to the quadrature modulating portion and the RF power amplifier for selecting one of an output signal of the quadrature modulating portion and an output signal of the RF power amplifier;

a signal divider connected to the switch for separating a portion from the signal selected by the switch;

a quadrature demodulator for demodulating the signal portion selected by the switch into third baseband signals quadrature with respect to each other;

fourth means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the first distortion compensating coefficients and the value calculated by the power calculating portion which is used by the first means when the switch selects the output signal of the quadrature modulating portion, and for updating, in response to the calculated error, the relation between the second distortion compensating coefficients and the value calculated by the power calculating portion which is used by the second means when the switch selects the output signal of the RF power amplifier.

33. A nonlinearity-caused distortion compensating system as recited in claim 32, wherein the first means includes a first memory for storing signals representing a first reference table providing the relation between the first distortion compensating coefficients and the value calculated by the power calculating portion, and the second means includes a second memory for storing signals representing a second reference table providing the relation between the second distortion compensating coefficients and the value calculated by the power calculating portion, and the fourth means includes a third memory for storing signals representing a third reference table providing a relation between the corrective coefficients and the value calculated by the power calculating portion.

34. A nonlinearity-caused distortion compensating system as recited in claim 32, wherein the first means includes a first calculator for calculating the first distortion compensating coefficients from the value calculated by the power calculating portion according to first equations, and the second means includes a second calculator for calculating the second distortion compensating coefficients from the value calculated by the power calculating portion according to second equations, and the fourth means includes a third calculator for calculating the corrective coefficients from the value calculated by the power calculating portion according to third equations.

35. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion according to a relation therebetween, the first compensation coefficients being designed to compensate for a signal distortion caused by a nonlinearity of the quadrature modulating portion;

second means for determining second compensation coefficients in response to the value calculated by the power calculating portion according to a relation therebetween, the second compensation coefficients being designed to compensate for a signal distortion caused by a nonlinearity of the RF power amplifier;

a first calculator for calculating third compensation coefficients from the value calculated by the power calculating portion according to first equations, the third compensation coefficients being designed to compensate for a variation in characteristics of the quadrature modulating portion;

a second calculator for calculating fourth compensation coefficients from the value calculated by the power calculating portion according to second equations, the fourth compensation coefficients being designed to compensate for a variation in characteristics of the RF power amplifier;

a compensation-coefficient calculating portion for calculating final compensation coefficients from the first compensation coefficients determined by the first means, the second compensation coefficients determined by the second means, the third compensation coefficients calculated by the first calculator, and the fourth compensation coefficients calculated by the second calculator;

a distortion compensating portion for converting the first baseband signals into second baseband signals quadrature with respect to each other in response to the final compensation coefficients calculated by the compensation-coefficient calculating portion to compensate for signal distortions caused by the nonlinearity of the quadrature modulating portion and the nonlinearity of the RF power amplifier, and to compensate for variations in the characteristics of the quadrature modulating portion and the RF power amplifier;

third means for feeding the second baseband signals generated by the distortion compensating portion to the quadrature modulating portion;

a switch connected to the quadrature modulating portion and the RF power amplifier for selecting one of an output signal of the quadrature modulating portion and an output signal of the RF power amplifier;

a signal divider connected to the switch for separating a portion from the signal selected by the switch;

a quadrature demodulator for demodulating the signal portion selected by the switch into third baseband signals quadrature with respect to each other;

fourth means for determining corrective coefficients in response to the value calculated by the power calculating portion, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating the first equations used by the first calculator in response to the calculated error when the switch selects the output signal of the quadrature modulating portion, and for updating the second equations used by the second calculator in response to the calculated error when the switch selects the output signal of the RF power amplifier.

36. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining compensation coefficients in response to the value calculated by the power calculating portion according to a relation therebetween, the compensation coefficients being designed to compensate for a signal distortion caused by at least one of a nonlinearity of the quadrature modulating portion and a nonlinearity of the RF power amplifier;

a distortion compensating portion for converting the first baseband signals into second baseband signals quadrature with respect to each other in response to the compensation coefficients determined by the first means to compensate for a signal distortion caused by at least one of the nonlinearity of the quadrature modulating portion and the nonlinearity of the RF power amplifier;

second means for feeding the second baseband signals generated by the distortion compensating portion to the quadrature modulating portion;

a switch connected to the quadrature modulating portion and the RF power amplifier for selecting one of an output signal of the quadrature modulating portion and an output signal of the RF power amplifier;

a signal divider connected to the switch for separating a portion from the signal selected by the switch;

a quadrature demodulator for demodulating the signal portion selected by the switch into third baseband signals quadrature with respect to each other;

third means for determining corrective coefficients in response to the value calculated by the power calculating portion according to a relation therebetween, the corrective coefficients being designed to compensate for a signal distortion caused by a nonlinearity of the quadrature demodulator;

a correcting portion for converting the third baseband signals generated by the quadrature demodulator into fourth baseband signals quadrature with respect to each other in response to the corrective coefficients determined by the third means to compensate for a signal distortion caused by the nonlinearity of the quadrature demodulator; and an updating portion for calculating an error between the first baseband signals and the fourth baseband signals, for updating, in response to the calculated error, the relation between the compensation coefficients and the value calculated by the power calculating portion which is used by the first means when the switch selects the output signal of the RF power amplifier, and for updating, in response to the calculated error, the relation between the corrective coefficients and the value calculated by the power calculating portion which is used by the third means when the switch selects the output signal of the quadrature modulating portion.

37. A nonlinearity-caused distortion compensating system as recited in claim 36, wherein the first means includes a first memory for storing signals representing a first reference table providing the relation between the compensation coefficients and the value calculated by the power calculating portion, and the third means includes a second memory for storing signals representing a second reference table providing the corrective coefficients and the value calculated by the power calculating portion.

38. A nonlinearity-caused distortion compensating system as recited in claim 36, wherein the first means includes a first calculator for calculating the compensation coefficients from the value calculated by the power calculating portion according to first equations, and the third means includes a second calculator for calculating the corrective coefficients from the value calculated by the power calculating portion according to second equations.

39. A nonlinearity-caused distortion compensating system in a radio transmitter having a quadrature modulating portion and an RF power amplifier, the RF power amplifier following the quadrature modulating portion, the system comprising:

a power calculating portion for calculating a value related to a power of a transmission signal from first baseband signals quadrature with respect to each other;

first means for determining first compensation coefficients in response to the value calculated by the power calculating portion, the first compensation coefficients being designed to compensate for a signal distortion caused by at least one of a nonlinearity of the quadrature modulating portion and a nonlinearity of the RF power amplifier;

a first calculator for calculating second compensation coefficients from the value calculated by the power calculating portion according to first equations, the second compensation coefficients being designed to compensate for a variation in characteristics of at least one of the quadrature modulating portion and the RF power amplifier;

a compensation-coefficient calculating portion for calculating final compensation coefficients from the first compensation coefficients determined by the first means and the second compensation coefficients determined by the first calculator;

a distortion compensating portion for converting the first baseband signals into second baseband signals quadrature with respect to each other in response to the final compensation coefficients calculated by the compensation-coefficient calculating portion to compensate for a signal distortion caused by at least one of the nonlinearity of the quadrature modulating portion and the nonlinearity of the RF power amplifier, and to compensate for a variation in the characteristics of at least one of the quadrature modulating portion and the RF power amplifier;

second means for feeding the second baseband signals generated by the distortion compensating portion to the quadrature modulating portion;

a switch connected to the quadrature modulating portion and the RF power amplifier for selecting one of an output signal of the quadrature modulating portion and an output signal of the RF power amplifier;

a signal divider connected to the switch for separating a portion from the signal selected by the switch;

a quadrature demodulator for demodulating the signal portion selected by the switch into third baseband signals quadrature with respect to each other;

third means for determining first corrective coefficients in response to the value calculated by the power calculating portion, the first corrective coefficients being designed to compensate for a signal distortion caused by a nonlinearity of the quadrature demodulator;

a second calculator for calculating second corrective coefficients from the value calculated by the power calculating portion according to second equations, the second corrective coefficients being designed to compensate for a variation in characteristics of the quadrature demodulator;

a corrective-coefficient calculating portion for calculating final corrective coefficients from the first corrective coefficients determined by the third means and the second corrective coefficients determined by the second calculator;

a correcting portion for converting the third baseband signals generated by the quadrature demodulator into fourth baseband signals quadrature with respect to each other in response to the final corrective coefficients determined by the corrective-coefficient calculating portion to compensate for a signal distortion caused by the nonlinearity of the quadrature demodulator, and to compensate for a variation in the characteristics of the quadrature demodulator; and an updating portion for calculating an error between the first baseband signals and the fourth baseband signals, for updating the first equations used by the first calculator in response to the calculated error when the switch selects the output signal of the RF power amplifier, and for updating the second equations used by the second calculator in response to the calculated error when the switch selects the output signal of the quadrature modulating portion.

* * * * *